(12) United States Patent
Klipstein et al.

(10) Patent No.: US 9,297,509 B2
(45) Date of Patent: Mar. 29, 2016

(54) LED WORK LIGHT

(75) Inventors: Donald L. Klipstein, Upper Darby, PA (US); Robert Tod Whitfield, Toronto (CA)

(73) Assignee: BRASSCORP LIMITED, North York, Ontario (CA)

( * ) Notice: Subject to any disclaimer, the term of this patent is extended or adjusted under 35 U.S.C. 154(b) by 0 days.

(21) Appl. No.: 13/270,808

(22) Filed: Oct. 11, 2011

(65) Prior Publication Data

US 2012/0113636 A1    May 10, 2012

Related U.S. Application Data

(63) Continuation of application No. 12/458,018, filed on Jun. 29, 2009, now Pat. No. 8,033,681, which is a continuation of application No. 11/083,086, filed on Mar. 18, 2005, now Pat. No. 7,553,051.

(Continued)

(51) Int. Cl.
*F21L 14/02*     (2006.01)
*F21S 8/10*      (2006.01)

(Continued)

(52) U.S. Cl.
CPC ............. *F21S 48/328* (2013.01); *F21L 4/00* (2013.01); *F21L 14/023* (2013.01); *F21V 5/04* (2013.01); *F21V 7/0091* (2013.01); *F21V 15/04* (2013.01); *F21V 17/12* (2013.01); *F21V 21/08* (2013.01); *F21V 21/406* (2013.01); *F21V 23/0435* (2013.01); *F21V 27/005* (2013.01);

(Continued)

(58) Field of Classification Search
CPC ......... F21V 5/04; F21V 7/0091; F21V 15/04; F21V 17/12; F21V 21/08; F21V 21/406; F21V 23/0435; F21V 27/005; F21V 29/004; H05B 33/0803; H05B 33/0815; Y02B 20/341; F21Y 2101/02
USPC .............. 362/202, 184, 208, 237, 311.01, 362/311.02, 311.09, 311.1, 336, 340, 451; 359/708, 718, 719
See application file for complete search history.

(56) References Cited

U.S. PATENT DOCUMENTS

| | | | |
|---|---|---|---|
| 1,507,742 | A | 9/1924 | Kollath et al. |
| 2,469,080 | A | 5/1949 | Rosin et al. |

(Continued)

FOREIGN PATENT DOCUMENTS

| | | |
|---|---|---|
| CA | 2200364 | 5/1997 |
| CA | 2200365 | 5/1997 |

(Continued)

OTHER PUBLICATIONS

Office Action dated Jan. 19, 2011 for U.S. Appl. No. 12/003,322.

(Continued)

*Primary Examiner* — Sharon Payne

(57) ABSTRACT

A work light has a head section with a single piece metal channel having a rear portion and opposing side flanges. The rear portion and side flanges extending longitudinally along the channel. Light has a handle section. LEDs are mounted on channel such that the channel is heatsink for the LEDs. A transparent single piece lens assembly covers the LEDs, the lens assembly has a corresponding plurality of convex lenses, each convex lens forward of each LED, the lens assembly attached to the rear portion of the channel. Forward edges of the side flanges of the channel extend farther forward from the rear surface than the lens assembly for protection.

9 Claims, 29 Drawing Sheets

Related U.S. Application Data

(60) Provisional application No. 60/521,240, filed on Mar. 18, 2004, provisional application No. 60/521,680, filed on Jun. 16, 2004, provisional application No. 60/521,689, filed on Jun. 17, 2004, provisional application No. 60/521,738, filed on Jun. 28, 2004, provisional application No. 60/521,888, filed on Jul. 17, 2004.

(51) Int. Cl.

| | | |
|---|---|---|
| *F21L 4/00* | (2006.01) | |
| *F21V 5/04* | (2006.01) | |
| *F21V 7/00* | (2006.01) | |
| *F21V 15/04* | (2006.01) | |
| *F21V 17/12* | (2006.01) | |
| *F21V 21/08* | (2006.01) | |
| *F21V 21/40* | (2006.01) | |
| *F21V 23/04* | (2006.01) | |
| *F21V 27/00* | (2006.01) | |
| *F21V 29/00* | (2015.01) | |
| *H05B 33/08* | (2006.01) | |
| *F21V 29/75* | (2015.01) | |
| *F21V 29/76* | (2015.01) | |
| *F21V 29/83* | (2015.01) | |
| *F21L 4/08* | (2006.01) | |
| *F21S 4/00* | (2006.01) | |
| *F21V 21/06* | (2006.01) | |
| *F21V 21/32* | (2006.01) | |
| *F21V 23/02* | (2006.01) | |
| *F21Y 101/02* | (2006.01) | |

(52) U.S. Cl.
CPC .............. *F21V29/004* (2013.01); *F21V 29/75* (2015.01); *F21V 29/763* (2015.01); *F21V 29/83* (2015.01); *H05B 33/0803* (2013.01); *H05B 33/0815* (2013.01); *F21L 4/08* (2013.01); *F21S 4/003* (2013.01); *F21V 21/06* (2013.01); *F21V 21/32* (2013.01); *F21V 23/02* (2013.01); *F21Y 2101/02* (2013.01); *Y02B 20/341* (2013.01)

(56) References Cited

U.S. PATENT DOCUMENTS

| | | | |
|---|---|---|---|
| 3,379,869 A | | 4/1968 | Dorman |
| D215,751 S | | 10/1969 | Castellano |
| 3,516,087 A | | 6/1970 | Rueger |
| 3,676,668 A | | 7/1972 | Collins et al. |
| 3,790,912 A | | 2/1974 | Murphy |
| 3,808,434 A | | 4/1974 | Gutbier |
| 3,870,606 A | | 3/1975 | Tabata et al. |
| 3,920,801 A | | 11/1975 | Grotheer et al. |
| 4,013,915 A | | 3/1977 | Dufft |
| 4,185,891 A | | 1/1980 | Kaestner |
| 4,477,863 A | | 10/1984 | Walz |
| 4,739,454 A | * | 4/1988 | Federgreen ................... 362/133 |
| 4,826,269 A | | 5/1989 | Streifer et al. |
| 4,935,665 A | | 6/1990 | Murata |
| 4,963,798 A | | 10/1990 | McDermott |
| 5,092,331 A | | 3/1992 | Nakamuura et al. |
| 5,289,082 A | | 2/1994 | Komoto |
| D349,123 S | | 7/1994 | Cooley et al. |
| 5,410,453 A | | 4/1995 | Ruskouski |
| 5,528,477 A | | 6/1996 | Carmo |
| 5,749,830 A | | 5/1998 | Kaneko et al. |
| 5,757,557 A | | 5/1998 | Medvedev et al. |
| 5,785,404 A | | 7/1998 | Wiese |
| 5,806,961 A | | 9/1998 | Dallon et al. |
| 5,813,743 A | * | 9/1998 | Naka ................... 362/16 |
| 5,954,206 A | | 9/1999 | Mallon et al. |
| 5,975,712 A | | 11/1999 | Shiao |
| 5,984,861 A | | 11/1999 | Crowley |
| 6,095,661 A | | 8/2000 | Lebens et al. |
| 6,132,072 A | | 10/2000 | Turnbull et al. |
| 6,142,650 A | | 11/2000 | Brown et al. |
| D434,868 S | | 12/2000 | Trigiani |
| 6,165,384 A | | 12/2000 | Cooper et al. |
| 6,183,086 B1 | | 2/2001 | Neubert |
| 6,190,020 B1 | | 2/2001 | Hartley |
| 6,200,134 B1 | | 3/2001 | Kovac et al. |
| 6,250,771 B1 | | 6/2001 | Sharrah et al. |
| 6,305,818 B1 | | 10/2001 | Lebens et al. |
| 6,357,893 B1 | | 3/2002 | Belliveau |
| 6,367,949 B1 | | 4/2002 | Pederson |
| 6,402,347 B1 | | 6/2002 | Maas et al. |
| 6,468,077 B1 | | 10/2002 | Melikechi et al. |
| 6,480,389 B1 | | 11/2002 | Shie et al. |
| 6,485,160 B1 | | 11/2002 | Sommers et al. |
| 6,491,408 B1 | | 12/2002 | Cooper et al. |
| 6,501,084 B1 | | 12/2002 | Sakai et al. |
| 6,502,956 B1 | * | 1/2003 | Wu ................... 362/237 |
| 6,511,203 B1 | | 1/2003 | Winther |
| 6,527,411 B1 | | 3/2003 | Sayers |
| D472,890 S | | 4/2003 | Suzuki |
| 6,590,220 B1 | | 7/2003 | Kalley et al. |
| 6,612,717 B2 | | 9/2003 | Yen |
| 6,630,682 B2 | | 10/2003 | Shanley et al. |
| 6,637,923 B2 | | 10/2003 | Amano |
| D483,508 S | | 12/2003 | Galvez |
| D483,893 S | | 12/2003 | Galvez |
| 6,710,363 B1 | | 3/2004 | Trigiani |
| 6,805,476 B2 | | 10/2004 | Amano |
| 6,819,505 B1 | | 11/2004 | Cassarly et al. |
| D502,276 S | | 2/2005 | Kovacik et al. |
| 6,853,151 B2 | | 2/2005 | Leong et al. |
| 6,857,756 B2 | | 2/2005 | Reiff et al. |
| 6,866,401 B2 | | 3/2005 | Sommers et al. |
| 6,890,086 B2 | | 5/2005 | Shiu |
| D509,010 S | | 8/2005 | Kovacik et al. |
| 6,940,704 B2 | | 9/2005 | Stalions |
| 6,979,104 B2 | | 12/2005 | Brass et al. |
| 7,004,605 B1 | * | 2/2006 | Galvez ................... 362/451 |
| 7,029,150 B2 | | 4/2006 | Finch |
| 7,083,297 B2 | | 8/2006 | Matthews et al. |
| 7,145,649 B2 | | 12/2006 | Brass |
| 7,153,004 B2 | | 12/2006 | Galli |
| 7,172,319 B2 | | 2/2007 | Holder et al. |
| 7,214,952 B2 | | 5/2007 | Klipstein et al. |
| 7,267,466 B2 | | 9/2007 | Reiss |
| 7,311,419 B2 | * | 12/2007 | Bayat et al. ............... 362/217.05 |
| 2002/0012564 A1 | | 1/2002 | Chao |
| 2002/0074559 A1 | | 6/2002 | Dowling et al. |
| 2002/0080615 A1 | | 6/2002 | Marshall et al. |
| 2002/0093649 A1 | | 7/2002 | Brass |
| 2002/0191396 A1 | * | 12/2002 | Reiff et al. ................... 362/246 |
| 2003/0007345 A1 | | 1/2003 | Cooper et al. |
| 2003/0007346 A1 | | 1/2003 | Cooper et al. |
| 2003/0098425 A1 | | 5/2003 | Sosinsky |
| 2003/0123254 A1 | | 7/2003 | Brass et al. |
| 2003/0142489 A1 | | 7/2003 | Cooper et al. |
| 2003/0165065 A1 | | 9/2003 | Roller et al. |
| 2003/0169600 A1 | | 9/2003 | Amano |
| 2004/0223342 A1 | | 11/2004 | Klipstein et al. |
| 2004/0228124 A1 | | 11/2004 | Reiff et al. |
| 2005/0007777 A1 | | 1/2005 | Klipstein et al. |
| 2005/0083687 A1 | | 4/2005 | Brass et al. |
| 2005/0109604 A1 | | 5/2005 | Zlotopolski |
| 2005/0122713 A1 | | 6/2005 | Hutchins |
| 2005/0225968 A1 | | 10/2005 | Hatherill et al. |
| 2005/0265035 A1 | | 12/2005 | Brass et al. |
| 2007/0189019 A1 | | 8/2007 | Klipstein |
| 2007/0217188 A1 | | 9/2007 | Klipstein |
| 2007/0247844 A1 | | 10/2007 | Brass et al. |
| 2007/0253188 A1 | | 11/2007 | Klipstein et al. |
| 2008/0191232 A1 | | 8/2008 | Lee et al. |
| 2008/0198615 A1 | | 8/2008 | Klipstein |

(56) References Cited

U.S. PATENT DOCUMENTS

| | | |
|---|---|---|
| 2008/0212319 A1 | 9/2008 | Klipstein |
| 2009/0147519 A1 | 6/2009 | Klipstein et al. |
| 2009/0161351 A1 | 6/2009 | Klipstein et al. |

FOREIGN PATENT DOCUMENTS

| | | |
|---|---|---|
| CA | 2284870 | 9/1998 |
| CA | 2280398 | 4/2000 |
| CA | 2405802 | 10/2001 |
| CA | 2501447 | 9/2005 |
| DE | 2542220 | 3/1977 |
| DE | 299574 | 4/1992 |
| DE | 20021934 | 4/2001 |
| DE | 20110813 | 9/2001 |
| EP | 0523927 | 1/1993 |
| EP | 1059202 | 12/2000 |
| GB | 800730 | 9/1958 |
| GB | 810256 | 3/1959 |
| WO | 9633129 | 10/1996 |
| WO | 9839636 | 9/1998 |
| WO | 9935486 | 7/1999 |
| WO | 0152605 | 7/2001 |
| WO | 0181973 | 11/2001 |
| WO | 03004929 | 1/2003 |
| WO | 03004932 | 1/2003 |
| WO | 03025458 | 3/2003 |
| WO | 03060495 | 7/2003 |
| WO | 2004107457 | 12/2004 |
| WO | 2006094390 | 9/2006 |
| WO | 2006102757 | 10/2006 |
| WO | 2007128126 | 11/2007 |

OTHER PUBLICATIONS

Lumileds Lighting LLC, Secondary Optuics Design Consideration for SuperFlux LEDs. 2002. Publication No. AB20-5 (Sep. 2002). pp. 17-20.
Examiner's Report dated Jan. 27, 2011 from Canadian Application No. 2,652,218.
Office Action dated Dec. 16, 2010 for U.S. Appl. No. 12/289,782.
International Search Report (PCT/CA2010/001170) filed Jul. 29, 2010. completed (Nov. 9, 2010).
KR 1998-072607 (Korea Atomic Energy Research Institute) Nov. 5, 1998 (May 11, 1998) Machine English Translation (Korean Patent Information Online Network; http://k-pion.kipo.go.kr).
Invictalux. A new concept for inspection lamps. PRIMALEC, Mar. 3, 2003. email customer@primalec.co.uk. 2 pages.
Sayer et al. Measurement. Instrumentation and Experiment Design in Physics and Engineering. 2000. pp. 197-198. Prentice-Hall of India. New Delhi, India.
Koller, Lewis R. Ultraviolet Radiation, 2nd ed., Wiley Series in Pure and Applied Optics, 1965, pp. 158-181, John Wiley & Sons, Inc. NY. USA.
Johnson, Craig. The LED Museum—LEDS—Gallium Indium Nitrate UV, . . . http://ledmuseum.home.att.net/index2.htm. Jul. 30, 2004. pp. 1-3. Seattle, WA. USA.
PRIMALEC. Invictalux product brochure. http://www.primalec.co.uk/pdfs/invictalux.pdf. Mar. 3, 2003, Kent. UK.
Johnson, Craig. Infinity Task Light. The Punishment Zone. The LED Museum, http://ledmuseum.home.att.net/infl.htm. Jun. 24, 2002. Seattle, USA.
Johnson, Craig. Arc Flashlight, The LED Museum. http://home.att.net/~ledmuseum/arclight.htm. Nov. 14, 2006. Seattle, USA.
LED Lighting Fixtures Inc. LLF: LED Lighting Fixtures: The New Standard in Downlighting. Apr. 4, 2007. Morrisville. North Carolina. USA. http://www.ledlightingfixtures.com/.
Maxxeon Inc. Maxxeon WorkStar—Cordless Rechargeable LED Work Lights, Apr. 4, 2007. Cambridge ON. Canada. http://www.maxxeon.com/?gclid=CL2fsZKn-loCFRkeYAodPAt9nw.
Edmund Optics Inc. TECHSPEC Precision Aspheric Lenses, http://www.edmundoptics.com/onlinecatalog/DisplayProduct.cfm?productid=2686. Mar. 15, 2007. Barrington, NJ. USA.
Edmund Optics Inc. Aspheric Condenser Lenses. http://www.edmundoptics.com/onlinecatalog/displayproduct.cfm?productID=2454. Mar. 15, 2007. Barrington. NJ. USA.
Johnson, Craig. LEDTronics. Mini-FlashLED. LED Museum, http://ledmuseum.home.att.net/flashled.htm. Jul. 30, 2004. pp. 1-7. Seattle, WA. USA.
LEDTronics, Inc. Hi-power FlashLED Flashlights. www.ledtronics.com.http://netdisty.net/ds/fit-3001/default.asp. date unknown, p. 1. Torrance. CA. USA.
Osram Sylvania, Preliminary data sheet for OS-WL01A, Feb. 25, 2000. pp. 1-4. Germany.
Johnson, Craig. LED Museum. http://ledmuseum.home.att.net/menutop.htm. Printed Jul. 30, 2004. pp. 1-15, Seattle. WA. USA.
Author Unknown. Cool Blue, Product pages for Dorcy,http://www.dorcy.com/led%20new.htm, Feb. 27, 2002, pp. 1-2, Country of publication unknown.
Author Unknown. Hi-power FlashLED Flashlights. Safety LED. http://secure.implex.net/NBAComputers/browse.cfm?CategoryID=8, Dec. 10, 2001. p. 1. Country of publication unknown.
Johnson, Craig. CentraL.E.D. WorkLight. The Punishment Zone. The LED Museum. Mar. 5, 2007. http://ledmuseum.candlepower.us/sixth/clwl.htm. Sacramento. USA.
Johnson, Craig. LEDTronics FlashLED, The LED Museum, http://ledmuseum.home.alt.net/tronics.htm. Jul. 30, 2004, pp. 1-14. Seattle, WA. USA.

\* cited by examiner

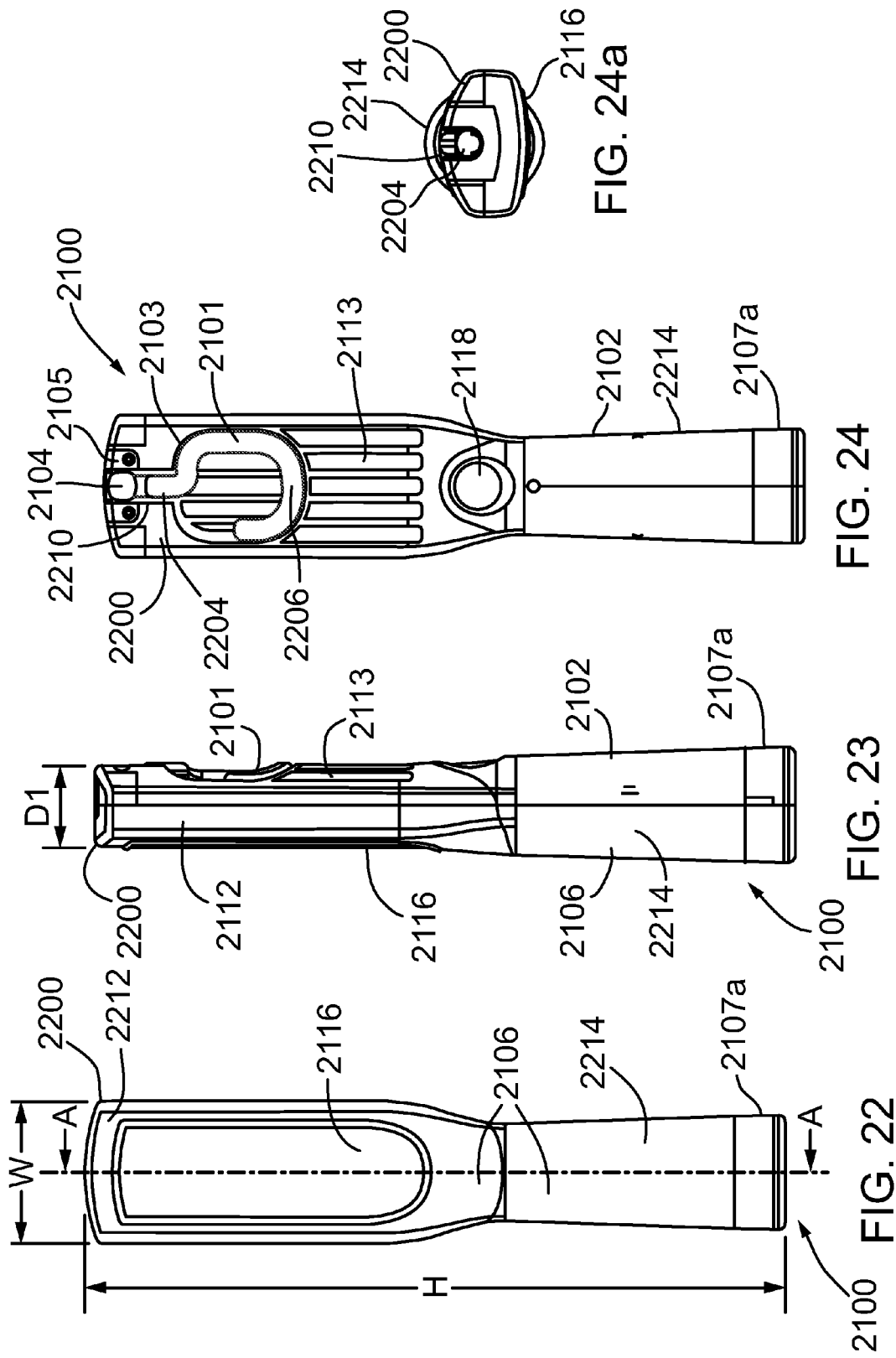

LED WORK LIGHT

CROSS-REFERENCE TO RELATED APPLICATIONS

This application is a continuation of U.S. Pat. No. 8,033,681 issued Oct. 11, 2011 which is a continuation of U.S. Pat. No. 7,553,051 issued Jun. 30, 2009 which claims the benefit of the filing date of U.S. Patent Application No. 60/521,240 filed 18 Mar. 2004, Application No. 60/521,680 filed 16 Jun. 2004, Application No. 60/521,689 filed 17 Jun. 2004, Application No. 60/521,738 filed 28 Jun. 2004, and Application No. 60/521,888 filed 17 Jul. 2004 under the title LED Work Light. The content of the above applications is hereby expressly incorporated by reference into the detailed description hereof.

FIELD OF THE INVENTION

The application relates to work lights. More particularly it relates to LED work lights.

BACKGROUND OF THE INVENTION

Work lights, often known as "trouble lights", are widely used in automotive repair shops and other repair settings and construction settings. Such work lights are often in a form that can alternatively be handheld or hung from a suitable elevated object such as a raised automobile hood.

Incandescent work lights have been in use, but they have some drawbacks. One drawback is that work lights are all too often dropped or knocked down and fall onto a hard surface, and this often results in breakage of the bulb or its filament. An additional drawback of incandescent work lights is a safety hazard that results from the possibility of the bulb breaking with its hot filament in close proximity to flammable material such as spilled flammable liquid if the work light suffers a fall.

Fluorescent work lights exist and they have advantages over incandescent work lights, namely greater energy efficiency and a reduced hazard of igniting flammable materials if they suffer a fall. However, fluorescent work lights can experience breakage of their bulbs if they suffer a fall. Although breakage of an operating fluorescent bulb is not as likely to ignite nearby flammable materials as breakage of an incandescent bulb is, there is still a slight chance that a fluorescent bulb can ignite adjacent flammable materials if broken while operating since fluorescent lamps normally have hot filaments while they are operating. There are fluorescent work lights that have impact cushioning means included to increase their ability to survive falls, but they still have a slight chance of experiencing breakage of their bulbs if they fall onto a hard surface.

LED work lights are better able to survive falls than are work lights that have glass bulbs. Furthermore, LEDs do not generally operate with parts hot enough to ignite flammable materials, so even falls that do result in breakage are less likely to cause fires than are similar falls of work lights that have glass bulbs.

The prior art has LED work lights. Many produce light that is insufficiently intense or in the form of an excessively narrow beam. It is possible to achieve adequately intense light in an adequately wide beam by using a large number of LEDs. However, a work light having a sufficient number of LEDs and sufficient power input to achieve adequately intense light in an adequately wide beam without overheating of the LEDs is generally large and expensive.

As described further herein some features of some aspects of the invention will address some of the issues raised above. Other features and other aspects will address other issues with existing LED lights to provide alternatives or improvements thereto.

SUMMARY OF THE INVENTION

In a first aspect the invention provides an LED work light a light head, at least one light emitting diode (LED) contained within the light head, and a handle that is attached to said light head. The light head emits light external to the light head from light emitted by the at least one LED. The at least one LED is of a high power type that normally requires heatsinking. The light emitted from the work light is in the form of a beam that has a useful beam width of light adequate for use in working for prolonged periods is essentially at least 40 degrees wide and essentially no more than 90 degrees wide.

In a second aspect the invention provides a work light having a high power LED that requires a heatsink for operation in a normal working environment while preserving a useful life in prolonged use, an optic associated with the LED such that a beam width of light radiating from the LED is changed by the optic, and light emitting from the optic has a useful beam width of light adequate for use in working for prolonged periods, a heatsink for use with the LED to preserve useful working life of the LED when operated in prolonged use, a casing substantially enclosing the LED and optic, and the casing housing the heatsink, and a transparent cover in the casing through which the beam of light from the optic can escape the casing along a beam axis.

In a third aspect the invention provides a work light having a high power LED that requires a heatsink for operation in a normal working environment while preserving a useful life in prolonged use, an optic associated with the LED such that the optic creates a beam emitting from the optic for use in working for prolonged periods that has a more uniform light density across its beam width than the light density across a beam emitted by the LED, a heatsink for use with the LED to preserve useful working life of the LED when operated in prolonged use, a casing substantially enclosing the LED and optic, and housing the heatsink, and a transparent cover in the casing through which the beam of light from the optic can escape the casing along a beam axis.

In a fourth aspect the invention provides a work light having a high power LED that requires a heatsink for operation in a normal working environment while preserving a useful life in prolonged use, an optic associated with the LED such that a beam edge of light radiating from the LED is changed by the optic to produce a beam for use in working for prolonged periods wherein the beam edge has a different sharpness, a heatsink for use with the LED to preserve useful working life of the LED when operated in prolonged use, a casing substantially enclosing the LED and optic, and the casing housing the, and a transparent cover in the casing through which the beam of light from the optic can escape the casing along a beam axis.

The LEDs may be white LEDs. The work light may have one or more heatsinks that assist in dissipating heat from the LEDs. One or more optical components may be included in order to achieve a beam width of at least 40 degrees and no more than 90 degrees.

Optical pieces may be a molded plastic part wherein total internal reflection occurs. Each light emitting diode of the at least one light emitting diode may produce a beam less than 40 degrees wide and the at least one light emitting diode may be arranged to produce a combined beam that is at least 40 degrees wide.

The at least one light emitting diode may produce a beam that is more than 90 degrees wide and the work light may have one optical component for each light emitting diode of the at least one light emitting diode, each optical component may be placed forward from its respective light emitting diode in order for the work light to produce a beam that is essentially less than 90 degrees wide. At least one optical component may be a prism.

The work light may be able to work from low voltage direct current. The may have a cavity for receiving a removable DC power source. The light head may have a casing that is plastic.

The work light may have one or more pieces of compressible material to protect the work light from impacts. The impact protection material may, for example, be selected from rubber or a thermoplastic elastomer.

The optical component may be a convex lens. The convex lenses may be part of a transparent lens assembly. The transparent lens assembly may be molded. It may be machined after molding. It may be polished after machining.

Each convex lens may be planoconvex. Each planoconvex lens may be aspheric.

The removable DC power source may include rechargeable batteries. The removable DC power source may be an external power source with wire conductors. The work light may be able to be operated from essentially 12 or 12-14 volts DC.

A kit may include a work light and a first removable DC power source including rechargeable batteries and a second removable DC power source. The second removable power source may include an external power source with conductors for connection in the cavity. The first removable DC power source and second removable DC power source may be interchangeable in the cavity.

The kit may include a charging base that can recharge the batteries. The second removable DC power source may include an AC line voltage to low voltage DC transformer and a line voltage cord, the transformer between the conductors for electrical connection to the cavity and the line voltage cord.

The work light may include a paging receiver. The paging receiver may be used for locating the work light. The work light may have an alarm that, when activated, assists in locating the work light. The paging receiver may receive pages from an external device, such that the work light causes the alarm to activate upon receipt of a page by the paging receiver from the external device. The alarm may include activation of the light.

A kit may include a work light and a paging receiver and a charging base having a transmitter for transmitting pages to the paging receiver.

In a fifth aspect the invention provides a work light including at least one LED and an LED mounting member to which the at least one LED is mounted, a heatsink thermally connected to at least one LED, a casing within which the LED assembly and heatsink are mounted. In this aspect the casing has a transparent cover through which light emitting from the LED can escape the casing, and the casing has openings through which heat from the heatsink may be transferred to ambient air external to the casing to provide cooling for the heatsink.

The openings may be adjacent to the heatsink. The openings may be dimensioned to prevent accidental access through the casing to the heatsink.

A casing may be primarily made from of a rigid plastic. The casing may be primarily comprised of an electrically insulative material.

The work light may include a hook mounted to the casing on a ball-and-socket joint such that the hook can be rotated about 360 degrees relative to the casing when in use, and may include a recess in the casing such that the hook can be rotated on the ball-and-socket joint to be received within the recess when not in use.

The work light may include a hook mounted to the casing on a ball-and-socket joint such that the hook can be rotated about 360 degrees relative to the casing when in use and such that the hook can be rotated on the ball-and-socket joint to lay flat against the casing when not in use.

The casing may have a recess against which the hook lays flat, the recess recessed sufficiently to present a generally smooth outer contour for the work light when the hook is in the recess, while allowing manual access to the hook.

The openings may be in a non-planar surface of the casing such that the openings are not blocked when the non-planar surface is placed adjacent a planar surface. The non-planar surface may be an arcuate surface.

The work light may have an overall width of approximately 60 millimetres or less, overall depth of approximately 43 millimetres or less, and an overall height of approximately 301 millimetres or less, with the transparent cover in the casing across a portion of the width of the work light.

The casing may include a handle portion and a head portion with the LEDs and LED mounting member and heatsink mounted in the head portion. The handle may have a cavity for receiving batteries to power the LEDs.

The work light may include a connection through which the work light can receive energy for the LEDs. The connection may be for receiving a battery source of energy. The connection may be for receiving a further connection to a source of energy external to the casing. The work light may include circuitry between the LEDs and the source of energy for controlling the flow of energy from the source of energy to the LEDs.

The casing may be configured to accept a battery source of energy and a connection for receiving a source of energy external to the casing, such that the battery source of energy and the connection for receiving a source of energy external to the casing are interchangeable.

The work light may have a longitudinal axis with which the handle and head are generally aligned. The transparent cover over the LEDs may be directed out of line with the longitudinal axis. The transparent cover over the LEDs may be directed generally perpendicular to the longitudinal axis.

The openings may open out of line with the longitudinal axis. The openings may open generally perpendicular to the longitudinal axis. The openings may be elongate slots extending generally parallel to the longitudinal axis.

The at least one LED may be a plurality of LEDs and the LEDs may be mounted substantially on one plane to emit light substantially perpendicular to the plane. The LEDs may be mounted substantially along a line in the plane.

The work light may include one optic for each LED of the at least one LED, each optic associated with its respective LED such that radiation emitted by the LEDs and passing through the optics produces a beam that has a beam angle of between approximately 40 degrees and 90 degrees.

The work light may emit a beam that has a central beam axis that is generally perpendicular to the longitudinal axis of the light.

The dissipation of heat from a heatsink in the work light may maintain the temperature of the outside surface of the LEDs below approximately 75 degrees Celsius in a range of ambient temperatures below approximately 35 degrees Celsius. The heatsink may be set back from an adjacent internal surface of the casing. The work light may include an air gap between the heatsink and the adjacent internal surface of the casing.

The work light may include an accessory mount for receiving a work light accessory. The work light accessory may be a work light mounting device. The work light mounting device may be a stand for mounting the work light on top of a generally horizontal surface. The work light mounting device may be a mounting bracket for mounting the work light to an external location.

In a sixth aspect the invention provides a work light including at least one LED and an LED mounting member to which the at least one LED is mounted, a heatsink thermally connected to the at least one LED, a casing within which the at least one LED and heatsink are mounted. In this aspect the at least one LED emits light about a central beam axis, the casing has a head section, and the head section has a transparent cover through which light emitting from the LED assembly can escape the casing. The heatsink has three dimensions: depth, width and height, the at least one LED is mounted adjacent and in thermal contact with the heatsink along the central beam axis in an opposite direction to which the at least one LED emits light, and the depth of the heatsink is measured along the central beam axis. The width and height of the heatsink are measured perpendicular to the depth and to one another, the head section follows the general profile of the heatsink, and the depth of the heatsink is substantially less than the width of the heatsink and substantially less than the height of the heatsink, such that the work light uses less space in the direction in which light is desired.

In any aspect the work light may include an elongate handle operatively connected to the head section. The handle may extend away from the head section outside a volume bounded by the width and height of the head section such that the handle does not increase the depth of the work light in that volume.

The work light may include an elongate handle having a longitudinal axis, wherein the handle is operatively connected to the head section, and wherein the longitudinal axis that extends through the head section in a direction generally perpendicular to the beam axis.

The handle may be generally cylindrical and extend from the head section generally perpendicular to the central beam axis. The handle may have a diameter that is less than the width of the head section. The depth of the head section may be less than the diameter of the handle.

In a seventh aspect the invention provides a work light including at least one LED and an LED mounting member to which the at least one LED is mounted, and the at least one LED emits light about a central beam axis, a heatsink thermally connected to the at least one LED, and a casing within which the at least one LED and an LED mounting member and heatsink are mounted. In this aspect the casing includes a handle section and a head section. The casing has two casing portions that prior to assembly allow the insertion of the at least one LED and an LED mounting member and heatsink into one of the casing portions, and after assembly the casing portions together form the handle section and head section, and the head section has a transparent cover through which light emitting from the at least one LED can escape the casing.

In an eighth aspect the invention provides a work light including a high power LED that requires a heatsink for operation in a normal working environment while preserving a useful life in prolonged use, a heatsink for use with the LED to preserve useful working life of the LED when operated in prolonged use, a casing of a substantially electrically non-conductive material substantially enclosing the LED and heatsink such that components inside the casing are prevented from accidental contact with an operator, a transparent cover in the casing through which a beam from the LED can escape the casing along a beam axis. In this aspect the heatsink and the LEDs together occupy a dimension generally parallel to the beam axis, the casing has a head section and a handle section, and the LEDs and heatsink are in the head section. The head section has an elongate profile that is smaller in a dimension generally parallel to the beam axis of the light than in any dimension generally perpendicular to the beam axis, the handle is elongate and extends away from the head section, and the handle extends away from the head section outside a volume bounded by the dimensions of the head section generally perpendicular to the beam axis such that the handle does not increase the depth of the head section generally parallel to the beam axis within that volume.

In any of the aspects the at least one light emitting diode may nominally have a lambertian radiation pattern. Where the work light has a convex lens, the lens may have both a convex surface and a concave surface. The diameter of the concave surface may be smaller than that of the convex surface. The concave surface may be curved more sharply towards its edge than towards its center. The concave surface may be flat in its center.

In various other aspects a work light may include a handle, a light head section, and one or more light emitting diodes. The handle and the light head may be comprised in a one piece structure that may be tubular. The light emitting diodes require heatsinking means and a heatsink is provided in the light head. The heatsink may be a semicircular tube or a channel piece. The work light may produce a beam that is 40 to 90 degrees wide. Most high power LEDs, produce beams that are more than 90 degrees wide and optical devices are provided to concentrate the light into a narrower and more intense beam. The optical devices may be "optical pieces" that are made of plastic and use both refraction and reflection to concentrate the light into a beam. These optical pieces may have a forward surface that is flat or curved or conical and that light exits the optic through. The forward surface of the optical piece may or may not be textured with ridges, a random pattern, or other form of texturing. These optical pieces may have a rear reflective surface that may be flat, curved or conical. The rear reflective surface of the optical pieces may or may not be textured with ridges, a random pattern, or other form of texturing. Any surface of the optical pieces may be divided into regions that differ in shape and/or texturing or lack thereof. The optical pieces may be made of plastic and may be molded. The reflecting rear surface of the optic normally may reflect the light by total internal reflection but alternatively may be coated with a reflective material. The optical pieces may be used to produce beams 40 to 90 degrees wide. Alternatively, two or more light emitting diodes that produce excessively narrow beams may be aimed into different directions to achieve an adequately wide beam.

Alternatively, convex lenses may be used to produce the desired beam from the LEDs. Any convex lenses may be hemispheres or aspheric planoconvex lenses. Any convex lenses may be concavoconvex, symmetric biconvex or asymmetric biconvex. Any curved surfaces on any lenses may be spherical or aspheric.

The work light may have a ballast that accepts line voltage AC and provides suitable DC with limited or regulated current for the light emitting diodes. The ballast may be an electronic switching current regulator. The ballast may be designed to work from a wide range of AC voltages and may work both at 120 volts and at 240 volts. The ballast may work with direct current over a wide range of voltages and may work with DC of voltage as low as 12 or 12-14 volts. Alternatively, the work light may work only from low voltage DC. The work light may contain batteries. The batteries may be rechargeable. The work light may contain a battery charger. The work light may use inductive coupling from an external source of power in order to recharge any rechargeable batteries. The work light may contain other parts such as a paging receiver to assist location of the work light, indicator lights such as a battery status indicator, and automated means to shut down the work light should unfavorable conditions such as excessive temperature or low battery voltage occur.

The work light may contain batteries and also be able to be operated from a detachable power cord. The work light may be able to have rechargeable batteries within it charged while it is operating when receiving power from a detachable power cord. The work light may be able to be operated from more than one different power cord and associated adapter. The different power cords and associated adapters may permit the work light to receive power from power sources of different voltages, including 12 or 12-14 volts DC and line voltage AC.

The work light may contain rechargeable batteries that can be recharged by placing the work light into a charging station. The charging station may also be able to charge a second battery set. The charging station may be able to simultaneously charge a work light having rechargeable batteries and a second battery set. The charging station may have a paging transmitter.

The work light may be mountable on a tripod. Tripods may be made suitable for mounting the LED work light onto. Such tripods may have means of providing power to the work light or charging rechargeable batteries within the work light. A stand other than a tripod may be used in lieu of such a tripod.

The work light may have a power cord and means to allow it to rotate without twisting the power cord. The work light may have a cord and means for accomplishing switching via a remote switch by pulling on it. The work light may have other remote switching means. The work light may have a cord that retracts into a reel.

Other aspects of the invention including for example methods of use will be evident from the detailed description hereof.

BRIEF DESCRIPTION OF THE DRAWINGS

For a better understanding of the present invention and to show more were clearly how it may be carried into effect, reference will now be made, by way of example, to the accompanying drawings which show the preferred embodiment of the present invention and in which:

FIG. 22 is a frontal view of the work light of FIG. 21, FIG. 23 is a side view of the work light of FIG. 21, FIG. 24 is a rear view of the work light of FIG. 21, FIG. 24a is a top view of the work light of FIG. 21.

DETAILED DESCRIPTION OF THE PREFERRED EMBODIMENT

Figure 1:
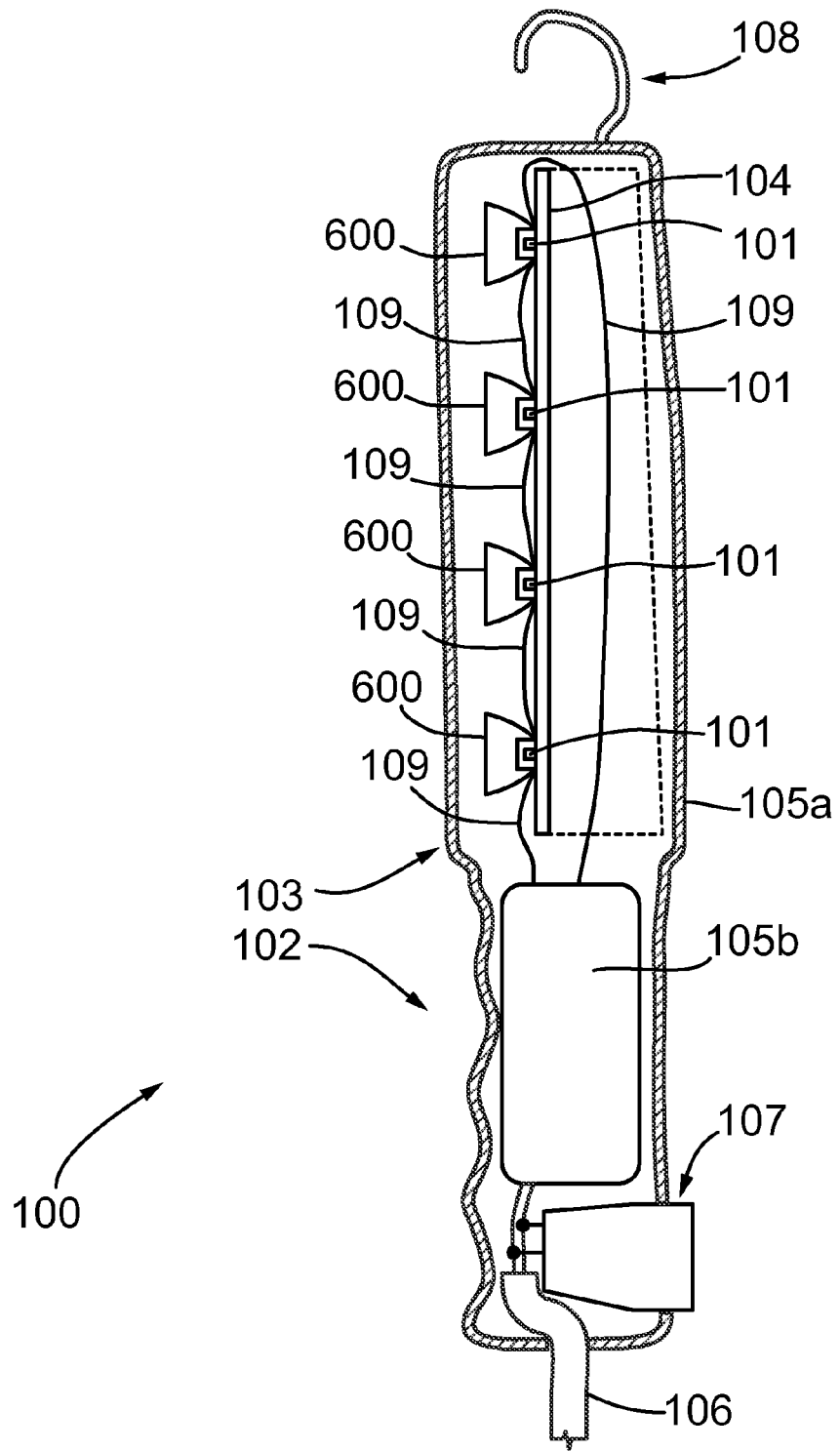
FIG. 1 is a cross sectional side view of a work light in accordance with a first embodiment of the present invention.
Figure 2:
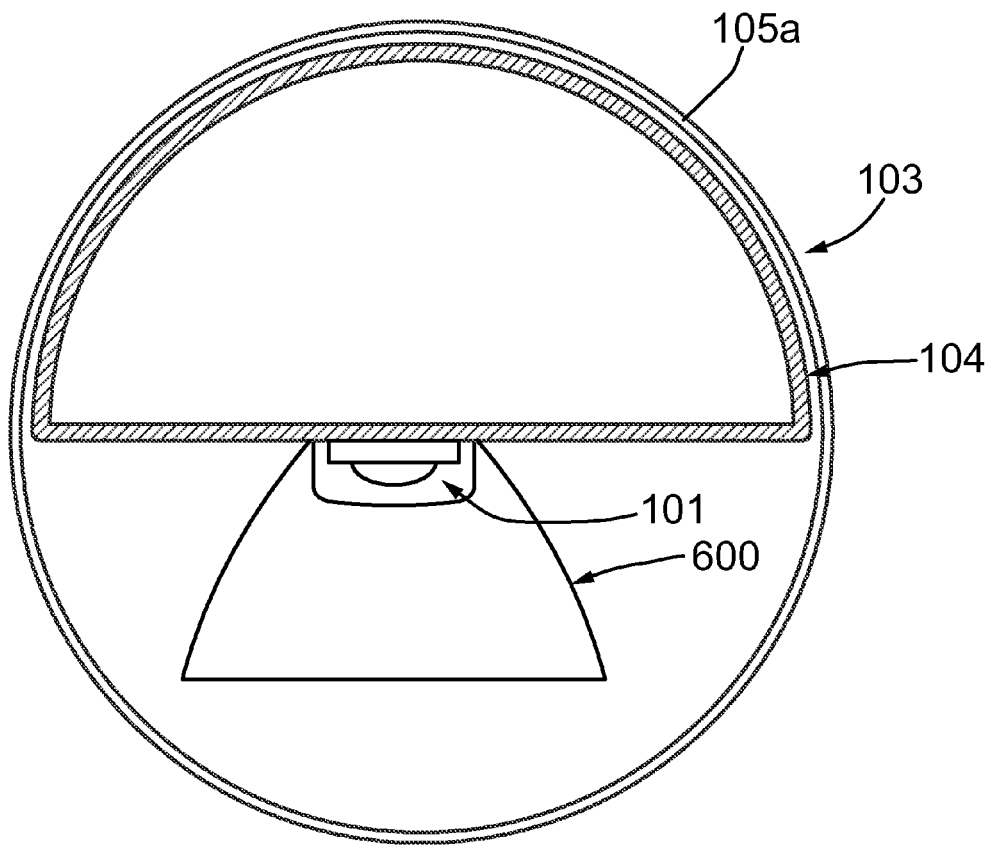
FIG. 2 is a cross sectional top view of the work light of FIG. 1.

Referring to FIGS. 1 and 2, a work light 100 has a handle 102 and a light head 103 that houses an LED heatsink 104. The LED heatsink 104 has LEDs 101 mounted on it. The LED heatsink 104 as shown is in the shape of a semicircular tube, which may or may not be constructed of a single piece of metal. The semicircular shape (best evident in FIG. 2) permits the heatsink 104 to be in contact with or very close to the structural material of the light head 102 so that heat can more easily escape into the environment through the structural material of the light head 102. Alternatively, the heatsink 104 may be of a different shape or more than one heatsink may be used.

The handle 102 and the light head 103 may be comprised in a single outer casing 105a. Such a single outer casing 105a may be tubular in shape and made of transparent plastic such as acrylic or polycarbonate. Such a tubular outer casing 105a may have a semicircular tube shaped version of the heatsink 104 contained in a manner such that the curved surface of such a semicircular tubular heatsink 104 is either fitted against or close to the outer casing 105a so that heat easily escapes from the heatsink 104 through the outer casing 105a into the environment. Alternatively, a semicircular tubular heatsink 104 may merely be adjacent to or close to a substantial portion of an inner surface of the light head 103. Should the heatsink 104 be fitted essentially within the light head 103, it may have one or more extensions or protrusions that protrude into the handle 102. Extensions of the heatsink 104 would generally be desirable to assist in dissipation of heat produced by the LEDs 101, although other reasons may be found for extensions of the heatsink 104.

The use of a electrically insulative material, such as plastic, for casing 105a is advantageous when working in many environments, such as an automotive shop, where an externally conductive casing may provide an undesired conduction path for items with which it comes into contact. An electrically conductive casing 105a could, for example, cause a short circuit between exposed terminals in an engine compartment.

The LEDs 101 are preferably of a high power type that typically requires use of a heatsink. The LEDs 101 may be supplied with heatsinks that may be adequate or may require additional heatsinking means. LEDs 101 that require heatsinking may have heatsink slugs or other surfaces that are intended to be attached to a heatsink. It is foreseeable that alternative LEDs such as ones that are heatsunk through any of their leads can be used, such as "high flux" or "spider" LEDs.

The LEDs 101 are shown as disposed in a linear fashion and aimed in the same direction. In order to get a light output pattern that covers sufficient area to be useful, the LEDs 101 must have wider beams than are provided by many existing LEDs such as typical Lumileds™ Luxeon™ with optics LEDs. AS an example, the LEDs 101 may be Lumileds Luxeon types with an alternative optical piece 600 that forms a wider beam of light from the LED 101 than is formed by the usual optical pieces supplied with the LEDs 101 by the manufacturer. A useful beam width would preferably be at least 40 degrees wide but no more than 90 degrees wide. Beam width is measured across the diameter of the beam in the case of a circular or near circular beam.

Beam width of a work light is the width of that portion of light emitted from the work light that contains light that is adequate for use in working for prolonged periods. It is possible that the work light may produce stray light outside the beam width; however, this light is generally wasted for the purpose for which the work light is intended. The beam width is typically expressed as an angle from the work light source of light.

Without limiting the generality of the above, an indication of beam width can be an angle from the work light source of light that defines a beam circumference where the light intensity is half the light intensity of the brightest part of the beam. LED manufacturers often use this definition for determining the viewing angle of LEDs. Typically the brightest part of an LED beam is at its center; however, some LEDs have holes or dim spots at the center.

This provides a "floodlight" beam that is wider than the approximately 10 degree wide beams of the usual Lumileds™ Luxeon™ with optics LEDs, wider than the beams of existing LED work lights of the Ferret™ brand, but more concentrated than the radiation patterns produced by Lumileds Luxeon LEDs that are not combined with added optical devices. A beam width of 40 to 90 degrees is wider than that of at least some models of the Ferret brand, but narrower than that of Lumileds Luxeon LEDs without added optics. Lumileds LEDs without added optics tend to have a radiation pattern at least 110 degrees wide, and it has been found desirable to concentrate the radiation into a beam that is narrower than 110 degrees and more intense.

Thus, the optics described herein can be selected to change the beam width of the LED(s) within a range at least 40 degrees wide and not more than 90 degrees wide, for example the optics may be selected to either widen the beam width of an LED that has a beam width less than 40 degrees or concentrate the beam width of an LED that has a beam width greater than 90 degrees. In addition, the optics described herein can be selected to change the light density across the beam width to create a more uniform light density. Furthermore, the optics can be selected to change the beam edge sharpness of an LED, for example to provide a sharper beam edge or a blurrier beam edge. Although the optics described herein will not normally project a focussed image of an LED or any part thereof, it is possible to provide optics that will provide such a focussed image.

Alternative types of LEDs 101 may form a beam that is 40 to 90 degrees wide without additional optics. Such LEDs include Nichia's NCCW022. Although such LEDs may have a beam whose width is desirable, it may be found beneficial to add optics even if the beam width after use of such optics is 40 to 90 degrees. For example, optics may be added to achieve a sharper edge of the beam since a beam with a sharper edge can provide a sensation of greater illumination than a beam with a blurred edge does. On the other hand, a beam with a sharp edge may be considered disadvantageous by having the sharp beam edge distract a user of the work light from seeing objects to be illuminated by the work light, in which case it may be desirable to blur the edge of the beam. The beam produced by the LEDs may have a color nonuniformity that may be correctable by additional optics. It may be found desirable to use additional optics to change the width of the beam even if the beam width both with and without additional optics is in the range of 40 to 90 degrees. It may be found desirable to change the light distribution within the beam even if the size of the beam is not changed, for example, if the beam without additional optics has a central "hot spot", a central "dim spot", or an edge that is brighter than other parts of the beam. Optics, particularly those that produce a sharp edge, can result in very limited light outside the desire beam width.

Although all of the LEDs 101 in the preferred embodiment of the work light 100 are white LEDs 101, other LEDs can be used. For example, a combination of red, green and blue LEDs may be used so that their individual outputs combine to form white light or a usably whitish light. It may be necessary to add diffusing means in order to mix the individual LED outputs adequately to obtain white light. White light obtained from mixing red, green and blue light may have an advantage over the light obtained from white LEDs since such a mixture of primary colors can have enhanced color rendering. Furthermore, a combination of colored LEDs may have greater luminous efficacy than that of white LEDs. Combinations of colored LEDs other than red, green and blue may be found to be usable to produce white light so as to be usable in alternative embodiments of the present invention. For example, blue and green LEDs may be combined with orange or amber or yellow LEDs in a way to produce light that appears white. Combinations of two colors such as red and cyan, orange and greenish blue, yellow and blue, or greenish yellow and either violet or a violetish shade of blue can produce light that appears white. However, such light that appears white but formed from only two colors normally has color rendering properties worse than those of white light obtained by other means. Colored LEDs of more than three distinct colors may also be combined to produce white light. One or more white LEDs can be combined with one or more colored LEDs for purposes such as achieving a different shade of essentially white light. A combination of colored LEDs that can be used to produce essentially white light may be combined with one or more white LEDs.

White LEDs traditionally have produced a slightly bluish white light having a correlated color temperature typically near 6000 Kelvin. However, LEDs are becoming available in other shades of white, such as a "warm white" having a correlated color temperature typically near 3500 Kelvin.

The work light 100 may use a "warm white" version of the LEDs 101 or a combination of LEDs 101 that produce different shades of an essentially whitish color, although it is presently preferred to have all of the LEDs 101 of the same color and of a correlated color temperature at least 4000 Kelvin. Light of higher correlated color temperatures has more light of the blue and blue-green wavelengths that are favorable to scotopic vision, and this leads to a greater sensation of illumination in dim and moderately dim areas.

A white LED is typically one having a blue-emitting LED chip with indium gallium nitride active layer chemistry and a phosphor that converts some of the blue light to light that has a yellow overall color and a spectrum that extends from green through red. Some of the blue light from the LED chip passes through the phosphor unutilized, and combines with the yellow light from the phosphor to produce white light. Many of such white LEDs produce light that is not uniform in color throughout the radiation pattern of such LEDs. Some other white LEDs have a radiation pattern that is reasonably uniform in color, but have the area that the light is emitted from being nonuniform in color, and this can result in a beam that is not uniform in color if optics are used to form a beam from such LEDs. Some Lumileds Luxeon white LEDs have phosphor applied adequately evenly over their LED chips with no phosphor that is on surrounding surfaces, and this has solved color nonuniformity problems. There are other white LEDs, such as ones having chips made of zinc selenide, but these are presently not preferred since they have poor color rendering properties and tend to produce beams that are nonuniform in color.

Although the preferred embodiment of the work light 100 produces white light, it may be found desirable to produce alternative embodiments that produce non-white light. For example, a variation of the work light 100 that produces narrowband yellow or orange/yellow light or red light may be found useful as a portable light source in an area being used as a darkroom.

It may be found desirable to operate the LEDs 101 with a magnitude of current other than that which the LEDs 101 are rated for. For example, use of a magnitude of current that is in excess of the ratings of the LEDs 101 may be desirable if cost savings are realized by using a smaller number of LEDs 101 and the life expectancy remains tolerable. By further example, a lower current may be useful since indium gallium nitride LEDs often have increased efficiency when operated at lower currents. The efficiency of an InGaN LED can increase as current is decreased until the current is as low as 10 percent or less of the LED's maximum rated current. InGaN LEDs operated at currents anywhere from 10 percent to 60 percent of their maximum rated continuous current typically achieve efficiency significantly greater than their efficiency at their maximum rated continuous current. As an example of usage of LEDs 101 at a magnitude of current much less than their maximum continuous current rating, Lumileds Luxeon III™ LEDs that have performance specified at 700 milliamps and a maximum rated current of 1 ampere may be used with a current near 350 milliamps. Furthermore, if an LED work light 100 was originally constructed with or designed to use LEDs 101 that have a maximum rated current of 350 milliamps, then the original LEDs 101 can be replaced with Lumileds Luxeon III LEDs to achieve an increase in efficiency.

A ballast 105b is provided in the handle 102 to regulate the current flowing through the LEDs. The ballast 105b and any other ballast described herein may also be referred to as an "LED driver circuit". The ballast 105b preferably a switching current regulator. Alternatively, the ballast 105b may be an inductor or a capacitor combined with a bridge rectifier, or a step-down transformer combined with a rectifier and current limiting means such as a resistor. The ballast 105b may be provided in a location other than in the handle 102.

The ballast 105b receives power from a line cord 106. An outlet 107 may be provided so that users of the work light 100 can plug tools or other appliances into it.

Providing means such as those described above to operate the work light 100 from line voltage AC is a desirable improvement upon existing LED work lights so that line voltage AC can be fed into the work light 100 and an AC outlet can be contained in the work light 100. As with many other features that can be used in other embodiments described herein, this feature can be used with other AC versions of the LED work lights described herein.

Variations of the work light 100 may be equipped with both a line cord and means to accept power from a battery since the ballast 105b can be made to work from low voltage DC as well as with line voltage AC. The line cord 106 or the means to accept power from a battery or both may be removable. Adapters may be provided for connecting the work light 100 to various sources of power. The line cord 106 may have a plug (not shown) that is suitable for receiving line voltage AC. Alternatively, the line cord 106 may have a different plug such as a plug that fits in automotive cigarette lighter sockets so as to be suitable to receive power from a DC source, such as a 12 or 12-14 volts DC source, or the plug may be clips that connect directly to an external DC source, such as an automotive battery. Power supplies that produce low voltage DC from line voltage AC and that have an automotive cigarette lighter socket may be found convenient for powering any LED work light 100 that operates satisfactorily from 12 or 12-14 volts DC. Power supplies suitable for supplying power to the work light 100 and having an automotive cigarette lighter socket may have a circuit breaker or other means for protecting such a power supply from any application of an excessive load, which an automotive cigarette lighter may be.

A hook 108 is preferably provided to hang the work light 100 from automobile hoods or other elevated objects. Additional hooks and/or additional hanging means may be provided to permit hanging the work light 10 in a variety of positions.

The work light 100 and other embodiments of the present invention may include additional parts not shown such as switches for some or all of the LEDs and/or the outlet, dimming means for the LEDs, and one or more indicator lights. Said indicator lights may indicate presence of low voltage DC within the ballast 105*b*, reception of line voltage AC by the work light 100, or other functions or malfunctions.

Wiring 109 between the LEDs 101 and to the LEDs from the ballast 105*b* is shown.

Figure 3:
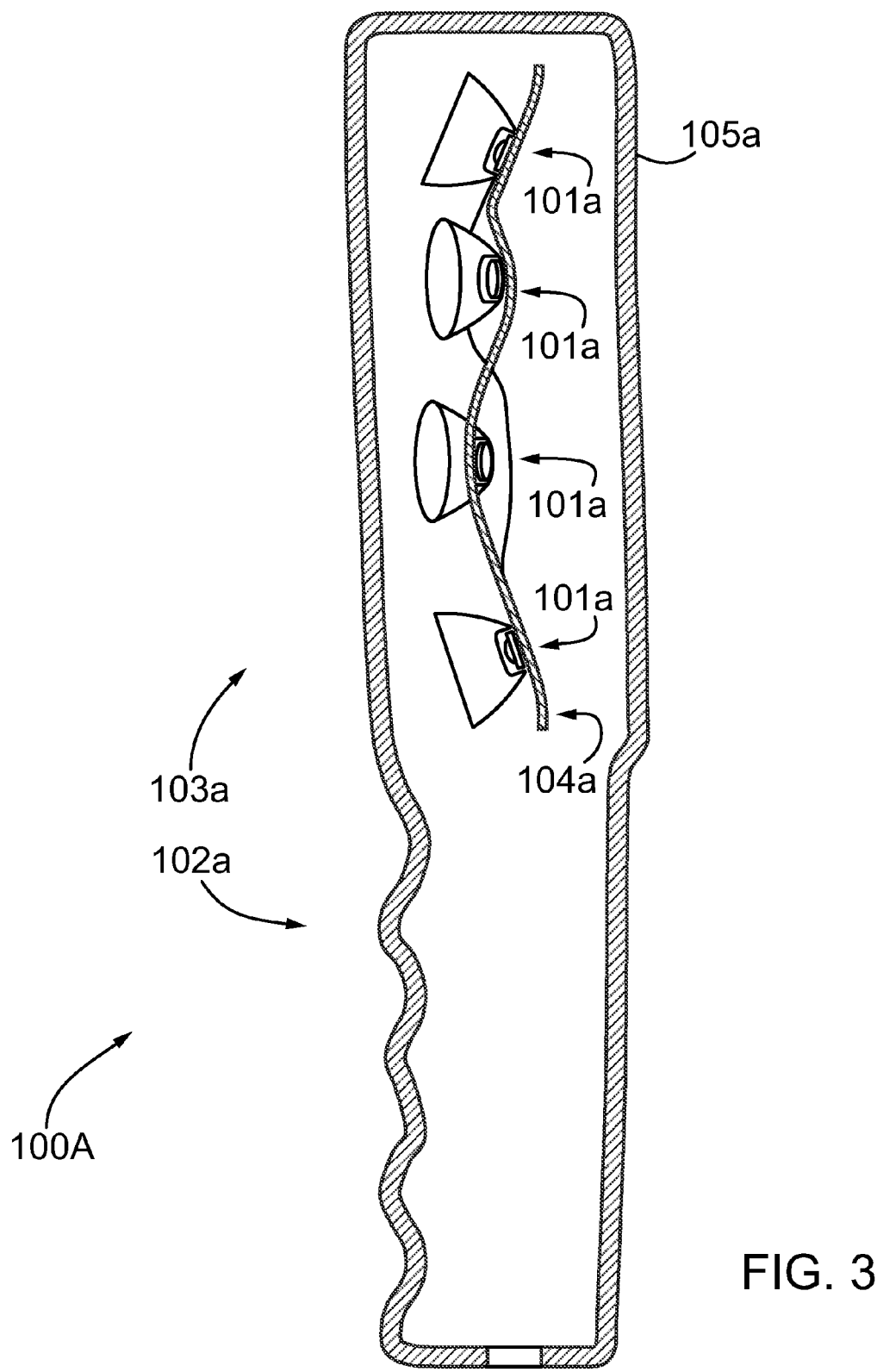
FIG. 3 is a cross sectional side view of a work light in accordance with a second embodiment of the present invention.

Referring to FIG. 3, an alternative embodiment of the present invention is the work light 100*a* that has an LED heatsink 104*a* that has a mounting surface shaped to aim the LEDs in different directions in order to achieve a beam of desirable width, such as 40 to 90 degrees. The LEDs 101*a* have narrower beams than do the LEDs 101 shown in FIG. 1. In lieu of a single heatsink 104*a* that has a mounting surface that causes the LEDs 101*a* to be aimed into different directions, the LEDs may have individual heatsinks so that a single heatsink 104*a* with a specially shaped mounting surface is not required.

The LEDs 101*a* may be of a type with optics added, such as Lumileds Luxeon with Optics, which typically have beams 10 to 20 degrees wide. The LEDs 101*a* may be of a type without additional optics such as Nichia NCCW023, which have beams 35 degrees wide. Optics may be added to adjust characteristics of the beam produced by the work light 100*a* even if the width of the beam produced by the work light 100*a* is 40 to 90 degrees without additional optics.

Like the LEDs 101 described above, the LEDs 101*a* are preferably white LEDs.

The outer casing 105*a* is shown, comprising a light head section 103*a* and a handle section 102*a*. For ease of description other parts shown in FIG. 1 including ones necessary for this alternative work light 100*a* to operate are not shown.

Other alternative embodiments may have alternative means of diverting the beams from each of the LEDs 101*a* into slightly different directions even if the LEDs are mounted on a flat heatsink, such as prisms placed forward of some or all of the LEDs 101*a*.

A beam that is oblong may be found desirable. Having the LEDs 101*a* aimed into different directions can achieve an oblong beam. For example, some of the LEDs 101*a* may be tilted vertically while none of the LEDs 101*a* are tilted horizontally in order to achieve a beam whose vertical width is greater than its horizontal width. A desirable oblong beam can have both vertical and horizontal width in the range of 40 to 90 degrees. Other means of achieving an oblong beam are possible in other embodiments of the present invention, such as use of LEDs that produce oblong beams or use of optics that form oblong beams from LEDs that otherwise do not produce oblong beams.

Figure 4:
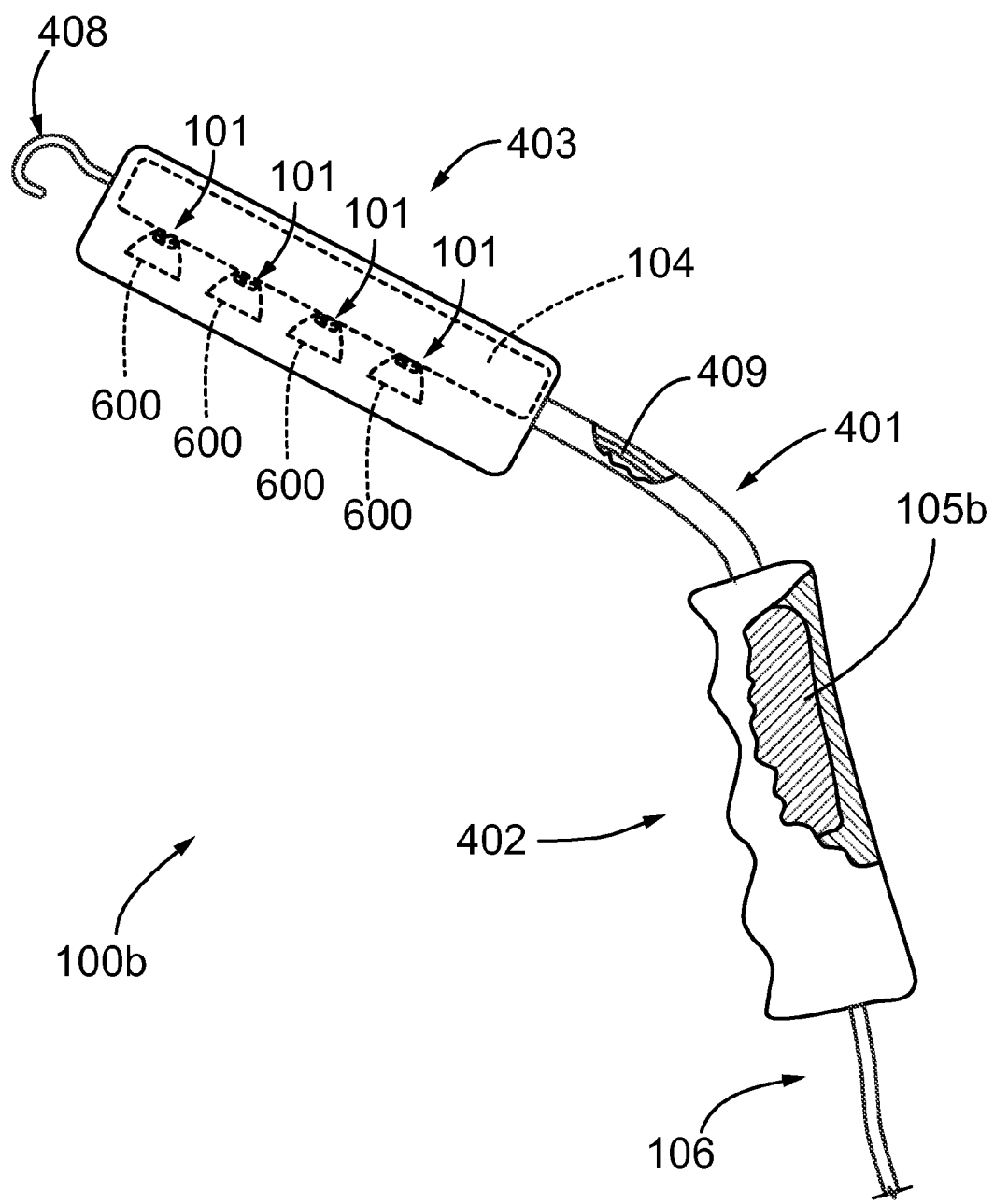
FIG. 4 is an external view of a work light in accordance with a third embodiment of the present invention.

Referring to FIG. 4, a further alternative work light 100*b* has a distinct light head 403 and handle 402 connected to each other by a flexible tube 401. When the flexible tube 401 is straight, it has an axis shared with that of the light head 403. The light head 403 contains LEDs 101 and associated optical pieces 600 and a heatsink 403 arranged such that light is produced from one side of the light head 403.

Although the tube 401 is flexible it may be rigidly flexible such that a user can manipulate the light head 403 with respect to the handle 402 in order to position the light head in a given direction and release the light head so that it maintains that position during use. An articulated tube 401 may be useful for this purpose.

Wires 409 necessary for operating the LEDs 101 pass through the flexible tube 401. preferably an electronic ballast 105*b* is provided to operate the LEDs 101 from AC line voltage. The electronic ballast 105*b* is shown as being in the handle 402 but it may be provided in the LED head 403 or elsewhere.

A hook 408 is provided on the light head 403 to hang the work light 100*b* from suitable elevated objects. Additional hanging means may be provided on the work light 100*b*.

Even further alternative embodiments may have a distinct light head 403 and handle 402 connected by a non-flexible tube or a combination of one or more flexible tubes 401 and one or more non-flexible tubes.

Electrical components or devices necessary for operation of the LEDs may be provided outside the work light 100*b*.

Figure 5:
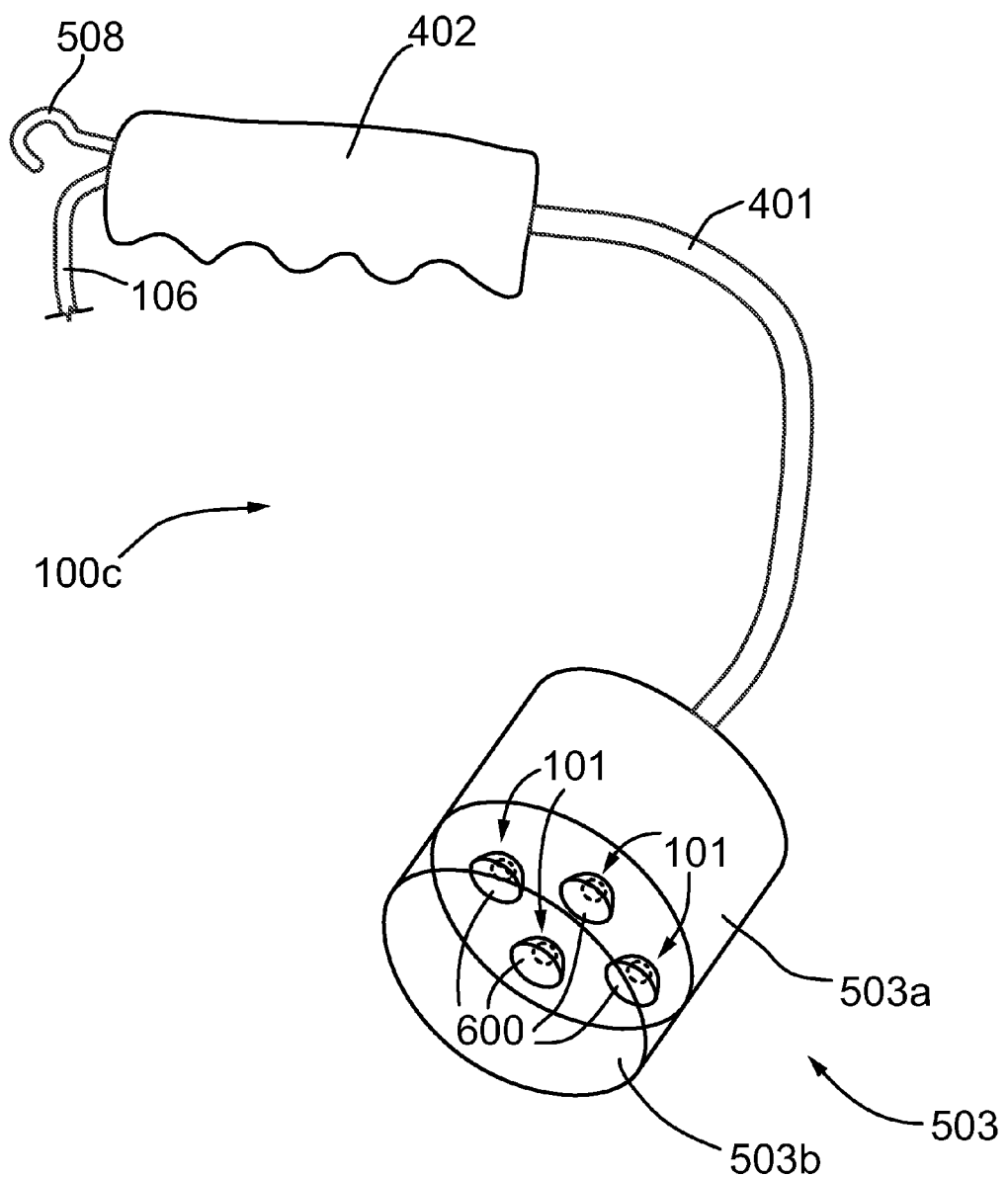
FIG. 5 is an external view of a work light in accordance with a fourth embodiment of the present invention.

Referring to FIG. 5, an additional further alternative embodiment of the present invention is a work light 100*c* that has a flexible tube 401, a handle 402 and a light head 503 that is different from those shown in FIGS. 1, 3 and 4 that where the LEDs 101 and their associated optical pieces are mounted generally perpendicular to the axis of the light head. The light head 503 has LEDs 101 and their associated optical pieces 600 mounted with their axes generally parallel to the axis of the light head 503.

The light head 503 has a metal body piece 503*a* that serves as a heatsink for the LEDs 101. A transparent cover/lens assembly 503*b* is provided to protect the LEDs 101 from impacts.

A hook 508 is provided at the base of the handle so that the work light 100*c* can be hung with the light head 503 pointing downwards. An additional hook (not shown) may be added to the light head 403. This may be especially useful as the light head 403 produces light in a direction perpendicular to its axis and downwardly projecting light is useful in many circumstances when a work light is hanging, such as for example from under an automotive hood. Other hooks or hanging means may also be provided. A line cord 106 is connected to the handle 402, although if desired the line cord could be connected to the light head to create alternative embodiments based on the principles described herein.

Again, necessary electrical connections and components necessary for operating the LEDs 101 are not shown in the work light 100*c*.

The handle 402 may be replaced by an alternative structural member such as a base that the hook 508 is attached to. The ballast, such as ballast 105*b* from other FIGS. may be contained anywhere within the work light 100*c*.

In work lights 100, 100*a*, 100*b*, 100*c*, four LEDs 101 are shown. A different number of LEDs may be used.

Figure 6:
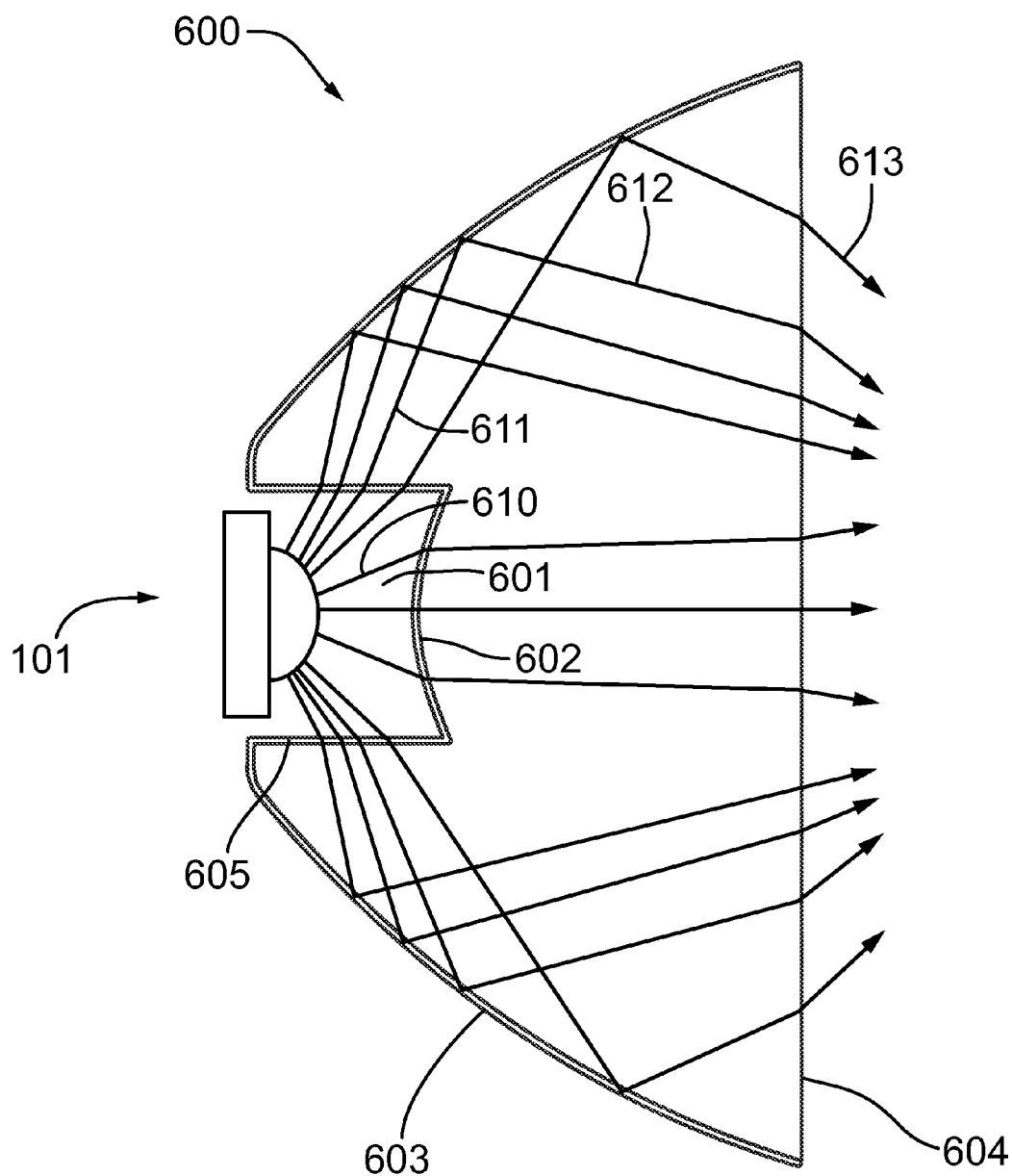
FIG. 6 is a cross section view of an optical piece used in some embodiments of the present invention.

Referring to FIG. 6, in the preferred embodiment of the present invention light from each of the LEDs 101 is partially collimated into a beam preferably between 40 and 90 degrees wide by an optical piece 600. This optical piece 600 uses both total internal reflection and refraction to achieve this beam characteristic.

Similar optical pieces have been in use for years, but they are usually made to collimate the light into a narrower beam generally 20 degrees wide or narrower.

The optical piece 600 is preferably molded from a transparent plastic such as acrylic. Alternatively, it may be machined. Further alternatively, it may be made of a material other than moldable plastic or a material other than plastic such as glass. Preferably, the optical piece 600 is essentially paraboloidal in shape. The optical piece 600 preferably has a hollow internal region 601 that is cylindrical in shape. A dome 602 at the end of the hollow cylindrical region 601 collects and partially collimates some of the light 610 from the LED 101. Alternative embodiments of the present invention may have this surface of a shape different from that of the dome 602. A curved surface here may be substituted with a combination of different surface shapes including but not limited to truncated conical surfaces and/or flat facets that may approximate a curved surface.

Most of the light 610 from the LED 101 is collected by the surface of the hollow cylindrical region 601's side surface 605, and the direction of this light changes to a direction less parallel to the axis of the optical piece 600 as a result of refraction. Afterwards, this refracted light 611 is reflected into a largely forward direction by the rear surface 603 of the optical piece 600. The rear surface 603 will normally reflect the light via total internal reflection and normally does not require a reflective coating, but in alternative embodiments a reflective coating may be added to the rear surface 603. Such a reflective coating may be metal such as aluminum, silver or the reflective coating may be a nonmetallic coating such as multiple layers of nonmetallic "dielectric" material. Further alternatively, a reflector can be added behind the optical piece 600 if total internal reflection fails to reflect some light.

Most of the reflected light 612 is reflected into directions such that the light converges towards the axis of the optical piece 600. This light then exits the optical piece 600 through the forward surface 604, where refraction increases the converging tendency of this light. The forward surface 604 is shown as a flat surface, but the forward surface may be convex, concave, or of a different shape. The exiting light 613 diverges from the optical axis of the optical piece 600 after passing through a region forward of the optical piece 600 where the exiting light 613 is most converged.

It is foreseeable that in lieu of the optical piece 600 other optical means to concentrate the light from an LED 101 can be used, such as a concave mirror or a convex lens. Such a convex lens may be biconvex or planoconvex or it can have a different convex shape. Such a lens may be a Fresnel lens.

The optical pieces typically used with Lumileds Luxeon LEDs are typically approx. 18 to 20 millimeters in diameter. The optical piece 600 may be of this size or it may be of a different size. A smaller size of the optical piece 600 can be achieved since the optical piece 600 does not have to produce as tightly collimated a beam as is achieved from the usual optical pieces for Lumileds Luxeon LEDs.

Figure 7:
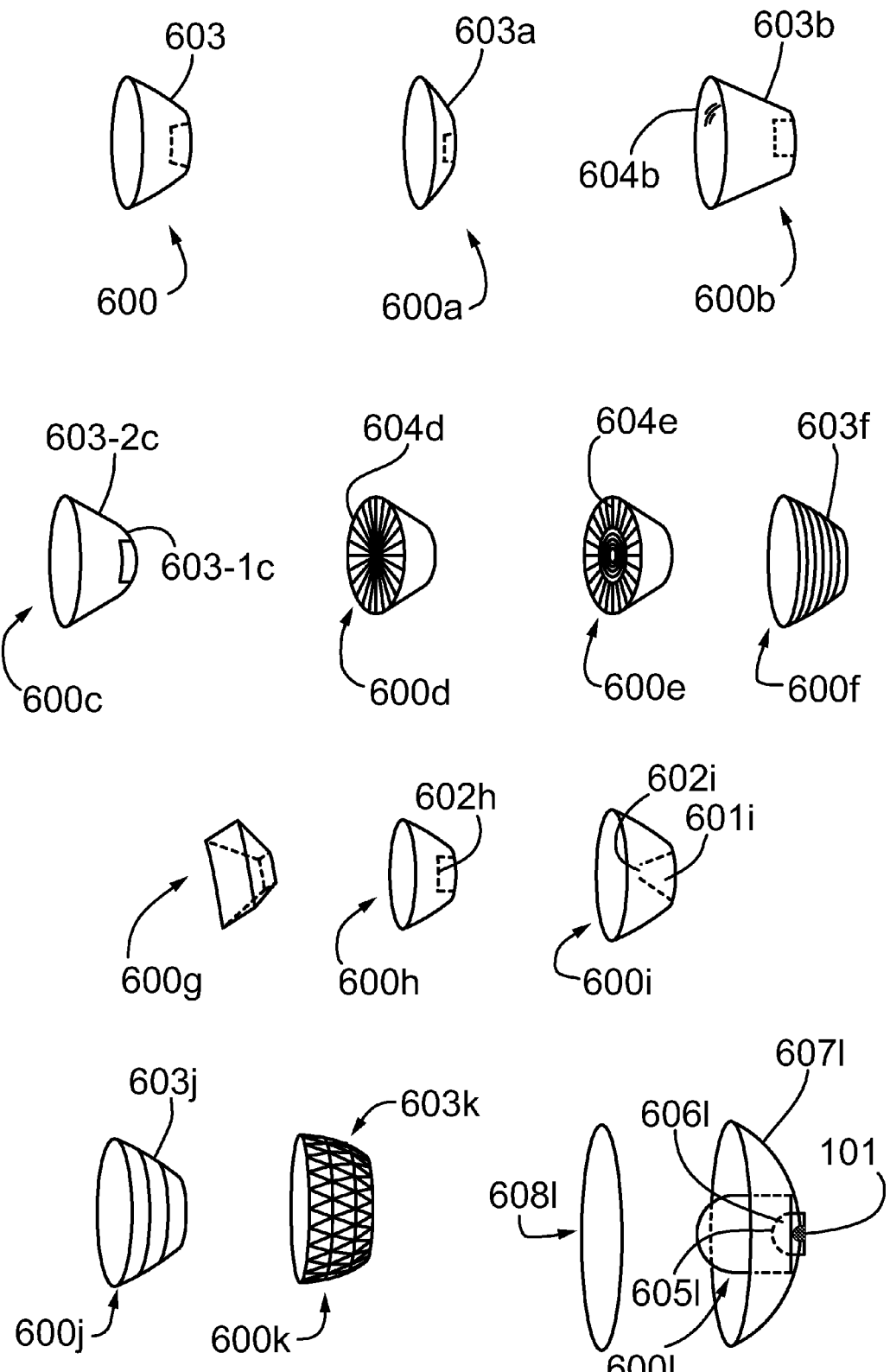
FIG. 7 is a set of external views of alternative optical pieces that may be used in various embodiments of the present invention.

Referring to FIG. 7, there are numerous possible variations in the design of the optical piece 600.

The preferred embodiment of the optical piece 600 has a nearly paraboloidal rear surface of such shape that light is reflected forwards but not collimated into as narrow a beam as possible. The light is "overconvergent", such that it converges into a small region that is a small distance forward of the optical piece 600 and diverges at the desired rate after passing through this area of maximum convergence.

A first alternative optical piece 600a has a curved rear surface 603a designed to form a diverging beam as opposed to a beam that initially converges and then diverges past a point where it is most converged. The necessary difference in shape between the preferred optical piece 600 and the first alternative optical piece 600a is that the rear surface 603a of the first alternative optical piece 603a tapers more quickly than does the rear surface 603 of the preferred optical piece 600.

A second alternative optical piece 600b has a convex forward surface 604b and a conical rear surface 603b. Other alternative embodiments of this optic may have a conical rear surface combined with a curved forward surface to achieve the desired radiation pattern. The forward surface may be convex or concave. The forward surface may be convex in some areas and not convex in other areas. The forward surface may be concave in some areas and not concave in other areas. Further alternatives of this optic can be made with both the forward surface and the rear surface curved. Curved surfaces may have a spherical shape or another shape such as paraboloidal or hyperboloidal.

A third alternative optical piece 600c has part of its rear surface 603-1c in a nearly paraboloidal shape and part of its rear surface 603-2c conical in shape. Other alternative embodiments of this optical piece 600c can have a rear surface of a different shape. Such other alternative embodiments of this optical piece 600c can have a rear surface divided into regions that have different shapes, such as one region being conical and another region having a spherical curvature. The forward surface in optical piece 600c is flat, but alternatively it may be convex or concave. Further alternatively, part but not all of the forward surface may be convex and part but not all of the forward surface may be concave.

Curved regions of the forward surface may have a spherical or nonspherical curvature shape.

A fourth alternative optical piece 600d has a shape designed to produce a beam that is more collimated than desired, but its forward surface 604d is textured to diffuse the beam so as to make it diverge at the desired rate. The forward surface 604d may have a random texture. Alternatively, the forward surface 604d may have a distinct pattern of said texture, such as radial ridges (as shown) or concentric ridges. Such ridges may have various shapes such as triangular or cylindrical.

A fifth alternative optical piece 600e has a forward surface 604e divided into regions that have different texture patterns. These regions may be concentric as shown or they may be arranged differently. The different forward surface texture patterns may comprise one concentric region with radial ridges and another with concentric ridges as shown, but different texture patterns including but not limited to one or more random texture patterns may be used. Alternatively, some of the forward surface may not be textured. Further alternatively, part or all of the forward surface may be curved and part or all of the forward surface may be textured.

A sixth alternative optical piece 600f has texturing of the rear surface 603f to make the beam less collimated. Alternatively, only part of the rear surface is textured. Further alternatively, texturing can be used on part or all of the rear surface 603f in combination with texturing of part or all of the forward surface. Various combinations of surface curvature and texturing may be found to produce a desirable beam. The texturing may be concentric ridges as shown or in another form such as radial ridges, a different non-random pattern, or a random texture pattern on the rear surface 603f.

A seventh alternative optical piece 600g has a shape that does not have rotational symmetry about an optical axis. This alternative optical piece 600g as shown has a pyramid shape. The surfaces shown are shown as flat but alternatively part or all of any surface may be curved or textured or both curved and textured. Other shapes are possible, such as a cone that is elongated in a direction perpendicular to its optical axis so that it has an elliptical shape.

An eighth alternative optical piece 600h has a flat region 602h in lieu of the dome 602 of the preferred optical piece 600.

A ninth alternative optical piece 600i has the hollow tubular region 601i tapered. The taper may be straight (as shown), curved, or having both straight and curved portions, or more than one portion that tapers straightly at different rates. Part of the hollow tubular region 601i may be not tapered. The hollow tubular region 601i may or may not (as shown) be tapered to a point that precludes an end surface 602i of the hollow tubular region 601i.

A tenth alternative optical piece 600j can have part or all of its rear surface 603j in the form of a series of truncated cones that have different included angles so as to simulate a curved surface. Other surfaces of the optical piece may have a compound curve substituted with a series of truncated conical surfaces.

An eleventh optical piece 600k may have part or all of any of its surfaces effectively curved by an arrangement of facets. Any faceted surface may be divided into concentric circular areas (as shown) or other areas that have different facets. As shown, facets are used to simulate curvature of the rear surface 603k.

Alternative embodiments of the optical piece 600 may incorporate any combination of the above variations and/or similar variations.

With any of the various optical pieces 600-600k the space between the LED 101 and the optical piece 600-600k is preferably filled with air. Preferably this space has a refractive index less than that of the material that the optical piece 600-600k is made of.

A twelfth alternative optical piece 600l is in the form of a cylinder with a dome tip. A depression 6051 in the base of this optical piece 600l accommodates the LED 101. The combination of this optical piece 600l and the LED 101 simulates a large LED that is of a traditional "bullet style" and that has beam characteristics obtainable from any of the traditional "bullet style", especially from any of the "5 mm" or "T1¾" LEDs. Preferably the space between the LED 101 and this piece 600l is filled with glue or plastic or other transparent material 6061. The transparent material 6061 can be liquid but is solid in currently preferred embodiments using this embodiment of the optical piece 600l.

Alternatively the space between the LED 101 and the optical piece 600l can be filled with a gas other than air, a gas at a pressure other than atmospheric pressure, or a vacuum.

A reflector 6071 may be provided surrounding the optical piece 600l to direct forward light that escapes from the sides of the optical piece 600l. An additional optical component 6081 may be placed forward of the optical piece 600l to alter the characteristics of the beam or radiation pattern formed by the optical piece 600l. This additional optical component 6081 may be a lens, a diffuser, a prismatic component or a lens that has diffusing characteristics. Such an additional optical component may affect only part of the light that passes through the optic piece 600l.

The optic piece 600l may be placed forward from the LED 101 such that it affects only some of the light produced by the LED 101. In such a case, light that is not affected by the optic piece 600l can be concentrated by a reflector 6071 or by other optical components. In a possible alternative embodiment of the present invention, some of the light escaping the optic piece 600l does not need to be redirected by other optical components while some light escaping the optic piece 600l is affected by an additional optical component 6081.

The additional optical component 6081 is shown placed forward of the optic piece 600l, but it may be attached to the optic piece 600l instead. More than one additional optical piece 6081 may be used in alternative embodiments of the present invention. Space forward of the optic piece 600l may be filled with a material other than air in alternative embodiments of the present invention.

Alternative embodiments may include one or more optical pieces 600 of one shape and one or more optical pieces 600 of a different shape in one work light. Similarly, one or more LEDs may each be combined with an optical piece 600 and one or more LEDs may each be combined with a different optical means of concentrating their light such as a convex lens.

The beam produced by one or some of the LEDs 101 may be brighter in the center than towards the edges of the beam, while one or more of the remaining LEDs 101 produces light into a beam that is brighter towards its edges than towards its center. Such beams that have different patterns of non-uniform light intensity can be combined to produce a more uniform beam. Various forms of non-uniform beams or non-circular beams may be combined into a desired beam. For most uses it is desired to have the beam resulting from the combination of each of the beams formed from their respective LEDs both uniform and circular. However, it is possible that alternative embodiments with a different beam shape and/or a non-uniform beam may be desired.

Figure 8:
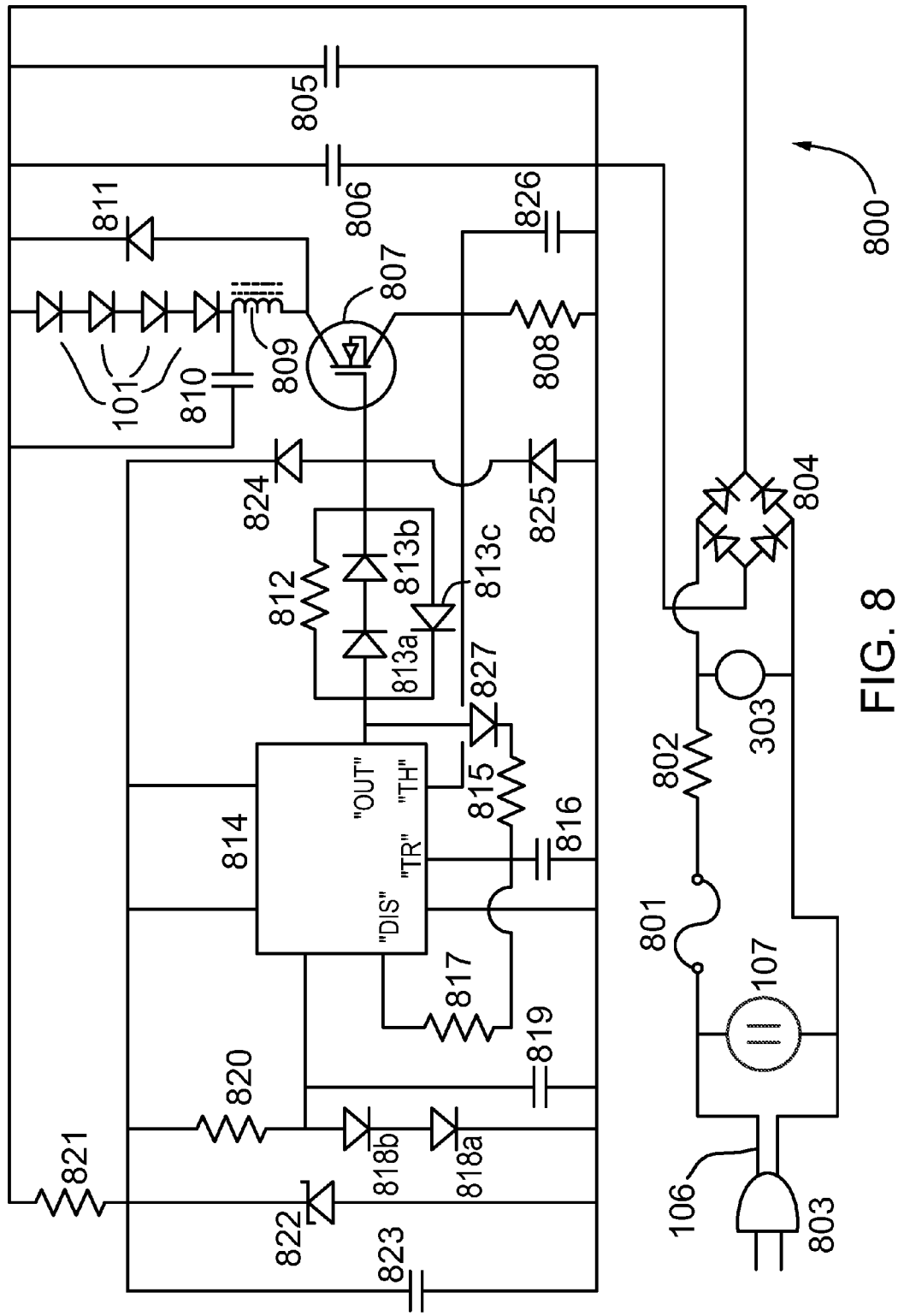
FIG. 8 is a schematic circuit diagram of an electronic ballast used in some embodiments of the present invention.

Referring to FIG. 8, the LEDs 101 are provided regulated current from an electronic ballast circuit 800 comprised in the ballast 105b.

In the circuit 800, AC power is accepted by a line cord plug 803 and the line cord 106. The AC is rectified by a bridge rectifier 804. A fuse 801 is preferably provided to prevent catastrophic failure. The output of the bridge rectifier 804 feeds a filter capacitor 805 that partially filters the DC.

A line current resistor 802 is preferably provided to limit the peak current drawn through the bridge rectifier by the filter capacitor 805 when the instantaneous line voltage exceeds the voltage across the filter capacitor 805. The filter capacitor 805 is preferably an electrolytic type. An additional capacitor 806 of a smaller capacitance and of a type that is more conductive at high frequencies may be provided in parallel with the filter capacitor 805.

A dropping resistor 821 and a zener diode 822 provide low voltage DC from the higher voltage DC provided by the bridge rectifier 804 and filter capacitor 805. This lower voltage DC is the power supply for the timer integrated circuit 814.

Preferably, the timer integrated circuit 814 is a low power or "CMOS" version of the "555 timer". The timer 814 may be one of the two sections of a "556 dual timer" integrated circuit or may otherwise be accomplished by alternative circuitry that can be found to emulate a "555 timer" integrated circuit for the purposes served by the timer integrated circuit 814.

The control voltage for the timer integrated circuit 814 is provided by a dropping resistor 820 and a combination of voltage reference diodes 818a and 818b. Preferably, diode 818A is a red light emitting diode and diode 818b is a silicon switching diode. Other diodes can be used. A single diode may be found suitable in lieu of the combination of diodes 818a and 818b. The control voltage may be obtained by using other means such as a voltage reference integrated circuit in lieu of the diodes 818a and 818b and the associated dropping resistor 820. A capacitor 819 is provided in parallel with the voltage reference diodes 818a and 818b in case it is necessary to absorb interference, such as from nearby spark plug wires.

When power is first applied, the current flowing through the inductor 809, transistor 807 and current sensing resistor 808 is zero. Because of this, the voltage across the current sensing resistor 808 is less than the control voltage. In addition, the voltage across the timing capacitor 816 is zero. Under this set of conditions, the output of the integrated circuit timer 814 is "high" and causes the transistor 807 to conduct. This allows current to flow through the LEDs 101, the inductor 809 and the current sensing resistor 808. This current increases gradually and the voltage across the current sensing resistor 808 accordingly increases gradually.

The "threshold" pin of the integrated circuit timer 814, marked "TH" in FIG. 8, is connected to one end of the current sensing resistor 808 so as to sense the voltage across the current sensing resistor 808. When the voltage across the current sensing resistor 808 exceeds the voltage across the voltage reference diodes 818a and 818b, the output of the integrated circuit timer 814 becomes "low" and causes the transistor 807 to become nonconductive. When the transistor 807 is nonconductive, current that is flowing through the inductor 809 and the LEDs 101 will flow through a diode 811. When this current is flowing through the diode 811 instead of through the transistor 807, this current is gradually decreasing.

The combination of the resistor 812 and the diodes 813a, 813b and 813c is provided to prevent interference to the integrated circuit timer 814 from the transistor 807 that can result from the transistor 807 switching the inductor 809. The diodes 824 and 825 are provided to shunt to the supply rails any interference or undesirable voltage spikes that would otherwise damage the transistor 807 or cause malfunction of the integrated circuit timer 814.

When the output of the integrated circuit timer 814 is "high", it charges the timing capacitor 816 through a charging resistor 815 and a blocking diode 827. When the output of the integrated circuit timer 814 is low, the timing capacitor 816 is gradually discharged through a timing resistor 817 by the "discharge" pin of the integrated circuit timer. The blocking diode 827 prevents the timing capacitor from being discharged quickly through the charging resistor 815.

When the voltage across the timing capacitor 816 decreases to less than half the voltage across the reference diodes 818a and 818b, the output of the integrated circuit timer switches from "low" to "high". At this time the current flowing through the inductor 809 and the LEDs 101 has usually not decreased to zero. However, values for the timing resistor 817, timing capacitor 816 and inductor 809 can be selected so that this current does decrease to zero. When the output of the integrated circuit timer 814 switches from "low" to "high", current flowing through the inductor 809 and the LEDs will flow through the transistor 807 again and will increase again whether or not it has decreased to zero by the time the transistor 807 is made conductive.

In the preferred embodiment of the present invention, the transistor 807 is a MOSFET. It is foreseeable that other types of transistors will work, including insulated gate bipolar transistors and conventional bipolar transistors. Conventional bipolar transistors will typically require a resistor (not shown) to be added in series with their base terminals when they are controlled by integrated circuit timers of the common "555" types.

The current flowing through the LEDs 101 and the inductor 809 will alternately increase and decrease in a roughly linear fashion. The maximum magnitude of this current is independent of the supply voltage as long as the supply voltage is high enough to cause this current to be large enough to cause the voltage across the current sensing resistor 808 to exceed the voltage across the voltage reference diodes 818a and 818b. Because of this, it will have a characteristic average magnitude and is therefore effectively regulated.

Preferably, a capacitor 810 is added in parallel with the LEDs 101 to smooth the waveform of the current that flows through the LEDs 101. This has been found to improve the efficiency of the LEDs currently being used as described herein. Other LEDs may not benefit from such smoothing of the current waveform, in which case it may be preferable not to use capacitor 810. Alternatively, capacitor 810 may be of a value that is too small to smooth the waveform of the current that flows through the LEDs 101. Such a capacitor 810 may be useful for absorbing interference caused by switching of the transistor 807 and/or the related sudden changes in the voltage across the inductor 809. Such interference may otherwise interfere with proper operation of the ballast circuit 800.

If appropriate components are selected, the electronic ballast circuit 800 can work over a wide range of AC voltages including 110 and 240 volts and all voltages in between. An advantage of an electronic ballast that works both at 120 volts and at 230 volts is that the same circuit can be used in different countries that have different available AC voltages. A work light 100 that is designed to be usable in different countries may have a variety of detachable line cord plugs 103 provided.

The inductor 809 would normally be a type having a gapped ferrite core. Other types may be suitable. For example, such other types may have a core made of a ferrite that has low permeability and does not require gapping. Alternatively, such other inductor types may have a ferromagnetic core made of a material other than ferrite, such as powdered iron or laminated transformer steel. It is possible to make the inductor 809 with no magnetic core at all, although this requires that the inductor 809 to be larger and heavier than it would be with a gapped ferrite core.

The electronic ballast circuit 800 will also work with a DC power source as well as with an AC power source. Such a DC ballast may be alternatively referred to as an LED driver circuit. By using a small number of LEDs 101 and with an appropriate selection of components such as a low enough value for the dropping resistor 821, this electronic ballast circuit 800 can work at a selected DC input voltage, such as 12 or 12-14 volts. Alternative arrangements such as a parallel combination of more than one "string" of a small number of LEDs 101 and a current dividing resistor can be used to achieve a sufficiently low minimum voltage requirement of the electronic ballast circuit 800.

LED lights can benefit from ability to be operated over a wide range of voltages, such as both 120 and 240 volts AC, or both line voltage AC and low voltage DC, even if they produce beams other than 40 to 90 degrees wide and/or have LEDs other than LEDs 101 that have or require heatsinking means and/or are LED lights other than work lights having handles.

LED work lights that have the electronic ballast circuit 800 including the bridge rectifier 804 and that can be operated from low voltage DC can benefit from working properly regardless of the polarity of the low voltage DC being used.

It is foreseeable that any or all benefits of the electronic ballast circuit 800 can be achieved by alternative means. Such alternative means may be a switching current regulating circuit that is different from the electronic ballast circuit 800. Such alternative means may be a switching current regulation circuit that has a microprocessor. Such alternative means may include a linear regulator if the power losses of a linear regulator are acceptable.

Figure 9:
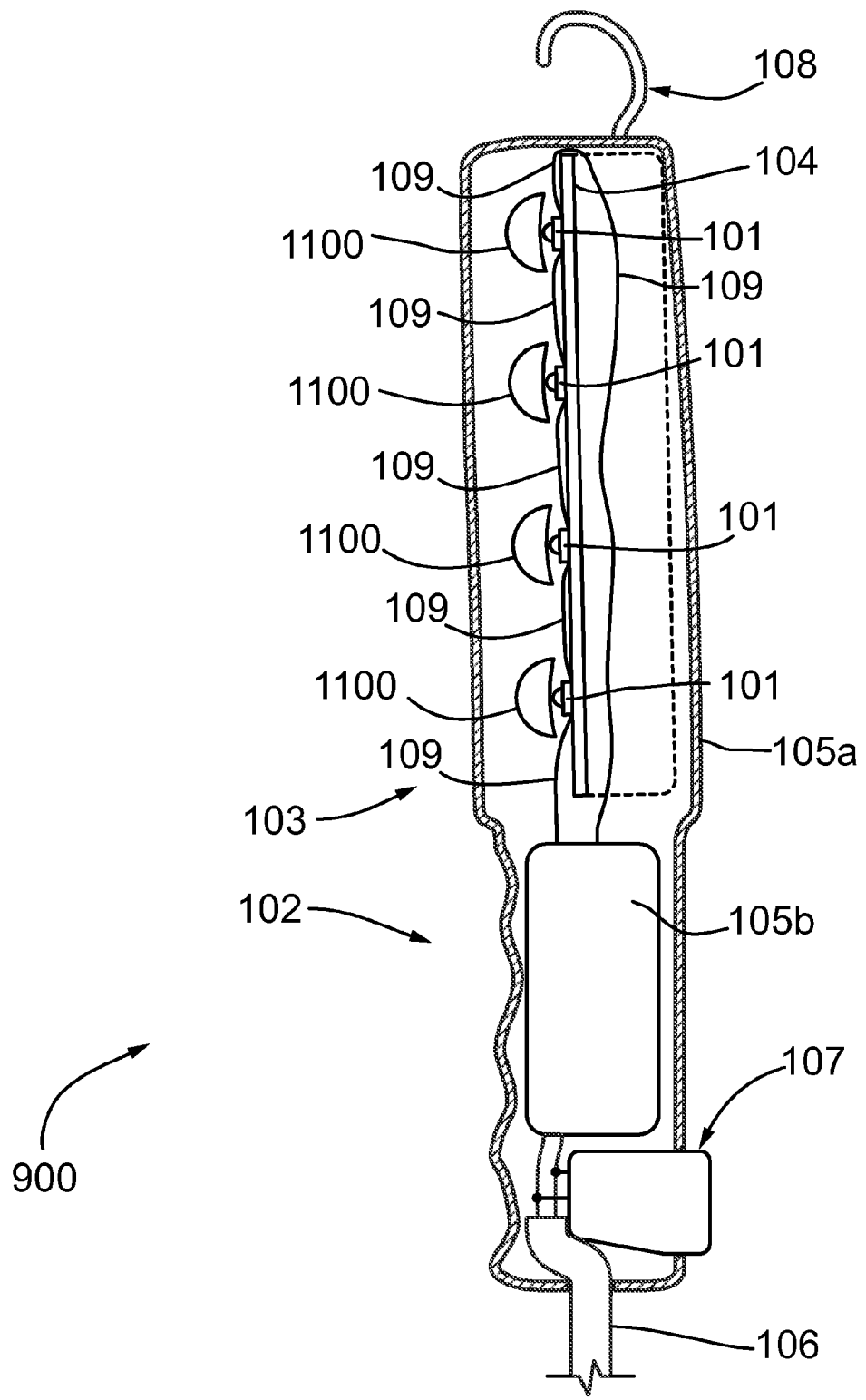
FIG. 9 is a cross sectional side view of a work light in accordance with a fifth embodiment of the present invention.

Referring to FIG. 9, an LED work light 900 can be made like the LED work light 100 of FIG. 1, except it has convex lenses 1100 like those described below and shown in FIG. 11 in lieu of refractive-reflective optics 600 forward of the LEDs 101.

The work light 900 has a casing 105b that is transparent about the head section. Any portion of the outer casing 105b that does not cover (block desired light from) the lenses 1100 need not be transparent.

Figure 11:
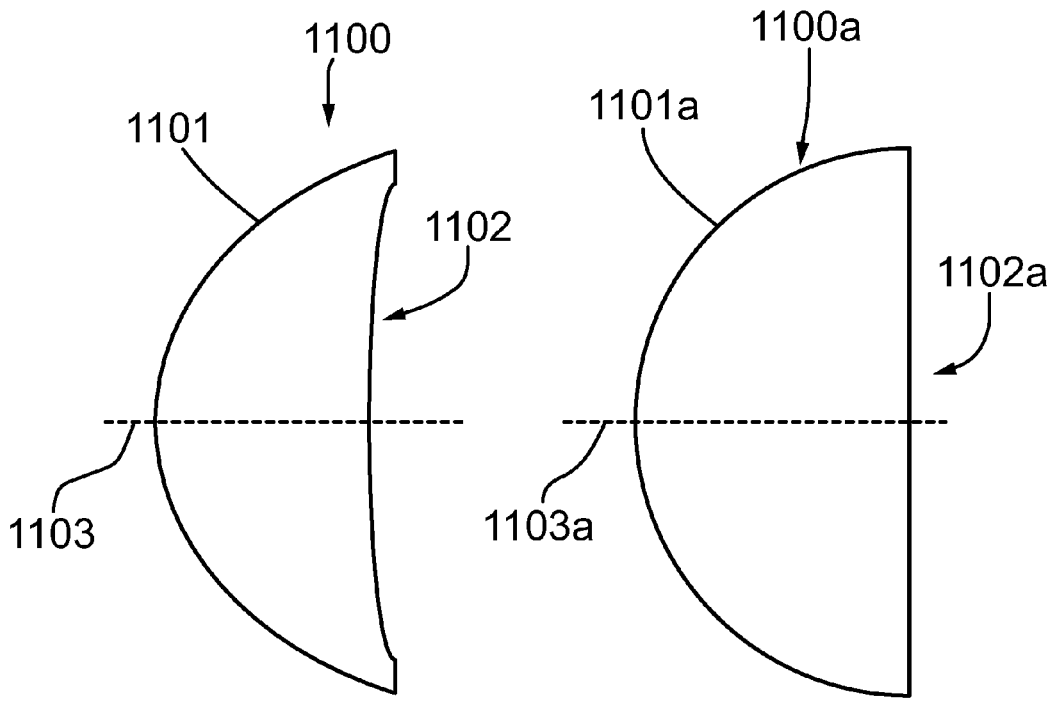
FIG. 11 is a cross sectional view of lenses used in some embodiments of the present invention.

The convex lenses 1100 may be the aspheric concavo-convex lens of FIG. 11. Alternatively, the convex lenses 1100 may be of a different shape such as hemispheric or an aspheric planoconvex shape. Any aspheric surface may be an ellipsoid or a different aspheric shape such as a paraboloid, hyperboloid, a rotated fraction of a cycle of a sinusoid or any mathematical combination of any of these and/or a spherical curve.

Like the work light 100 of FIG. 1, the work light 900 comprises a handle 102, a heatsink 104, a ballast 105b, a power cord 106, an outlet 107, and a hook 108. Other arrangements are possible. Any embodiments that are powered by low voltage DC may contain one or more batteries (such as batteries 1208 of FIG. 13) that may or may not be rechargeable. Embodiments powered by low voltage DC may be powered by an external power source. Embodiments powered by low voltage DC will not usually have the outlet 107. Embodiments that are powered by line voltage AC may or may not have the outlet 107.

Figure 10:
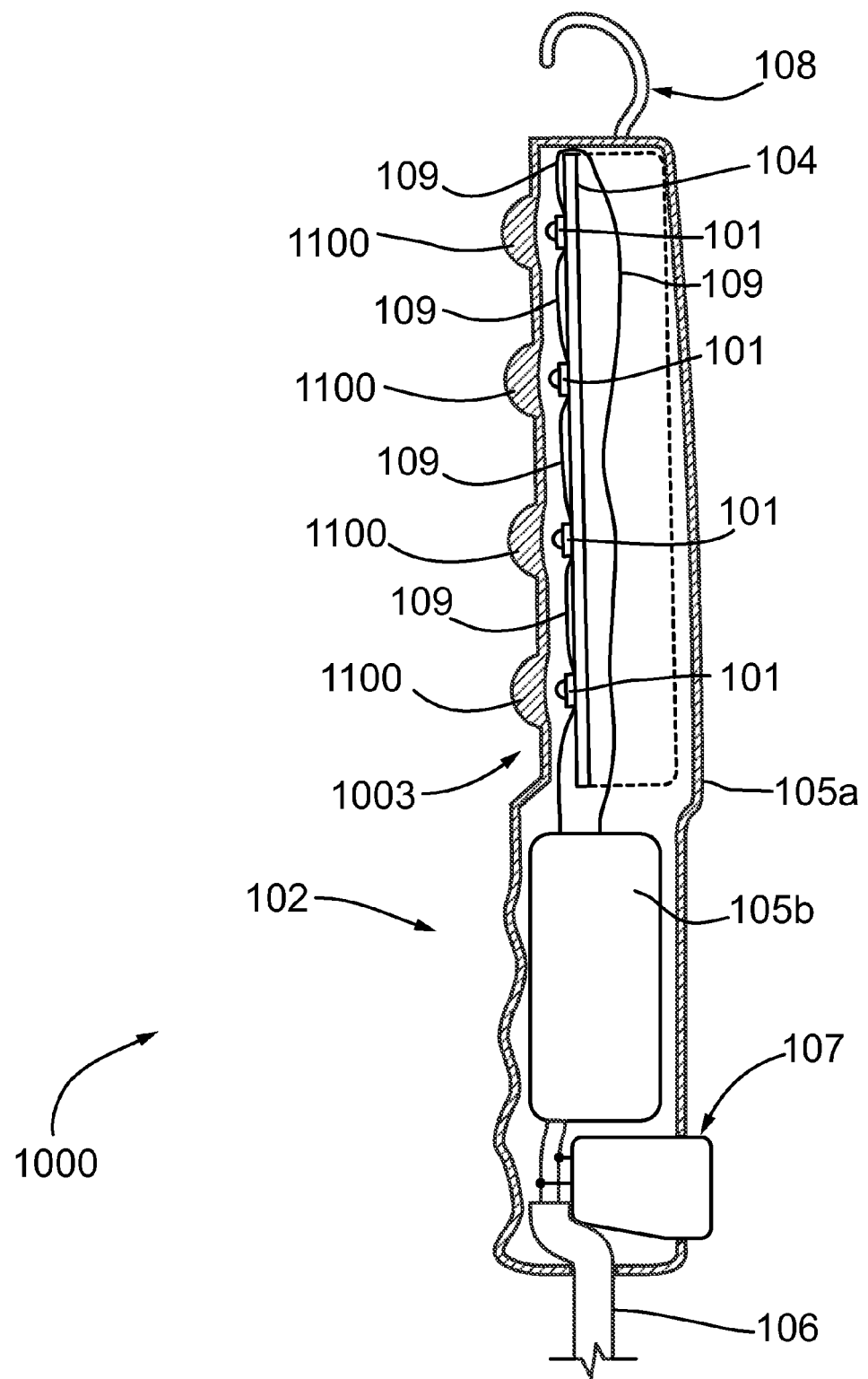
FIG. 10 is a cross sectional side view of a work light in accordance with a seventh embodiment of the present invention.

Referring to FIG. 10, an LED work light 1000 can be made like the LED work light 900 of FIG. 9, except the convex lenses 1100 are an integral part of a transparent light head outer casing 103. The transparent outer casing may be but is not necessarily molded. If the transparent casing 103 is molded, it may be machined and/or polished afterwards. As an example, sink marks may form on the lenses 1100 during or after their solidification, and such sink marks may need to be machined and polished or otherwise repaired.

Referring to FIG. 11, a concavo-convex lens 1100 and a hemispheric planoconvex lens 1100a are shown. The concavo-convex lens 1100 or the hemispheric planoconvex lens 1100a can be used to concentrate the light from a wide angle LED into a suitable beam, such as a beam at least 40 but no more than 90 degrees wide.

The lens 1100 has a forward surface 1101, a rear surface 1102 and an axis 1103.

A hemispheric variation 1100a of a convex lens is also shown. A usable beam has been achieved by placing a hemispheric the lens 1100a at a very short distance forward of a Lumileds Luxeon LED that has a lambertian radiation pattern. A lambertian radiation pattern is one where the light intensity at any given angle from the axis of the light source is the intensity on the axis multiplied by the cosine of the angle from the axis. The light intensity decreases as the angle from the axis increases, and at an angle of 60 degrees from the axis is half the intensity on the axis of the LED. A hemispheric lens 1100a has a tendency to compensate for this by concentrating light more greatly at the edge of the beam formed by it than at the center of this beam. The result is a beam that is reasonably even in intensity, although a bright "ring" sometimes forms at the edge of the beam.

A hemispheric lens 1100a may be found to work adequately with other LEDs. One such other LED is the Lumileds Luxeon LEDs having the "batwing" radiation pattern. In this radiation pattern, the LED produces a beam that is approximately 110 degrees wide and with its edge brighter than its center so that the LED evenly illuminates within its beam a planar surface that is perpendicular to the axis of the LED. This effect may be unfavorably compounded by the tendency of a hemispheric lens 1100a to concentrate light more at the edge of the beam formed from such a lens 1100a than at the center of the beam, and the result may be a beam that is much brighter towards its edge than in its center. However, a hemispheric lens 1100a that is smaller in diameter may result in a beam whose edge is blurred sufficiently to remedy the excessively brightness of the edge of the beam that would otherwise result.

The radiation pattern that Lumileds refers to as "batwing" is approximately "inverse cosine cube". Throughout most of the beam, the intensity at any given angle off axis is approximately equal to the intensity on axis divided by the cube of the cosine of the angle from the axis. Such a radiation pattern produces an even illumination pattern on a planar surface that is perpendicular to the axis of the beam. Lumileds named such a pattern "batwing" because of the shape of a graph of intensity as a function of angle from the axis of the radiation pattern.

Usable versions of the hemispheric lens 1100a include plastic cabachons that are available from plastic shops, which may be made by casting a resin of an acrylic such as methyl methacrylate or a combination of styrene and an acrylic such as methyl methacrylate.

The hemispheric lens 1100a has a front surface 1101a, a rear surface 1102a, and an axis 1103a.

The lens 1100/1100a may be made of a thermoplastic such as polymethylmethacrylate or another acrylic or a thermoplastic polycarbonate. The lens 1100/1100a may be made of a non-thermoplastic material such as a polycarbonate resin, an acrylic resin, a resin having styrene, a resin that is a combination of styrene and an acrylic such as methyl methacrylate, or epoxy. The lens 1100/1100a may be made of a non-polymer material such as glass.

Variations of the lens 1100 that are not concavo-convex are not limited to the hemispheric variation 1100a. Variations of the lens 1100 may be planoconvex but not hemispheric, such as being aspheric or comprising a fraction of a sphere other than a hemisphere. Aspheric planoconvex variations of the lens 1100 may be ellipsoidal, paraboloidal or of a different aspheric shape.

The lens 1100 would typically be molded, such as by injection molding or casting. Alternative means of producing a lens 1100 exist, such as machining. A lens 1100 that is molded may have to be machined afterwards for purposes such as repairing sink marks. The lens 1100 may be made in such a way that it requires polishing. The same is true for variations of the lens 1100 that are not concavo-convex, such as the hemispheric lens 1100a.

Any lens 1100 or 1100a may be touching or not touching the LED producing the light formed into a beam by the lens 1100 or 1100a.

A lens 1100 or 1100a with an overall diameter ½ inch (12.7 mm) or larger has been found to work well with LEDs having a lambertian radiation pattern. A hemispheric lens 1100a with an overall diameter of ⅝ inch or larger produces an impressively uniform beam having an attractively sharp but slightly excessively bright edge if used with a Lumileds Luxeon LED with a lambertian radiation pattern and a nominal power rating of 1 or 3 watts. A hemispheric lens 1100a with an overall diameter at least ⅝ inch has been found to work well with Cree's XL7090-WHT LED. This LED nominally has a lambertian radiation pattern, but actually radiates less light far off axis than an LED with a true lambertian radiation pattern produces. A hemispheric lens 1100a with an overall diameter of ½ inch (12.7 mm) has produced a usable beam from Lumileds Luxeon LEDs having the "batwing" radiation pattern and a nominal power rating of 1 watt. If a hemispheric lens larger than ½ inch in diameter is used with a "1 watt" Luxeon LED with the "batwing" radiation pattern, the resulting beam tends to be brighter at its edge than in its center. Other LEDs may work best with a different size of lenses 1100 or hemispheric lenses 1100a. Lenses 1100 or hemispheric lenses 1100a of larger sizes can usually be used with little or no ill effect on performance, especially with LEDs having a lambertian radiation pattern. Having a lens 1100 or hemispheric lens 1100a of size larger than necessary for good results may be useful to produce work lights that can use different LEDs, such as larger or multichip LEDs that may require larger lenses. Lenses 1100 or hemispheric lenses 1100a of size larger than necessary for good results may be found beneficial by having an attractive appearance.

A hemispheric lens 1100a typically produces a beam that is slightly brighter at its edges than at its center. This occurs at least in part from rays hitting a wide range of the outer region of the rear surface 1102a being refracted into a narrow range of angles from the axis 1103a of the hemispheric lens 1100a, with this narrow range of angles approximating the critical angle of the lens material if the rear surface 1102a is flat. Changing the flat rear surface 1102a into a concave one like the concave rear surface 1102 of the concavo-convex lens 1100 can prevent this from happening.

A concave rear surface 1102 would preferably approach being flat in its central region while being curved towards its edges. Such a concave surface 1102 may be of a shape mathematically defined by depth as a function of radius from the axis 1103 being a constant minus radius raised to a power greater than two. If the rear surface 1102 is concave, it may alternatively be of a different shape or it may even be spherical. If the rear surface 1102 is concave, it may have a flat central portion with a curved outer region. If the rear surface 1102 is concave with curvature only in its outer region, the curve may or may not be a section of the surface of a toroid. If the rear surface 1102 is concave, the shape may be achieved by machining with an end mill, drill bit or router bit whose tip has been machined into the desired shape. Other means are possible for achieving a concave form of the rear surface 1102 if the lens is made with a flat or otherwise different surface in an earlier production step. Such machining after an earlier production step may be useful for removing any sink marks that may occur in molded versions of the lens 1100.

If the rear or concave surface 1102 is flatter towards its center than towards its edge, the central region of this surface 1102 may either be completely flat or may have some curvature. The lens 1100 may be made with the rear surface 1102 generally concave but with part of this surface 1102 such as the central region convex or even conical.

A concavoconvex lens 1100 can assist in more evenly spreading light over the area of the beam. Without the concave portion emitted light tends to be unevenly distributed across the area of the beam, particularly at the outside edge of the beam. A concave configuration that has been successful in distributing the light from an LED having or nominally having a lambertian radiation pattern has a rear surface 1102 that is flat except for a shallow depression with a diameter approximately two thirds of the overall diameter of the lens 1100. A rear surface 1102 having a concave region of diameter smaller than that of the convex front surface 1101 but other than two thirds that of the convex front surface 1101 can also be made to work. The depth of the depression in the rear surface 1102 in this lens 1100 is only a few percent of the thickness of the lens 1100. The shape of such a depression in the rear surface 1102 in the successful lens 1100 is such that the depth of the depression as a function of radius from the axis of the lens 1100 deviated from the depth on axis by an amount proportional to the fourth power of the radius. This makes the depression in the rear surface 1102 essentially flat in its center, but with curvature increasing towards its edge. It is noted that not all concave configurations will have the benefits of this configuration. Persons skilled in the art will be able best to configure beneficial lenses for their application based on the description provided herein, for example, by using ray tracings possibly assisted by computers and appropriate software.

The forward surface 1101 of the lens 1100 would normally be entirely convex, but it is foreseeable that part of this surface 1101 could be made flat, conical or concave and the lens 1100 will still work adequately.

The forward surface 1101 may be spherical or an aspheric shape such as ellipsoidal, paraboloidal, hyperboloidal, a fraction of a cycle of a sinusoid rotated about the axis 1103, or any mathematical combination of any of these and/or any mathematical combination of a sphere and any of these.

A concavo-convex version of the lens 1100 is shown with part of the rear surface 1102 being flat rather than concave. This flat region may be omitted or substituted with any other shape. The edge of the lens 1100 is shown in the form of having the forward surface 1101 and the rear surface 1102 intersecting with each other, but it is foreseeable that a lens 1100 can be made with the forward surface 1101 and rear surface 1102 not intersecting at the edge. For example, the lens 1100 may have an edge that is cylindrical.

If the lens 1100 is made of acrylic or of another material having a refractive index near 1.5 and the central region of the rear surface 1102 is flat, then the distance along the axis 1103 between the front surface 1101 and the rear surface 1102 may be equal to the radius of curvature of the central region of the front surface 1101. This has been found to work well, although it is obvious that a different distance along the axis 1103 between the front surface 1101 and the rear surface 1102 may be found to work adequately. The hemispheric lens 1100a is a special case of a variation of the lens 1100 having a distance along the axis 1103 between the front surface 1101 and rear surface 1102 that is equal to the radius of curvature of the central region of the front surface 1101. The ideal distance along the axis 1103 between the front surface 1101 and the rear surface 1102 is likely to be different if the lens 1100 is made of a material having a refractive index other than 1.5.

An LED other than one having a lambertian radiation pattern may be used with the lens 1100. Lumileds Luxeon LEDs having the "Batwing" radiation pattern tend to produce beams that are brighter at their edges than at their center, but it is foreseeable that a variation of the lens 1100 can be made that corrects this. As noted above, a usable beam has been achieved by placing a hemispheric ½ inch diameter variation of the lens 1100 forward of a Lumileds Luxeon LED having the "batwing" radiation pattern.

Any lens 1100 or hemispheric lens 1100a may have texturing, ridges or facets on any of its surfaces. Any facets or texturing may be in a pattern or may be random. Texturing or facets would be added to the lens 1100 or hemispheric lens 1100a for purposes such as softening or otherwise adjusting the beam produced by the lens 1100 or hemispheric lens 1100a, or to achieve an attractive appearance of the lens 1100 or hemispheric lens 1100a.

Figure 12:
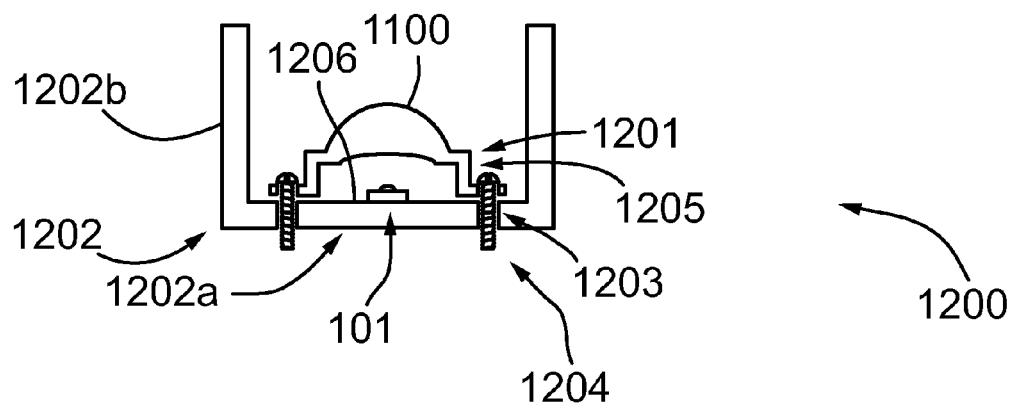
FIG. 12 is a cross sectional top view of a work light in accordance with an seventh embodiment of the present invention.

Referring to FIG. 12, an LED work light 1200 may have its head section comprising a metal channel piece 1202 that comprises side flanges 1202b and a rear portion 1202a. The LED work light 1200 further comprises one or more LEDs 101 and a convex lens 1100 forward of each LED 101. The LED work light 1200 preferably comprises at least two LEDs 101 and in such case would have at least two lenses 1100 with one lens 1100 forward of each LED 101. As shown, the one or more convex lenses 1100 are part of a transparent cover/lens assembly 1201. Alternatively, the transparent cover/lens assembly 1201 may be omitted or separate from the one or more lenses 1100. This would require alternative means of mounting the lenses 1100. Further alternatively, any lenses 1100 may be omitted and different optics such as any of the optics of FIG. 7 or reflectors may be used.

Variations of the one or more lenses 1100 include the hemispheric lens 1100a shown in FIG. 11.

The transparent cover/lens assembly 1201 that includes one or more lenses 1100 may be molded. The transparent cover/lens assembly 1201 including one or more lenses 1100 may be machined after molding. Machining after molding may be done for purposes such as repair of sink marks. Polishing is typically necessary after machining if machining is done on any optical surfaces of the one or more lenses 1100.

The metal channel piece 1202 can be used as a heatsink for the one or more LEDs 101. The LEDs 1201 are preferably mounted on the inside surface 1206 of the rear portion 1202a of the channel piece 1202. Other arrangements are possible for heatsinking of the LEDs 101. The position of the LEDs 101 may be adjusted by placing a metal disc or other planar piece of metal (not shown) between the LEDs 101 and the inside rear surface 1206.

The transparent cover/lens assembly 1201 may be attached to the channel piece 1202 by means of screws 1204 that pass through holes 1203. A gasket (not shown) may be used between the transparent cover/lens assembly 1201 and the channel piece 1202 to achieve watertightness. Other means may be used to attach the transparent cover/lens assembly 1201 to the channel piece 1202, such as gluing.

Each of the lenses 1100 preferably concentrate the light from its corresponding LED 101 into a beam that is 40 to 90 degrees wide and has an attractive brightness profile such as having an impressively sharp edge. Alternatively, a beam with a sharp edge may be obtained by having each lens 1100 of such characteristics and located such that it forms a focused image of a part of each LED 101 such as its chip, its die cup, or the edge of its transparent case. Further alternatively, a washer or other cover with a hole (not shown) can be placed forward of each of the LEDs 101 so that each of the lenses 1100 can produce a beam that is in the form of an image of the hole that is placed forward of its corresponding LED 101.

The transparent cover/lens assembly 1201 typically has walls 1205 that permit mounting of the transparent cover/lens assembly 1201 with the integral lenses 1100 sufficently forward of the LEDs 101. The LED work light 1200 may have more than one transparent cover/lens assembly 1201 that includes at least one convex lens 1100.

The LED work light 1200 would preferably be constructed such that the forward edges of the side flanges 1202b of the channel piece 1202 are farther forward than other parts of the LED work light 1200. This protects the other parts of the LED work light 1200 from falls. Such a protective channel piece may extend the full length of the LED work light 1200 or it may be confined to a distinct light head section of the LED work light 1200. The side flanges 1202b may or may not exist over the entire length of the channel piece 1202. Other arrangements are possible where a work light can have parts recessed within an outer casing so as to be protected from falls.

The LED work light 1200 typically further comprises parts not shown in FIG. 12 such as wires, one or more resistors or other current limiting circuitry for the one or more LEDs 101, a power cord or one or more batteries, and a handle. Variations of the LED work light 1200 can be made without a handle so as to be used for alternative stationary applications such as display case lights.

Figure 13:
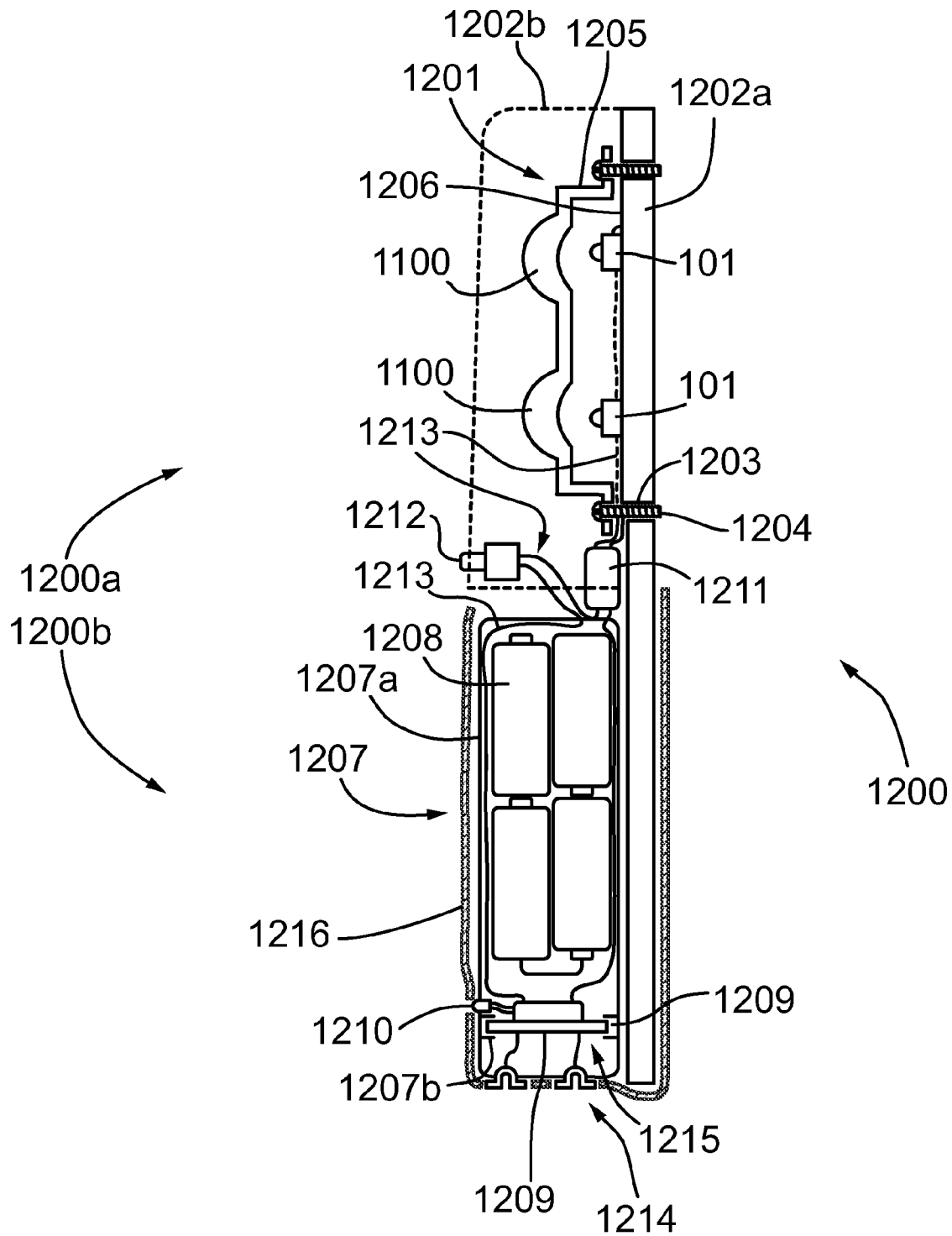
FIG. 13 is a cross sectional side view of a work light in accordance with the seventh embodiment of the present invention.

Referring to FIG. 13, the LED work light 1200 is shown comprising a head section 1200a and a handle section 1200b. The head section 1200a is shown as having two LEDs 101, although a different number of LEDs 101 may be used. For example, a work light similar to the LED work light 1200 but having four LEDs 101 with a power rating of approx. 1.2 watts has performed well in prototype testing. Such LEDs may be incorporated into any one of the embodiments described herein.

It is anticipated that a different work light similar to the LED work light 1200 of one of the other lights described herein can be made with only one LED 101, especially if the LED 101 is a higher power one such as the Lumileds Luxeon V™ whose nominal power rating is 5 watts. The work light 1200 and other work lights described herein in some other embodiments provide an LED work light that produces a combination of illumination intensity and illumination coverage area that is not provided by prior LED work lights. At least one LED manufacturer has announced plans to produce in 2005 white LEDs that are as efficient as some fluorescent lamps. As higher efficiency LEDs become available the LEDs may be incorporated into alternate embodiments of work lights described herein or based on the principles described herein.

As shown, the head section of the work light 1200 comprises the parts shown in FIG. 12, namely an outer casing in the form of a heatsinking metal channel piece 1202, any number (two are shown) of LEDs 101, and a lens 1100 forward of each of the LEDs 101 and comprised within a transparent cover/lens assembly 1201.

The transparent cover/lens assembly 1201 may be substituted with a flat lens assembly such as the lens assembly (1400 of FIG. 14) if it is mounted over any necessitated spacer or plurality of spacers (not shown) that substitute for the wall regions 1205 of the lens assembly 1201.

As shown, the side flanges 1202b of the metal channel extend only over the head section 1200a and not over the handle section 1200b. Alternative arrangements are possible, including having the side flanges 1202b extend over the entire length of the LED work light 1200 including the handle section 1200b.

The LED work light 1200, is operable from batteries 1208. Battery operation may be included with any of the embodiments described herein or alternate embodiments based upon the principles described herein. Battery operation is not limited to a work light having a head section as described above for the work light 1200. The work light 1200 may have a removable battery pack 1207 that contains one or more batteries 1208. Alternatively, batteries 1208 may be permanently installed. The batteries 1208 may not be contained within a battery pack 1207. Further alternatively, the LED work light 1200 may be constructed so as to receive power through a cord (not shown) rather than from included batteries 1207. The battery pack 1207 may but does not necessarily further comprise a charging circuit 1209 and one or more indicator lamps 1210. As shown, the battery pack 1207 may have a battery pack casing 1207a which may be made of plastic and may be molded but may be made of a different material such as steel or another metal. Alternatively, a battery pack 1207 may merely comprise a plurality of batteries 1208 held together with tape or plastic film or glue or by other means. As shown, the battery pack casing 1207a has ridges 1207b to hold the charging circuit 1209. Other means may be employed to mount any charging circuit 1209 such as screws, rivets, or glue. If a charging circuit 1209 is included in the LED work light 1200, it may be located on the outside of or not be a part of the battery pack 1207.

The LED work light 1200, as shown, preferably has a circuit board 1211 that includes current regulating circuitry or other current limiting means typically required for proper operation of the LEDs 101.

The circuit board 1211 is shown as being between the handle section 1200b and the LEDs 101, but this is not a limitation on the location of the circuit board 1211.

Additional circuitry that prevents operation of the LED work light 1200 under unfavorable conditions may be included in the circuit board 1211 or elsewhere. Such additional circuitry may include means to detect excessive temperature and to shut down the LED work light 1200 if excessive temperature is detected. Such additional circuitry may include means to detect low battery voltage and means to shut down the LED work light 1200 if excessively low battery voltage typical of batteries 1208 being nearly discharged is detected. Circuitry to provide other features such as a paging feature may also be included in the circuit board 1211 or elsewhere in the LED work light 1200.

Again, the circuit board 1211, regulating circuit and additional circuitry could also be applied to the other work lights described herein and to alternate embodiments based upon the principles described herein. The ballast circuit 800 previously described herein is an example of the regulating circuitry that may be included on circuit board 1211.

A switch 1212 is preferably included in any LED work light, for example the LED work light 1200, in order to turn the work light on and off. In the work light 1200 the switch 1212 may be attached to the inner surface of either side flange 1202b of the metal channel piece 1202, although other arrangements are possible.

The LED work light 1200 typically has wires 1213 connected to such parts as the LEDs 101, the batteries 1208, the charging circuit board 1209, the circuit board 1211 and the switch 1212. If the batteries 1208 or the battery pack 1207 or any other parts requiring electrical connections are removable, then connectors (not shown) would preferably be added to removable parts in order to disconnect removable parts from wiring or other conductors that connect to such removable parts.

If the batteries 1208 in the battery pack 1207 are rechargeable, then the battery pack 1207 would preferably have one or more charging connectors such as charging jacks 1214. Any charging connectors may be of a different form such as springs. Charging connectors may connect to the charging circuit 1209 via charging wires 1215. Other arrangements are possible, such as having any charging connectors soldered to or otherwise mounted on the charging circuit 1209. Any battery pack 1207 may include one or more charging connectors such as charging jacks 1214 even if the charging circuit 1209 is located outside the battery pack 1209 or omitted.

Any charging connectors such as charging jacks 1214 may be protected from dirt, corrosion, liquids, etc. by a removable cover (not shown). The charging connectors such as charging jacks 1214 may be recessed so that such a protective cover can be a screw-on lid that may have an o-ring. Alternative protective covers are possible such as a rubber cap.

Again, the connectors described above can be applied to other embodiments of work lights based upon the principles described herein wherein removable components are used.

Work lights such as the LED work light 1200 may have a handle cover 1216 that may be made of rubber. Purposes of a rubber handle cover include achieving greater comfort of holding the LED work light 1200, reduction of slipperiness of the handle section 1200b if it gets wet, or as electrical insulation or for protecting from impacts parts of the LED work light 1200 that the handle cover 1216 would cover. The handle cover 1216 may be removable for purposes such as permitting removal of any removable batteries 1208 or removable battery pack 1207. Such handle covers may be used on embodiments of the present invention other than having the arrangement shown.

Figure 14:
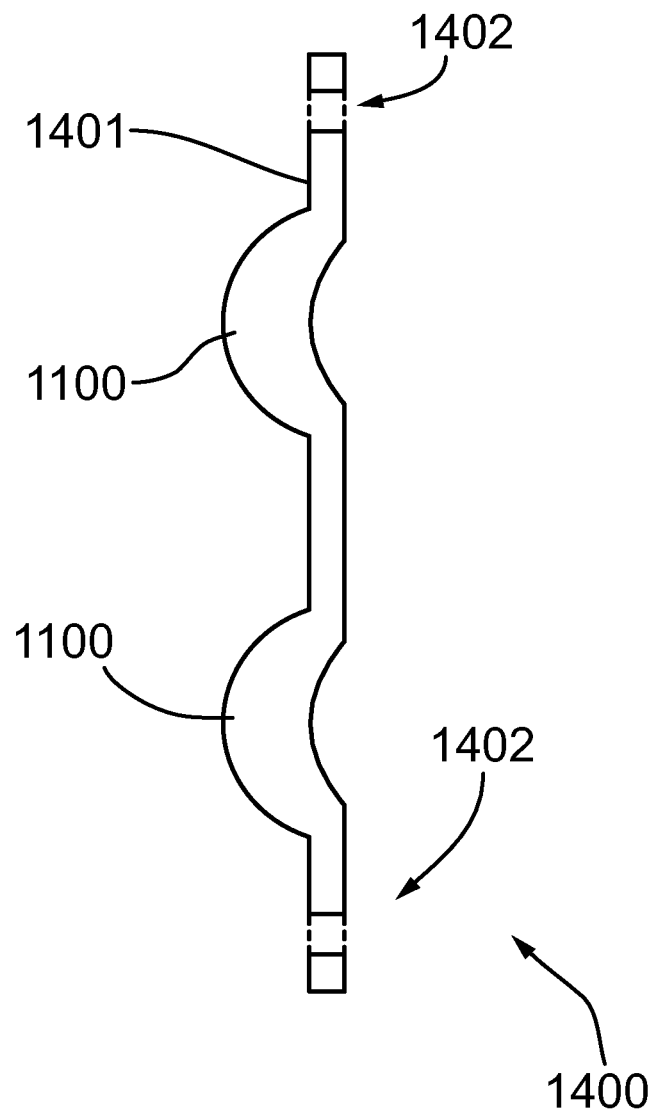
FIG. 14 is a cross sectional view of a lens assembly that may be used in some embodiments of the present invention.

Referring to FIG. 14, a lens assembly 1400 having lenses 1100 can be used in various embodiments of the work lights described herein or alternate work lights based upon the principles described herein in lieu of separate individual lenses. The lens assembly 1400 comprises a generally planar plate 1401 and the lenses 1100 in a single plastic piece that may be molded. The plastic plate 1401 may have screw holes 1402 or other provisions for mounting. The lenses 1100 may have any of the above characteristics, including but not limited to any of the optical characteristics, of the lenses 1100 or 1100a of FIG. 11 described above.

Although the lens assembly 1400 would preferably be a single piece of plastic that is molded and may be machined afterwards, it can be made of a different material such as glass or it may be made in a different way such as assembling the lenses 1100 into the planar plate 1401.

Although the plate 1401 is generally planar, it is not required to use a generally planar plate.

Figure 15:
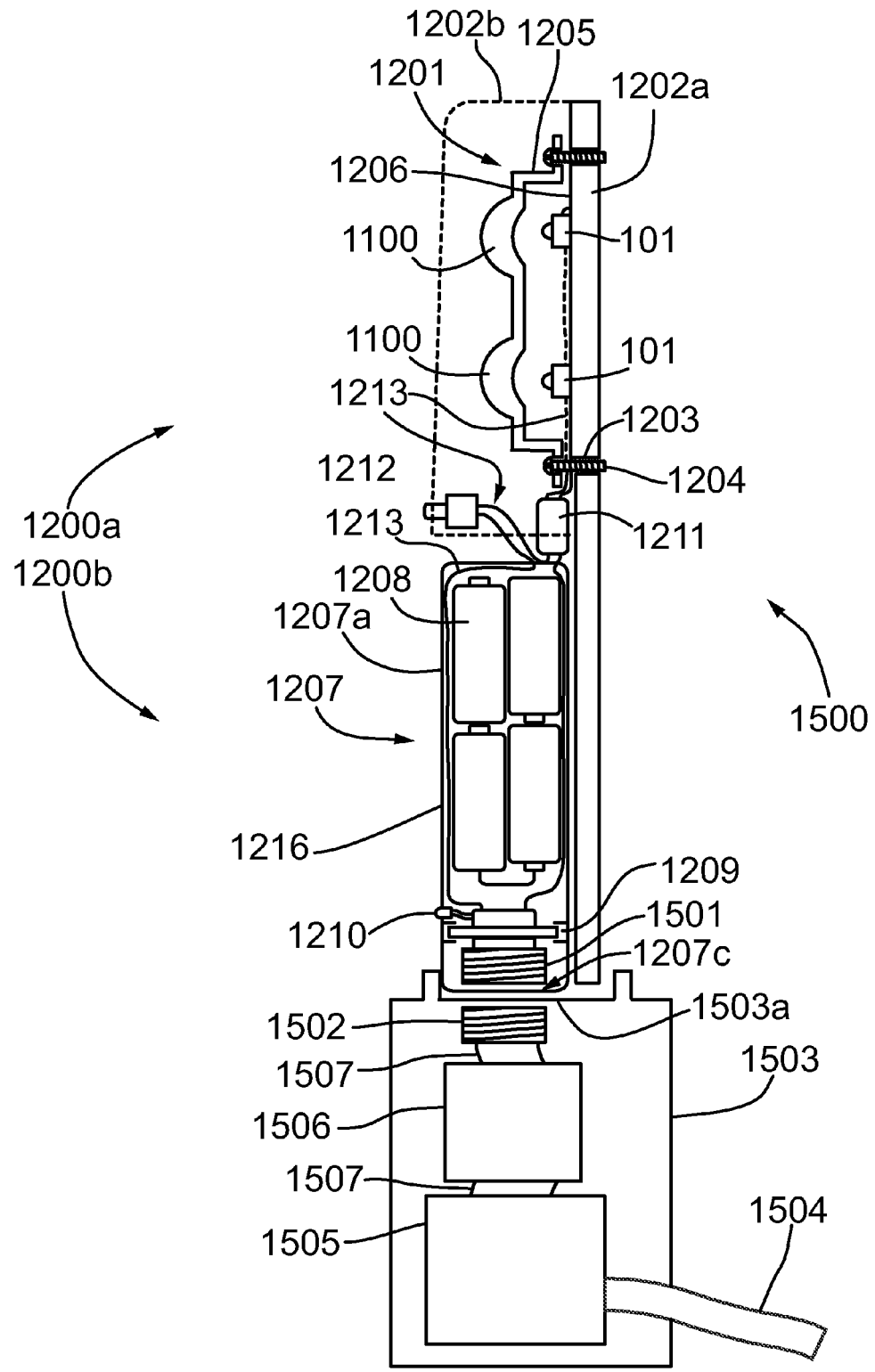
FIG. 15 is a cross sectional side view of a work light in accordance with a eighth embodiment of the present invention.

Referring to FIG. 15, a work light 1500 can be constructed like the LED work light 1200 shown in FIG. 13, except a receiving coil 1501 for inductive charging can be used in lieu of one or more charging jacks or other contacts.

The receiving coil 1501 supplies power to the charging circuit board 1209. In order to do so, the receiving coil 1501 receives power from a transmitting coil 1502 that is within a charging station 1503. The charging station 1503 preferably has a power cord 1504, a power supply section 1505 and a transmitting circuit 1506 such as a high frequency oscillator to supply power to the transmitting coil 1502. The transmitting circuit 1506 may operate at an audio frequency or at an ultrasonic frequency such as a frequency that may be considered a radio frequency. Having the transmitting circuit 1506 operate at a frequency lower than audio frequencies is foreseen to be impractical but not impossible. Wires 1507 would typically be necessary for purposes such as connecting the power supply 1505 or the transmitting coil 1502 to the transmitting circuit 1506.

The receiving coil 1501 and the charging circuit board 1209 are shown within the battery pack 1207, but other arrangements are possible such as having either or both of the receiving coil 1501 and charging circuit board 1209 located elsewhere in the work light 1500.

The battery pack 1207 has a coupling surface 1207c and the charging station has a coupling surface 1503a that are shown as flat and adjacent to their respective coils 1501 and 1502. No magnetic core material is shown, however addition of a magnetic core to either of or both of the transmitting coil 1502 or the receiving coil 1501 can improve transfer of power from the transmitting coil 1502 to the receiving coil 1501. Such magnetic cores may be made of ferrite, powdered iron or other powdered magnetic material, a solid magnetic material such as high silicon steel, or an assembly of laminations or wires or other narrow or thin pieces of a magnetic material such as "transformer steel", "high silicon steel" or iron.

Any magnetic cores may be arranged to exist inside or outside of either or both of the transmitting coil 1502 and receiving coil 1501. A magnetic core may have parts existing both inside and outside of any of the coils 1501/1502. Examples of such a core are the "E core" and the "pot core", which have both a region intended to extend through a coil (known as the "center leg") and a region intended to surround a coil (sometimes known as "outer legs", especially if the core is an "E core").

It may be found beneficial to have a piece or assembly of magnetic material passing through and/or around both the transmitting coil 1502 and the receiving coil 1501. This will typically necessitate having the coupling surfaces 1207c/1503a other than flat so as to permit such a piece or assembly of magnetic material to pass through and/or around both coils 1501/1502 while being contained within the battery pack 1207 or the charging station 1503.

Advantages of inductive charging include lack of corrosion and lack of need to clean charging jacks or charging contacts, ease of watertight or liquid-tight or explosionproof construction, and a more attractive appearance.

Most other parts within the work light 1500 are shown as identical to those in the LED work light 1200 of FIG. 13. Parts of the work light 1500 that are shown the same as corresponding parts of the LED work light 1200 are the LEDs 101, head section 1200a, handle section 1200b, lenses 1100 in a lens assembly 1201 that also has walls 1205, metal channel piece 1202 having side flanges 1202b and a rear flat section 1202a with an inner surface 1206 suitable for mounting the LEDs 101 on, screw holes 1203, screws 1205, battery pack 1207, batteries 1208, charging circuit 1209, indicator lamp 1210, circuitry 1211, switch 1212, and wires 1213. Other arrangements will be evident to those skilled in the art based upon the principles described herein.

Inductive coupling is not the only possible method for having a charging station 1503 recharge batteries in a work light 1500 or a battery pack 1207. For example, power can be transmitted capacitively through insulating surfaces by applying voltage at a high frequency to metal plates or other conductors having significant area. Both the receiver and the transmitter typically require two conductors for capacitive coupling, and each of these conductors that are associated with the transmitter would be in close proximity to corresponding conductors in the receiver. Alternatively the transmitter and the receiver each require only one conductor for capacitive coupling if the transmitter and receiver each also have a direct connection to each other, such as via a metal part of their outer casings. By further example, a charging station 1503 can transfer power to a work light 1500 or to a battery pack 1207 by further alternative means, such as a microwave beam, sound, or light or ultraviolet or infrared. The charging station 1503 may have a high power infrared LED (not shown) that irradiates one or more photovoltaic cells (not shown) in the work light 1500 or in the battery pack 1207. Any photovoltaic cells may utilize light sources other than one in the charging station to achieve some recharging of batteries 1208, for example ambient light, sunlight, or an electric lamp of a type normally used for other purposes such as a desk lamp or a larger and less portable work light.

As an even further example of alternative means to transfer power from a charging station 1503 to a work light 1500 or a battery pack 1207, the charging station 1503 can have a motor (not shown) and the work light 1500 or the battery pack 1207 can have a generator (not shown) that each have magnets (not shown) attached to their shafts so that the motor can turn the generator without direct mechanical contact.

Inductive coupling or coupling by any of the above alternative means that avoid or eliminate any or all direct electrical contacts are foreseen to be beneficial for LED lights generally whether or not they have a handle, whether or not they have a beam width of 40 to 90 degrees, and whether or not any of their LEDs are of a type that typically requires heatsinking. Power transfer by means avoiding direct electrical contact may benefit by a light lacking rechargeable batteries, such as a work light that is powered by an external power source such as AC line voltage while having a severe requirement of being insulated from said external power source, whether or not said light uses LEDs to produce light.

Figure 16:
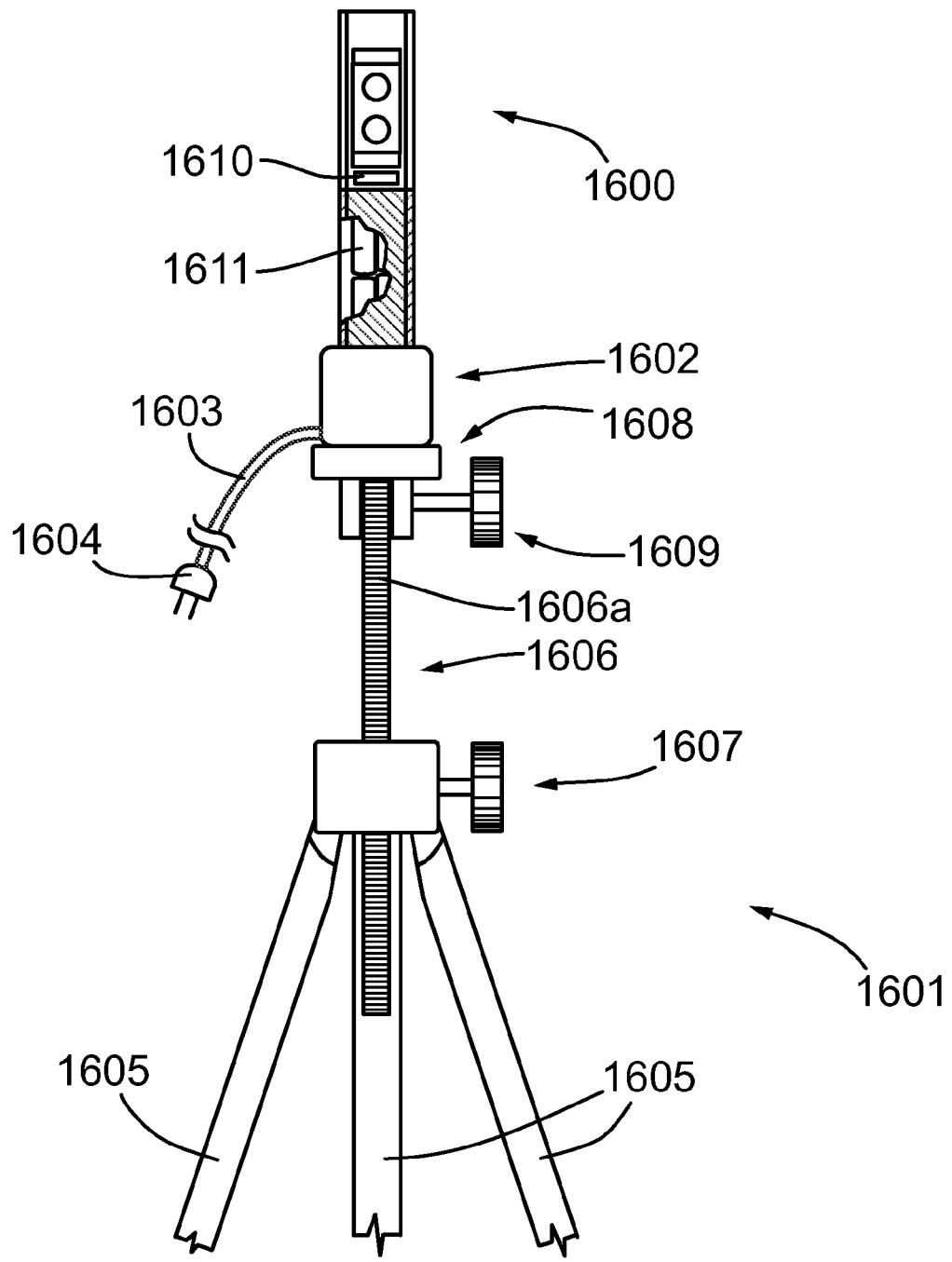
FIG. 16 is a frontal view of a work light in accordance with a ninth embodiment of the present invention.

Referring to FIG. 16, an LED work light 1600 can be operated while mounted on a tripod 1601. The tripod-mounted light 1600 is preferably able to continue operating if removed from the tripod 1601, and preferably has one or more rechargeable batteries 1611. The rechargeable batteries 1611 may or may not be removable from the LED work light 1600. The LED work light may alternatively have non-rechargeable batteries or no batteries at all.

Preferably, the tripod 1601 includes a charging station 1602 that recharges the one or more rechargeable batteries in the work light 1600. The charging station 1602 preferably receives power from a line cord 1603 that has a plug 1604. The charging station 1602 may alternatively receive power from alternative sources such as a low voltage DC external power supply such as an automotive battery charger, or an automotive battery. As an alternative to this arrangement, the LED work light 1600 may receive power directly from the line cord 1603.

The LED work light 1600 may be operable while any rechargeable batteries 1611 are being recharged. This can be accomplished, for example, by having the charging station 1602 supply a specific voltage that is suitable for charging batteries of a type that can be charged by applying a specific voltage, such as lead acid or lithium ion. Lead acid batteries can be charged by applying a voltage of approximately 13.5 to 14.4 volts per cell whether or not a load is connected to the batteries.

The tripod 1601 preferably has three legs 1605. The tripod preferably includes means to adjust the position and orientation of the work light 1600, such as but not limited to a rod 1606 that may have teeth or ridges 1606a and an engaging and associated height adjustment knob 1607, a tilting joint 1608, and/or a locking knob 1609 in any tilting joint 1608. Locking knobs 1609 and/or adjustment knobs similar to the height adjustment knob 1607 and/or other adjustment means and/or other adjustment locking means may be incorporated in the tripod 1601.

Although the LED work light 1600 is shown as mounted on a tripod 1601, it can be mounted on a stand other than a tripod. All features described of the tripod 1601 can be included in a stand other than a tripod. For example, the stand can have four legs instead of three legs 1605. As will be evident to those skilled in the art, the work light 1600 will be mounted to the tripod 1605 or other stand by a coupling such as a threaded pin on the tripod 1605 or other stand and a threaded receptacle on the work light 1600. A threaded receptacle is a form of accessory mount on the work light 1600. The other work lights described herein may be provided with an accessory mount to similarly couple with a tripod 1605 or other stand. As will be evident to those skilled in the art the addition of an accessory mount to the work lights described herein may require some modification to the work lights while remaining within the scope of the principles described herein. The accessory mount may be used with other accessories or be located elsewhere on the work light. Some additional accessories and alternative locations will be later described herein.

The LED work light 1600 or other embodiments may have but are not required to have a motion sensor or other human presence detector 1610. Such a motion sensor or human presence detector 1610 may be but is not necessarily of a passive infrared type or an ultrasonic type. The motion sensor or other human presence detector 1610 may include or be associated with circuitry (not shown) that dims or shuts down the LEDs in the LED work light 1600 when no people are close to the LED work light 1600 to benefit from illumination by the LED work light 1600. Benefits of such a motion sensor or other human presence detector 1610 include minimizing aging of LEDs and/or discharge of batteries in the LED work light 1600. This may permit operating LEDs within the LED work light 1600 at a higher power than is otherwise possible without excessive LED aging or excessive discharge of any included batteries.

The benefits of automatic dimming or automatic shutdown that results from absence of people may be significant in LED lights whether or not such LED lights are tripod mountable, whether or not their LEDs are of a type that typically requires heatsinking, whether or not such LED lights produce a beam that is 40 to 90 degrees wide, and whether or not such LED lights have a handle.

Figure 17:
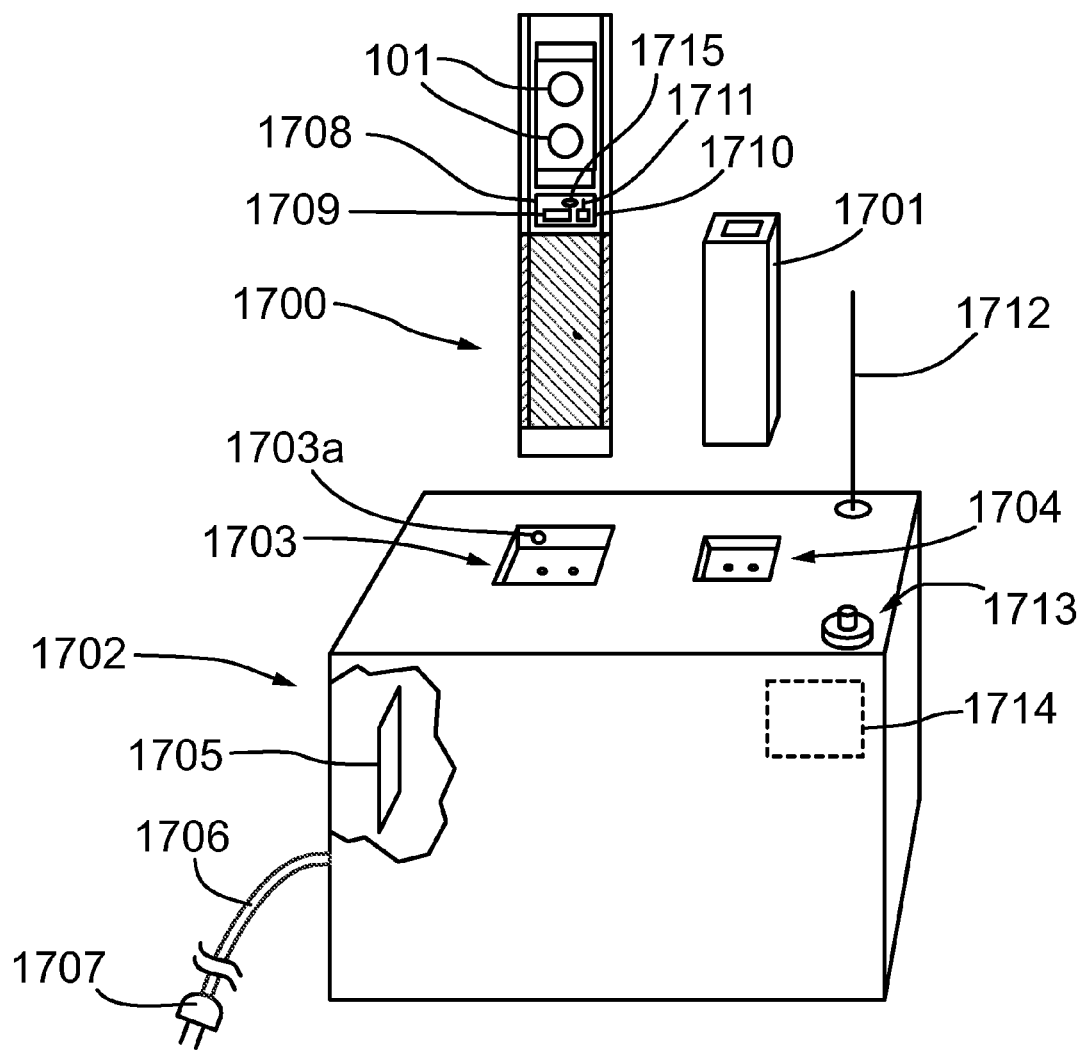
FIG. 17 is a frontal view of a work light in accordance with a tenth embodiment of the present invention.

Referring to FIG. 17, a rechargeable LED work light 1700 having a removable battery pack identical to a second battery pack 1701 can be recharged in a charging station 1702. The charging station may be able to recharge both the rechargeable LED work light 1700 and the second battery pack 1701 simultaneously. Alternatively, the charging station 1702 may give priority to recharging a rechargeable LED work light 1700 over a second battery pack 1701 if both are present and the batteries within the LED work light 1700 require charging. The charging station 1702 would charge the second battery pack 1701 if the second battery pack 1701 is present and requires charging and the rechargeable LED work light 1700 is absent or charged.

As shown but not required, the rechargeable LED work light 1700 may fit into an associated charging nest 1703 in the charging station 1702 while the second battery pack 1701 fits into a smaller associated charging nest 1704 in the charging station 1702. The charging nest 1703 may have a sensor 1703a such as a switch that is actuated by presence of the rechargeable LED work light 1700 for use in giving priority to charging the rechargeable LED work light 1700 over a second battery pack 1701.

The charging station 1702 preferably has circuitry 1705 that may include circuitry that is necessary for proper battery charging and circuitry that is necessary for any prioritizing of charging a rechargeable LE work light 1700 over charging of any second battery pack 1701.

The charging station 1702 preferably receives power through a cord 1706 that includes a plug 1707 that is suitable to plug into an AC line voltage outlet. Alternatively, the charging station 1702 may receive power from a source of low voltage DC such as an automotive cigarette lighter socket, an automotive battery or an automotive battery charger, in which case the charging station 1702 may have the cord 1706 include clips or a plug 1707 that can clip to an automotive battery or plug into an automotive cigarette lighter socket. An external power supply that provides a DC voltage of essentially 12 or 12-14 volts from line voltage AC and that has an automotive cigarette lighter socket can be found useful for supplying power to the charging station 1702 if the charging station 1702 is to be powered by low voltage DC.

It is to be noted that some nickel metal hydride batteries can be recharged in as little as 15 minutes and there are chargers for such batteries to recharge them that quickly. The charging base 1702 may be constructed so as to recharge the batteries in the rechargeable work light 1700 in approximately half an hour or less so that a user of the rechargeable work light 1700 can have it fully recharged during a lunch break. The charging base 1702 may or may not recharge the second battery pack 1701 as quickly as it can recharge the rechargeable LED work light 1700.

A charging station that can charge rechargeable batteries within a cordless appliance and also a second set of batteries outside the appliance can be beneficial even if the appliance is not one of the embodiments of the present invention described herein. LED work lights can benefit from such a charging station whether or not they have LEDs that typically require heatsinking, and whether or not they produce a beam that is 40 to 90 degrees wide. LED lights other than work lights with handles, such as LED lights intended to be attached to headgear, may also benefit from such a charging station whether or not they have LEDs that typically require heatsinking and whether or not they produce a beam that is 40 to 90 degrees wide.

Cordless tools and cordless lights such as the rechargeable LED work light 1700 can be lost in cluttered work areas or large work areas. The rechargeable LED work light 1700 can benefit from a paging system that causes such lost items to produce an audible signal and/or a visible signal or other alarm when one has to find them.

The rechargeable LED work light 1700 is shown having a circuit board 1708 that includes an electronic ballast 1709. The typically necessary wiring in the rechargeable LED work light 1700 is not shown.

The rechargeable LED work light 1700 is shown as having a paging receiver 1710 with a receiving antenna 1711. This permits paging the LED work light 1700 from a paging transmitter 1714 that is shown as being comprised in the charging station 1702. The paging transmitter 1714 is shown with an associated transmitting antenna 1712 and a paging pushbutton 1713.

The paging transmitter 1714 and associated paging pushbutton 1713 and transmitting antenna 1712 are not necessarily included in the charging station 1702 as shown, but may alternatively be comprised in a separate paging transmitter unit.

When the paging pushbutton is depressed, the paging transmitter 1714 transmits a paging signal that is received by the paging receiver 1710. When the paging receiver 1710 receives a paging signal, it produces an audible signal and/or a visual signal or other alarm so that the rechargeable LED work light 1700 can be located. Such an audible signal may be produced by a piezoelectric transducer. Visual signaling may be accomplished by the LEDs 101 or by a separate light source provided for paging purposes.

Preferably the visual signal would include flashing of the light source to attract the attention of the searcher. Flashing of the signal provides the additional benefit of identifying the work light so as to distinguish it from other light sources that may be in use.

The paging system may include an identification system such that multiple work lights within a single environment may be differentiated from one another. Such an identification system may include operating the work lights receivers and their respective transmitters on different frequencies. Alternatively, a code could be transmitted by the paging transmitter that is recognized by the appropriate paging receiver. As an example, a key fob transmitter and receiver pair could be used. One transmitter could be set to page multiple work light receivers independently. Such a receiver could be built into a single central station with multiple buttons for paging different lights. A charging station could be built with multiple storage and/or charging bays for work lights. Such a charging station could include a central paging station. Separate paging activators (such as button switches) could be provided on the central paging station for each work light on the paging system.

Each paging activator could be visibly associated with a different one of the storage and/or charging bays of a charging station. Visible indicators (for example name tags or an alphanumeric symbol) could be used to identify a paging activator and work light pair. Such a system could be used quickly to identify which work light is which in a common environment. This can avoid or resolve disputes. It can also assist in inventorying work lights. It can also assist in maintenance of work lights if, for example, batteries are to be changed on a given schedule for each light. If protective circuitry to prevent the rechargeable LED work light 1700 from operating with excessively discharged batteries or under other adverse conditions is provided, then a preferred arrangement of circuitry in the rechargeable LED work light 1700 preferably has the paging receiver 1710 not disabled by such protective circuitry. For example, the paging receiver 1710 may include an auxiliary battery 1715. Such an auxiliary battery 1715 may be arranged to be recharged whenever the rechargeable LED work light 1700 is recharged. Alternatively the auxiliary battery 1715 may be recharged from the battery pack within the rechargeable LED work light 1700. Further alternatively, the auxiliary battery 1715 may be recharged by a solar cell (not shown).

As an alternative to having an auxiliary battery 1715, the rechargeable LED work light 1700 may have the paging receiver 1710 bypass any protective circuitry intended to disable operation of the rechargeable LED work light 1700 under adverse conditions such as excessively discharged batteries. This can be acceptable since paging the rechargeable LED work light 1700 is not expected to worsen significantly an excessively discharged condition of any batteries nor significantly worsen any other adverse conditions such as any excessive temperature.

The paging transmitter 1714 and paging receiver 1710 are shown with the respective transmitting antenna 1712 and receiving antenna 1711 in order to respectively transmit and receive a radio signal.

Alternatively, the paging transmitter 1714 may transmit and the paging receiver 1710 may receive a signal other than a radio signal, such as an ultrasound signal or an infrared signal via appropriate transducers in lieu of the transmitting antenna 1712 and receiving antenna 1711.

Any transmitting antenna 1712 and/or receiving antenna 1711 may be different from the ones shown. For example, a wire being used for another purpose within the rechargeable LED work light 1700 may be used as the receiving antenna 1711. By further example, a conductive structural part, a heatsink or a reflector within the rechargeable LED work light 1700 may be used as the receiving antenna 1711.

In lieu of requiring the paging transmitter 1714, the paging receiver 1710 may be constructed so as to be actuated by receiving a signal that can be produced by means other than the paging transmitter 1714. For example, the paging receiver 1710 may be constructed so as to be activated by hand claps, a police whistle, a camera flash or blinking of ambient lighting.

Paging systems are particularly useful with compact LED work lights that can be easily lost within a crowded work environment such as an automotive garage. Paging systems are also particularly useful when working in dirty environments where the work light can be coated with oil, grease or other substances that tend to make the work light hard to distinguish from other devices in the environment. An audible signal is particularly useful in an environment where the work light may be placed in a drawer or other non-visible storage area. Again, this is particularly useful for compact LED work lights that can be easily stored away or hidden. A search for a work light can be conducted by activating the signal, listening for the signal, moving in the direction of the signal, and opening access to any storage areas, if required, until the work light is located. A visual signal is particularly useful in a noisy environment, such as an automotive garage. A combination of both visual and audible signals is useful for both noisy environments and environments where light may not be distinguishable. The paging system can have independent activation means for different signals.

LED work lights can benefit from a paging system whether or not they have LEDs that typically require heatsinking, and whether or not they produce a beam that is 40 to 90 degrees wide. LED lights other than work lights with handles, such as LED lights intended to be attached to headgear, may also benefit from a paging system whether or not they have LEDs that typically require heatsinking and whether or not they produce a beam that is 40 to 90 degrees wide.

Figure 18:
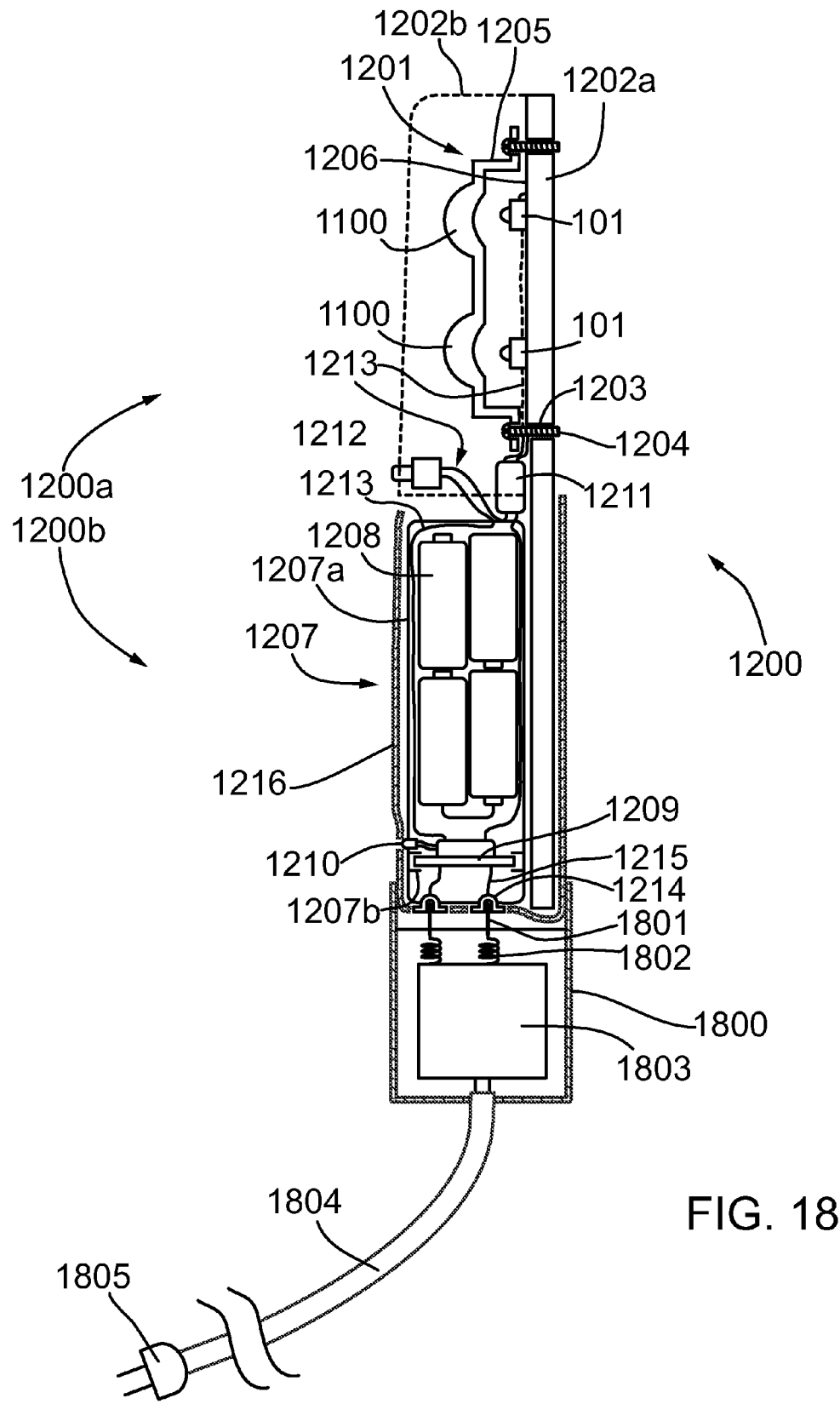
FIG. 18 is a cross sectional side view of an alternate embodiment to the above ninth embodiment of the present invention.

Referring to FIG. 18, the LED work light 1200 described above and shown in FIG. 13 may be constructed so as to be able to be operated while its batteries 1208 are being recharged. The LEDs 101, lenses 1100, and all parts 1200-1215 are described above in the description of the LED work light 1200 shown in FIG. 13, although some parts may need to be chosen, disposed and arranged such as to achieve recharging of the batteries 1208 while the LED work light 1200 is operating.

In order for the batteries 1208 to be recharged, the charging circuitry 1209 must receive power from an external power source, for example by receiving either line voltage AC or low voltage DC through a power cord 1804 that has a plug 1805. The power cord 1804 would preferably, as shown, supply power to an adapter 1800. The plug 1805 is shown as being of a type to be plugged into an outlet that supplies line voltage AC, although different connection means such as clips or a different plug may be used. For example, the plug 1805 may be a plug that plugs into an automotive cigarette lighter, so that the adapter receives low voltage DC, such as essentially 12 or 12-14 volts DC.

The adapter 1800 is shown as having electrical adapting means 1803 that may comprise a transformer and may further comprise a rectifier and/or a filter capacitor. This electrical adapting means 1803 is typically necessary in order to receive line voltage AC and supply power at a voltage that is suitable to be supplied to the charging circuit 1209. Alternatively, the charging circuit 1209 may be capable of receiving line voltage AC, or the charging circuit 1209 may have the capability of charging the batteries 1208 from either line voltage AC or low voltage DC. If the charging circuit 1209 is capable of receiving power directly from the power cord 1804, then the electrical adapting means 1803 is not necessary and the adapter 1800 would preferably merely be a fitting that attaches the power cord 1804 to the LED work light 1200. Further alternatively, not only any necessary electrical adapting means 1803 but also the charging circuit 1209 can be comprised within the adapter 1800 in lieu of having the charging circuit 1209 comprised within the LED work light 1200.

Regardless of specific arrangements, an LED work light such as the LED work light 1200 may receive power from one adapter 1800 with an associated power cord 1804 and plug 1805 that receive line voltage AC, and the same LED work light can also be operated from a different version of the adapter 1800, power cord 1804 and plug 1805 or other connection means that receive low voltage DC such as essentially 12 or 12-14 volts DC. Alternatively, it is possible that the plug 1805 can be detachable from the power cord 1804 so that a different version of the plug 1805 can be used, especially if the LED work light is capable of utilizing both line voltage AC and low voltage DC.

Any lights that can utilize low voltage DC may be able to utilize essentially 12 or 12-14 volts DC, a different voltage of DC, or both or a wide range of voltages of DC.

The LED work light 1200 may be operated while its batteries 1208 are being recharged. Such an arrangement is easy to accomplish if the batteries 1208 are lead acid batteries or lithium ion batteries, since supplying a specific voltage to such batteries will recharge such batteries while they have a load connected to them. In addition to supplying a fixed voltage, it may be necessary to use current regulation or other current limiting means to avoid having the batteries 1208 conduct excessive current should application of the voltage necessary for full charge otherwise cause excessive current to flow through the batteries 1208. It is preferable to have adequate current to simultaneously power the LEDs 101 and recharge the batteries 1208. Alternatively, part of the charging circuit 1209 or alternative additional circuitry may provide means to have the LEDs 101 receive power other than directly from the batteries 1208 when the adapter 1800 is receiving power and attached to the LED work light 1200. Further alternatively, the charging circuitry may be able to monitor the temperature or an electrical condition of the batteries 1208 while they are being charged, in order to properly charge any nickel cadmium or nickel metal hydride forms of the batteries 1208 while a load such as the LEDs 101 is connected to them.

Although the LED work light 1200 benefits from an ability to be operated while receiving power from an external source of power to recharge its batteries 1208 it is also able to be operated when the adapter 1800 and power cord 1804 are not attached to the LED work light 1200.

The adapter 1800 may comprise connecting prongs 1801 and springs 1802 in order to supply power to the charging jacks 1204 or alternative charging connectors that the LED work light 1200 preferably has for receiving power. Other means can be comprised in the adapter 1800 for connecting a power cord 1804 to an LED work light 1200.

Other arrangements will be evident to those skilled in art to recharge the batteries 1208 while the LED work light 1200 is being used. For example, a charging station may hold the LED work light 1200 in a position where it can be used while recharging the batteries 1208.

An LED work light with rechargeable batteries, whether or not the LED work light has LEDs of a type that typically requires heatsinking and whether or not the LED work light produces a beam that is 40 to 90 degrees wide, can benefit from being able to be operated whether or not its batteries are being recharged. Any LED work light with rechargeable batteries can benefit from being able to receive power from a detachable power cord whether or not the LED work light has LEDs of a type that typically requires heatsinking and whether or not the LED work light produces a beam that is 40 to 90 degrees wide.

An alternative embodiment of an LED work light 1200 that can utilize power of different voltages through different adapters 1800 and associated power cords 1804 may lack batteries 1208 and charging circuitry 1809, in which case it can only be operated while an adapter 1800 and associated power cord 1804 are attached. Such an LED work light may or may not produce a beam that is 40 to 90 degrees wide and may or may not have LEDs of a type that typically requires heatsinking. Such an LED work light may use one detachable adapter in order to utilize line voltage AC and it may use a different detachable adapter to utilize power of a different voltage such as 12 or 12-14 volts DC or other low voltage DC.

Figure 19:
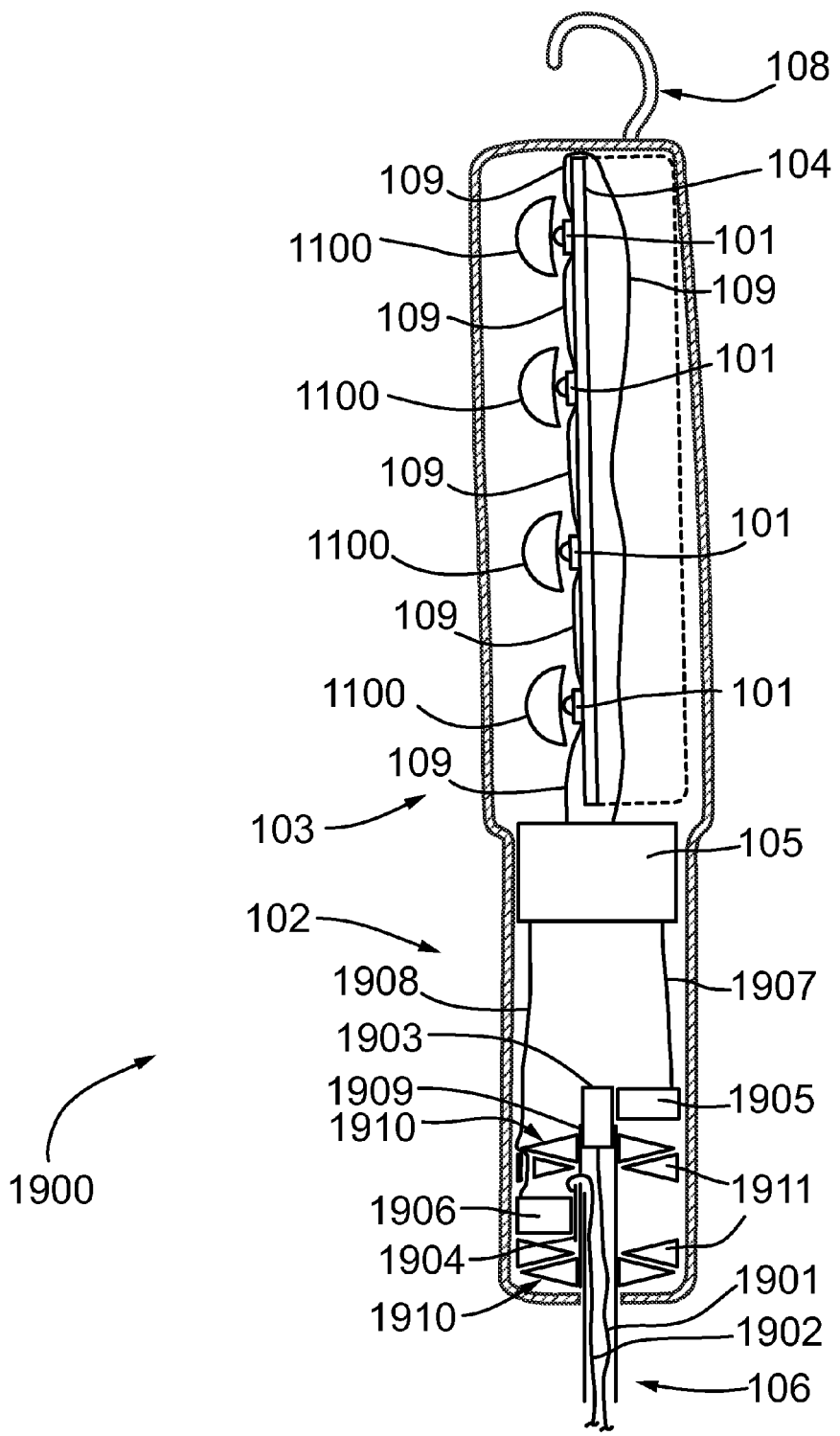
FIG. 19 is a cross sectional side view of a work light in accordance with a eleventh embodiment of the present invention.

Referring to FIG. 19, an LED work light 1900 having a power cord 106 further comprises means to allow the cord 106 to rotate within the LED work light 1900, or for the LED work light 1900 to rotate around the cord 106. This eliminates or at least reduces the occurrence and severity of twisting of the cord 106 that results from rotating the LED work light 1900 over time. Work lights can benefit from such means to allow rotation of the cord even if they use one or more light sources other than the LEDs 101 shown.

As shown, such means to permit rotation may use two rotatable contacts such as a rotating tip contact 1903 and a slip ring 1904, which are contacted by their respective brushes 1905, 1906. The tip contact and is connected to a first wire 1901 and the slip ring 1904 is connected to a second wire 1902 that run through the power cord 106. Not shown for clarity is the insulation that the wires 1901, 1902 typically have over most their length. The tip contact brush 1905 and the slip ring contact brush 1906 are connected to wires 1907, 1908 that are connected to a circuitry assembly 1905 that includes current limiting means typically required by the LEDs 101.

The power cord 106 may be connected to a "wall transformer" power supply. Alternatively, the power cord 106 may have a plug to receive line voltage AC, or a different plug such as one that fits into an automotive cigarette lighter socket.

The brushes 1905, 1906 may be metal or they may be made of a different conductive material. Alternatively, the brushes 1905, 1906 may be assemblies having springs and pieces of carbon that make contact with rotating contacts.

The LED work light 1900 is shown as being otherwise similar to the LED work light 900 of FIG. 9, comprising a head section 103, a handle section 102, a heatsink 104, and wires 109 connected to the LEDs 109.

The tip contact 1903 and the slip ring 1904 are shown as mounted on a tube 1909. Also shown as mounted on the tube 1909 are rotating guides 1910 which slide against stationary guides 1911. The stationary guides are shown as mounted on the interior surface of the handle section 102. Any rotating guides 1910 may be force-fitted over the tube 1909, glued to the tube 1909, otherwise attached to the tube 1909 or comprised within the same piece of material as the tube 1909. Likewise, the stationary guides 1911 may be force fitted into the handle section 102, glued to the handle section 102, attached in another manner to the handle section 102, or comprised in the same piece of material as the handle section 102.

The rotating guides 1910 and the stationary guides 1911 may be made of polytetrafluoroethylene or of any other material that has suitably low friction and suitably high resistance to wear. Alternatively, any of the rotating guides 1910 and the stationary guides 1911 may be made of a different material but coated with a suitable material such as polytetrafluoroethylene or molybdenum disulfide.

Arrangements other than the one shown may be used. For example, bearings and/or bushings may be added or used in place of brushes. Bearings may be fitted within or mate against ridges, grooves, cups and/or cones. Any bearings and/or bushings may or may not conduct current.

In lieu of the tip contact 1903, a second slip ring may be used.

By further example, the brushes 1905, 1906 may be arranged axially so as to contact two concentric washers or a washer surrounding a disc that are used in lieu of any slip rings 1904 and non-disc-shaped contacts 1903. Alternatively to a washer arranged with a disc or a smaller washer within it, two washers may be mounted onto different parts of the tube 1909. As an even further example, any rotating contacts may be conical rather than cylindrical or in the form of discs and/or washers.

Like other embodiments that have power cords, the LED work light 1900 may have added to it means to allow the power cord 106 to be detachable, described above and shown in FIG. 18.

Figure 20:
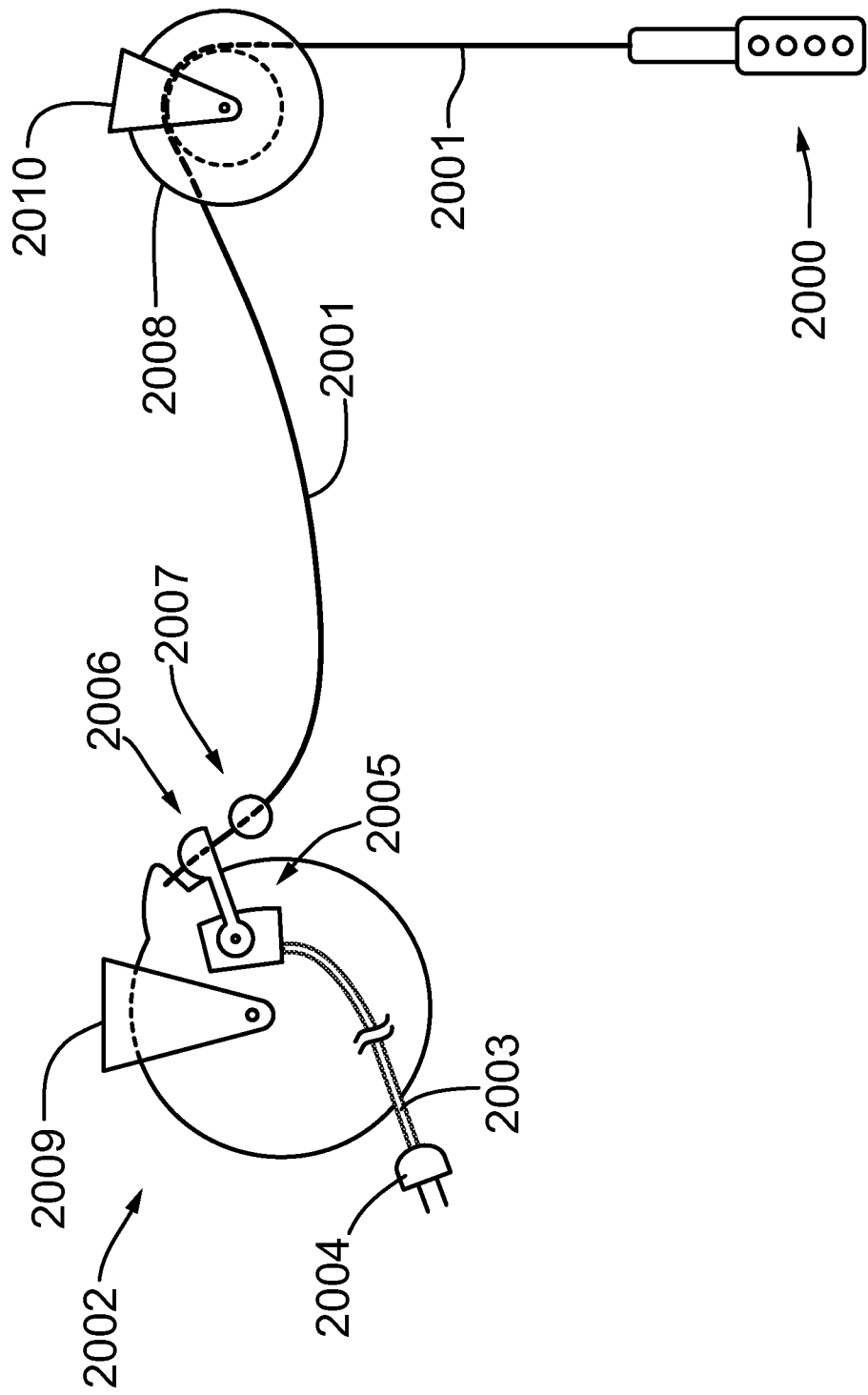
FIG. 20 is an external view of a work light in accordance with a twelfth embodiment of the present invention.

Referring to FIG. 20, and LED work light 2000 having a power cord 2001 can benefit from the power cord 2001 being retractable into a reel 2002. A second power cord 2003 is connected to the reel 2002 and has a plug 2004 to receive power from a suitable receptacle. The reel 2002 includes necessary means such as slip rings, a spring and a ratchet (not shown) to permit a user of the LED work light 2000 to alternately pull the LED work light 2000 into an extended position and to cause the LED work light 2000 to be retracted by pulling on the LED work light 2000.

The reel 2002 includes a normally closed switch 2005 with an extension lever 2006 that is actuated by a ball 2007 on the power cord 2001 when the LED work light 2000 is retracted. The ball 2007 can be moved along the power cord 2001 in order to set the minimum length of the portion of the power cord 2001 that normally exists outside the reel 2002.

The power cord 2001 may be threaded over one or more pulleys 2008 as shown. As shown, the reel 2002 may be mounted by means of a reel mounting bracket 2009 and the pulley 2008 may be mounted by means of a pulley mounting bracket 2010, but other arrangements are possible. Bearings and/or bushings (not shown) may be included in the reel 2002 and/or any pulleys 2008.

The above scheme has already been used with work lights that have a 13 watt compact fluorescent lamp as the light source. However, an LED work light 2000 can benefit from the reel 2002 and its switch 2005, whether or not the LED work light produces a beam having a width of 40 to 90 degrees, and whether or not the LED work light 2000 has LEDs that require heatsinking means.

The plug 2004 may be of a type that is intended to plug into a line voltage AC outlet. Alternatively, the plug 2004 may be of a type that fits into an automotive cigarette lighter socket. Further alternatively, the second power cord 2003 may have in lieu of the plug 2004 alternative means of receiving electrical power, such as clips that clip onto a battery.

Any current limiting circuitry and/or other circuitry that the LED work light 2000 requires may be comprised in the LED work light 2000, within or on the reel 2002, or within the plug 2004. For example, the plug 2004 may be a "wall transformer" that contains circuitry such as a current regulator.

The reel switch 2004 as opposed to a switch on work lights such as the LED work light 2000 is finding favor with workplace safety agencies, since lack of a switch on the LED work light 2000 reduces the risks of electric shock and ignition of flammable or explosive vapors. The lack of a switch on work lights is favored by workplace safety agencies even if the work lights are of a construction that does not eliminate a need for labels warning to use only in environments that are dry and lacking flammable and/or explosive vapors.

Means other than shown in FIG. 20 can be used to accomplish switching of a work light by pulling it or allowing it to be retracted. Furthermore, alternative means of switching a work light lacking a switch on its head or handle are possible, such as radio, ultrasound or other acoustic, or infrared or other optical means of remote control. Alternative switching means of switching a work light can include a position switch or a magnetic switch or other switch such as an optical switch in the light head or its handle, so that the work light can be turned off by leaving it in a position or in a location where it is normally not required to be operating. Any position switch may be, by example and not limitation, a "tilt switch", a mercury switch, a combination of mercury switches.

Figure 21:
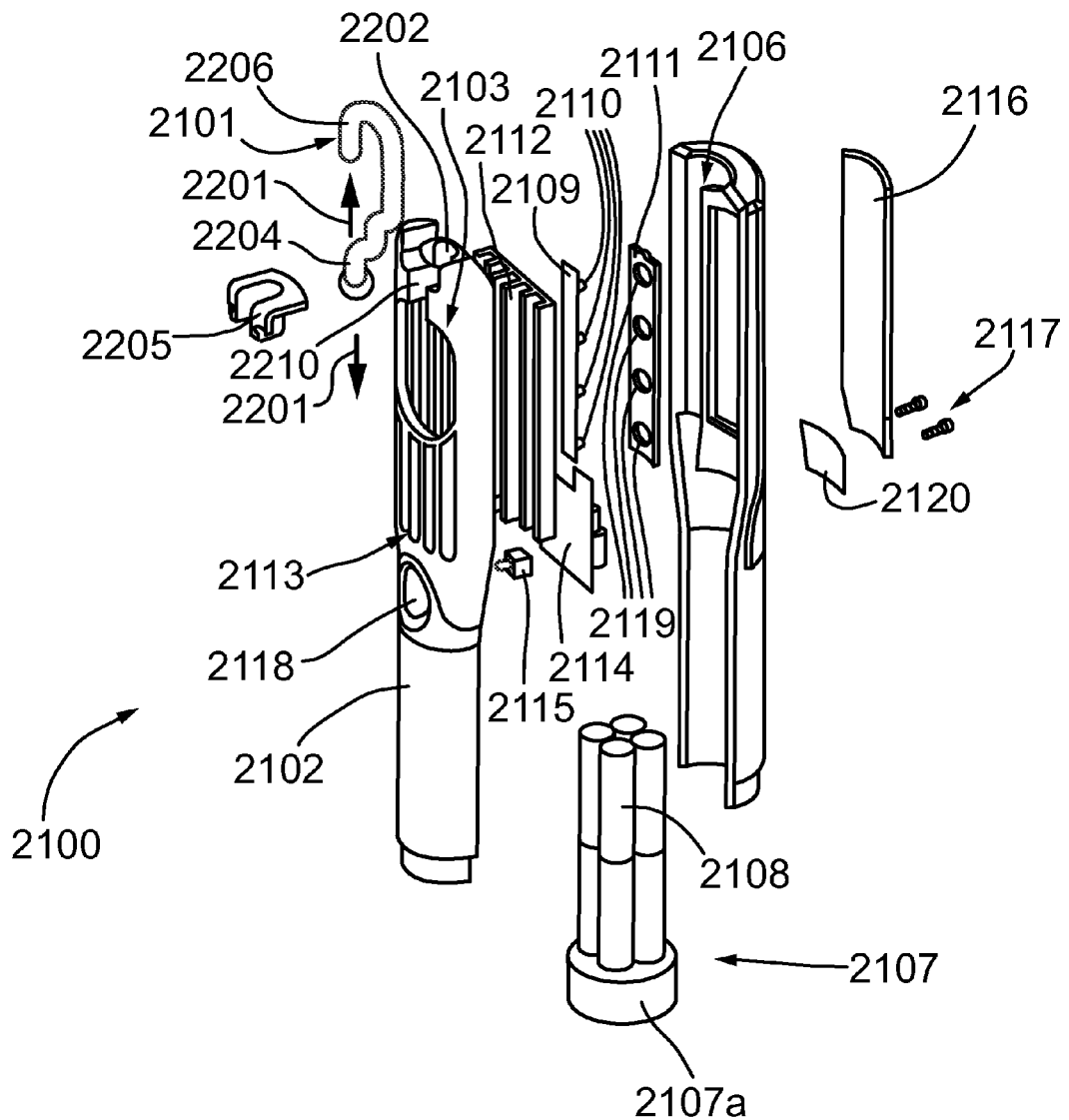
FIG. 21 is an exploded view of a work light in accordance with a thirteenth embodiment of the present invention.

Referring to FIG. 21, an LED work light 2100 can have a hook that can be positioned straight up, forward from straight up, rearward from straight up, rotated, or retracted into casing (not labelled in FIG. 21 for clarity, see reference numeral 2200 for example in FIGS. 22-24). As shown, the hook 2101 can be moved rearwards and downwards and rotated such as to fit into a suitable recess in the form of depression 2103 in rear casing piece 2102. The lower part of the hook is a ball 2104 that fits into a hook clip 2105 that is mounted in the rear casing piece 2102.

The ball 2104 and the remainder of the hook 2101 are preferably made from the same piece of material. Alternatively, the ball 2104 can be fitted over or otherwise added to the hook 2101. The hook 2101 and the ball 2104 are preferably made of injection molded thermoplastic. Alternatively, other materials such as a metal may be found suitable for the hook 2101 and the ball 2104. Further alternatively, the ball 2104, and also the hook 2101 if made from the same piece of material as the ball 2104, may be made of polytetrafluoroethylene or other material selected to minimize wear.

Like the ball 2104, the hook clip 2105 may be made of injection molded thermoplastic or other materials such as metal or polytetrafluoroethylene.

Other external structural parts of the work light 2100 are the front casing piece 2106 and the bottom casing piece 2107a. The work light 2100 may further comprise an insert 2120 that has a logo or other information printed on it. This insert 2120 is preferably plastic but may be made of an alternative material such as metal. The insert 2120 may have an adhesive backing or it be affixed to the casing 2200 by an adhesive material such as glue, or the insert 2200 may be otherwise retained in place, for example, by screws, a cover or the like.

A bumper, not shown, such as those that have been described with respect to other embodiments, may be overmolded on the casing or may also be included as a separate part that is sandwiched between the front casing piece 2103 and rear casing piece 2102.

The bottom casing piece 2107a receives a battery pack 2107 comprising this bottom casing piece 2107a and batteries 2108. Not shown are electrical connections, such as wiring to deliver electrical power from the batteries 2108, and a charging jack for recharging the batteries 2108.

The work light 2100 further comprises an LED board 2109 and a single piece lens assembly 2111.

The lens assembly 2111 preferably has convex lens elements 2119 in the same manner as single piece lens assemblies described previously. LEDs 2110 are mounted on the LED board 2109. Preferably the LED board 2109 is a metal core printed circuit board and the LEDs 2110 are of a type that is intended to be reflow soldered onto metal core printed circuit boards. Metal core printed circuit boards are desired for their ability to conduct heat from the LEDs 2110. The LED board 2109 is mounted to a heatsink 2112. This provides thermal connection from the LEDs 2110 to the heatsink 2112. Other arrangements are obviously possible, such as mounting alternative LEDs by alternative means to an alternative LED board. For example, LEDs of Luxeon Star type by Lumileds can be screwed onto an aluminum LED board or further alternatively directly to the heatsink 2112. Alternatively, in some circumstances, particularly with lower ambient temperature, adequate air flow, and a small number of LEDs, and where the maximum recommended LED power is not very high by today's standards, for example at near or less than 1.25 watts in many cases, the only heatsink that may be necessary is the metal core printed circuit board that come with high power LEDs, with the LEDs attached to these boards by the LED manufacturers or suppliers, such printed circuit boards are heatsinks for the purposes described herein.

The rear casing piece 2102 has openings in the form of slots 2113 so that heat can be transferred to ambient air outside the casing 2200 from the heatsink 2112 by convection and/or by conduction of heat. The slots 2113 allow the heatsink 2112 to be smaller in size than would otherwise be required, particularly where the casing 2200 material is generally not considered to be a good thermal conductor. This includes most electrically insulative materials that would be preferably used for the casing 2200 to avoid causing a conductive path through contact with the casing 2200.

It is generally preferable to have the size of the heatsink 2112 as small as possible while being adequate to prevent the temperature of the LEDs 2110 from becoming excessive, such that the life expectancy of the LED is significantly impacted. Preferably the heatsink will maintain the LEDs 2110 at or below the maximum rated junction temperature of the LEDs 2110. This requires dissipation of heat being generated by the LEDs when in use. A heatsink should be chosen to maintain a temperature below the maximum rated junction temperature of the LEDs 2110 by the temperature rise of the LED junction above the temperature of the heatsink, or some other selected value depending on the desired working life of the LEDs 2110. The temperature rise of the LED junction above the temperature of the heatsink may be measured as the amount of power in watts supplied to the LED multiplied by the LED's thermal resistance, in degrees C. per watt. Many LED manufacturers provide LED datasheets that mention their thermal resistance and maximum permissible junction temperature, or other information on which to base the appropriate design of a heatsink.

As an example for the specified components used in the preferred embodiment of the work light 2100, since most white LEDs that have a maximum rated input power near 1.2 watts have a thermal resistance of approximately 15-17 degrees C. per watt, the temperature of the semiconductor chips in the LEDs 2110 will be approximately 18-22 degrees C. hotter than the heatsink 2112. The heatsink 2112 and the slots 2113 must dissipate heat adequately for the temperature of the heatsink 2112 to be cooler than the maximum rated junction temperature of the LEDs 2110 by at least approximately 18-22 degrees C. plus a safety factor of a few degrees C. when the ambient temperature is the maximum that the work light 2100 is rated to be operated in. Such a heatsink 2112 will typically have a temperature near or below 75 degrees C. when the ambient temperature is 35 degrees C. if the work light is rated for operation in an ambient temperature as high as 50 degrees C.

Some stock heatsinks are available for which their manufacturers provide thermal resistance figures. The junction temperature of an LED would be the ambient temperature plus the amount of power in watts supplied to the LED multiplied by the sum of the thermal resistances of the LED and the heatsink. Where the heatsink is enclosed inside a casing, its effective thermal resistance can increase and the ambient temperature for these calculations may be based on the temperature of the air within the casing. Thus, temperature design should be verified for the particular configuration of each work light.

The shape of the work light 2100 is preferably selected such that the overall depth of the work light 2100 is minimized to permit use in small areas such as under the dashboard of an automobile, while allowing the heatsink 2112 to have adequate area for dissipating heat from the LEDs 2110. As a result, the work light 2100 as shown has a width greater than its depth, and the slots 2113 are placed on the rear surface of the work light 2100. Alternatively, the work light 2100 may have a depth greater than its width, in which case the slots 2113 would preferably be placed on the sides of the work light 2100 rather than its rear surface.

It is to be understood that the lights described herein should be able to withstand prolonged use. Although the lights may sometimes be used for short periods of time, often the lights will be used for prolonged periods of several hours or more while work is being performed. The temperature design should take this into account.

Where external casing electrical conductivity is not a concern then alternative work light embodiments can have a casing, such as casing 2200, that is made substantially from a material that is electrically conductive, for example a metallic casing. Such a casing is likely to be thermally conductive as well and could serve as the heatsink 2112 or part of the heatsink 2112, in which case the casing continues to enclose the LEDs and optics and to house the heatsink as the heatsink is integrated with the casing. This may allow for a reduced heatsink and work light size, as there may be more effective transfer of heat to the ambient air external to the work light. Alternatively, a similar size could be chosen with a longer LED life, or possibly the slots 2113 can be omitted or reduced in size. The material may also be more durable than many electrically insulative materials.

If external casing electrical conductivity remains a concern then the electrically conductive casing material can be coated with an electrically insulative material. The combination of a casing substantially made from a material generally considered to be a good thermal conductor which is also generally considered to be a good electrical conductor that is coated in a material that is not considered to be a good electrical conductor can increase the overall ability of the heatsink to transfer heat to the ambient air while limiting the possibility of creating an electrical conductive path through contact with the exterior of the casing when the work light in use. The coating is considered to be part of the casing for the purpose of this description.

The rear casing piece 2102 is non-planar to prevent blocking of the slots 2113 when the work light 2100 is laid down it against the rear casing piece 2102. Although many other non-planar configurations could be used for this purpose, the rear casing piece 2102 is arcuate about a longitudinal axis of the work light 2100 as can best be seen in FIG. 24a.

The slots 2113 are preferably dimensioned so that an operator's skin cannot accidentally contact the heatsink 2112. It is possible that such contact could result in a burn. Other forms of openings in the casing for cooling the heatsink could be provided, for example a larger number of smaller openings in the rear casing piece 2102, for example in a reticulated pattern forming a grill, can allow sufficient air movement while preventing access to smaller objects than the slots 2113. The size and pattern of the openings will need to be configured for the particular configuration of work light selected, including for example the heatsink and LEDs used.

Also mounted to the heatsink 2112 is a circuit board 2114 that may have an LED driver circuit such as a boost converter or one or more current regulators in order to provide an electrical current through the LEDs 2110 reliably of the desired magnitude. Alternatively, dropping resistors may be used in place of circuitry on the circuit board 2114. Further alternatively, the LEDs 2110 may be connected directly to the batteries 2108 although this is usually not preferred since the magnitude of current flowing through the LEDs may as a result vary excessively with temperature, battery condition, and variations in the electrical characteristics of the LEDs 2110. The circuit board 2114 may have other circuitry such as a charging circuit for charging any batteries 2108 or accessory circuitry such as for a paging receiver.

Although the circuit board 2114 is shown as being mounted on the heatsink 2112, it may be mounted anywhere within the work light 2100.

Although the work light 2100 is shown as being powered by batteries, it may receive power from other sources. The work light 2100 may be designed to accept a battery pack 2107 or a similarly shaped plug that delivers power from a cord that is connected to a "wall wart" power supply or to an automotive cigarette lighter plug.

Shown is a switch 2115. The switch may be but is not necessarily of a type that can be used either as a momentary switch when partially depressed or as being turned on or off by being fully depressed.

Alternatively, the switch 2115 may be a momentary type and logic circuitry (not shown) on the circuit board 2114 accepts pulses of electricity delivered by a momentary switch 2115 in order to turn on or off. Further alternatively, circuitry including logic circuitry on the circuit board 2114 can be switched not only on/off but also through a "cycle" of more than one magnitude of brightness plus an "off state" by depressing the momentary switch 2115 an appropriate number of times. For example, pressing the switch 2115 while the work light 2100 is off can turn it on at full brightness, depressing the switch 2115 a second time reduces the brightness, and pressing the switch 2115 a third time can turn the work light 2100 off.

A switch cap 2118 may be mounted in the rear casing piece 2102 over the switch 2115. Whether or not a switch cap is used, the switch 2115 may be mounted in a location other than as shown. Alternatively, other switching means including remote control means can be used. The switch cap 2118 is preferably made of rubber.

The lens assembly 2111 may be protected from scratching by a transparent lens cover 2116. The lens cover 2116 may be replaceable. Screws 2117 are shown for holding the lens cover 2116 onto the front casing piece 2106. The lens cover 2116 may extend over the insert 2120 to protect it and, possibly, to retain it. Alternatively, as with other embodiments the lens assembly 2111 could itself be a cover for the LEDs 2110.

The work light 2100 has similarities to other embodiments, such as the work light 1200 described in FIG. 13. For example, the lens elements 2119 shown in the work light 2100 could work in the same manner as the lens elements 1100 shown in the work light 1200. The lens assembly 2111 shown in the work light 2100 is similar to the lens assembly 1201 shown in the work light 1200 except it may lack the walls 1205 of the lens assembly 1201. The work light 2100 is shown as having a battery pack 2107 comprising batteries 2108 while the work light 1200 is shown as having a battery pack 1207 comprising batteries 1208. The work light 2100 has LEDs 2110 while the work light 1200 has LEDs 101. The work light 2100 has a switch 2115 while the work light 1200 has a switch 1212. The circuit board 2114 in the work light 2100 is analogous and may be similar to the circuit board 1211 in the work light 1200. Some parts that the work light 2100 could have but which are not shown include wires 1213 shown in the work light 1200 in FIG. 12.

Referring to FIGS. 22, 23 and 24, some of the parts described above for the work light 2100 shown in FIG. 21 are visible when the light is assembled. The casing 2200 is made up of the front casing piece 2106, rear casing piece 2102 and bottom casing piece 2107*a*. The pieces 2106, 2102, 2107*a* may be held together screws or the like, or by some or retention means such as respective tabs and grooves on the pieces that allow for a snap fit. In FIG. 22, a frontal view of the work light 2100 shows the front casing piece 2106, the bottom casing piece 2107*a*, and the lens cover 2116. Through the lens cover 2116 the lens assembly 2111 including its lens elements 2119 would normally be visible, but have been omitted in FIG. 22.

The height H of a preferred embodiment of the work light is approximately 300 millimeters. The width W of this preferred embodiment is approximately 60 millimeters. The base diameter D2 if this preferred embodiment is approximately 43 millimeters, or sufficiently large to hold the desired batteries while being of a size that is comfortable to hold. As will be evident to those skilled in the art, alternate embodiments with alternate shapes can be made based on the principles described herein while remaining within the scope of the invention as defined by some of the claims.

In FIG. 23, a side view of the work light 2100 shows the front casing piece 2106, the rear casing piece 2102, the bottom casing piece 2107*a*, the lens cover 2116, the switch cover 2118, and the additional piece 2120 that may have a logo or other information. Also shown are some of the ventilation slots 2113.

The depth D1 of the upper portion of the work light 2100 is approximately 35 millimeters in a preferred embodiment.

In FIG. 24, a rear view shows the rear casing piece 2102, the hook 2101 in its retracted position, the hook ball 2104, and the hook clip 2105. Visible features of the rear casing piece 2102 are the ventilation slots 2113 and the depression 2103 that the hook fits in when retracted.

Figure 25:
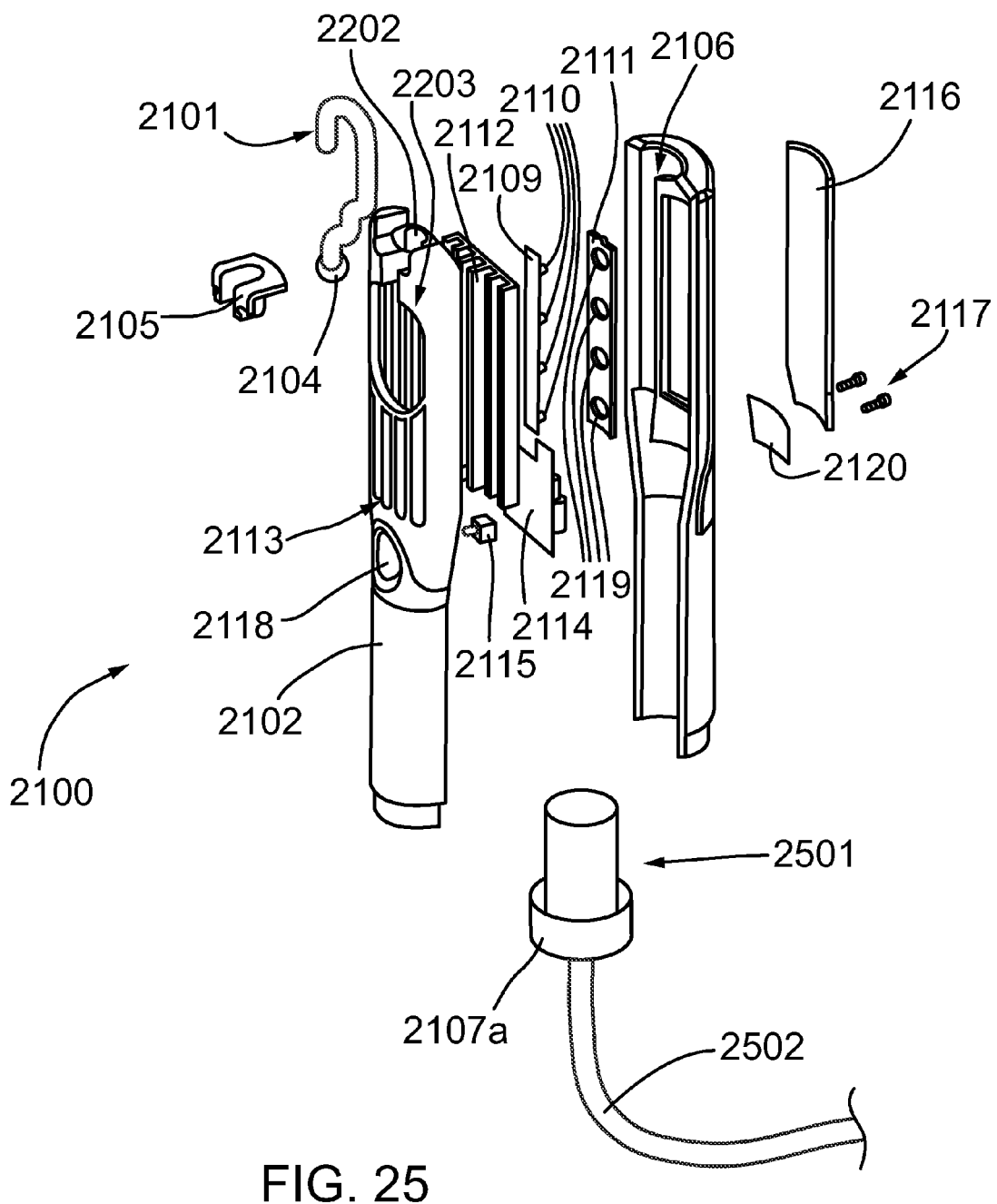
FIG. 25 is an exploded view of an alternative configuration of the work light of FIG. 21.

Referring to FIG. 25, the work light 2100 is shown with an adapter plug 2501 in lieu of the battery pack 2107 shown in FIG. 21. All other parts 2101-2106 and 2108-2120 shown in FIG. 21 are shown and any or all of these parts may be identical to those in FIG. 21. The work light 2100 may have capability of both using a battery pack 2107 as shown in FIG. 21 or receiving power from an adapter plug 2501.

The adapter plug 2501 may or may not have the same shape and/or size as the battery pack 2107.

The adapter plug 2501 is shown including the bottom casing piece 2107*a* the way the battery pack 2107 in FIG. 21 does. The bottom casing piece 2107*a* is shown as a cap that fits over the front casing piece 2106 and the rear casing piece 2102. Alternatively, the bottom casing piece 2107 may be in the form of a plug. Further alternatively, any battery pack 2107 or adapter plug 2501 may be in the form of a plug that serves as the bottom casing piece 2107*a* without the bottom casing piece 2107*a* being a distinctly separate part.

The work light may further comprise gaskets or o-rings (not shown) between any of the casing pieces 2102, 2106, and 2107*a* for watertightness or other purposes such as vibration dampening that may result in the work light 2100 sounding more sturdy when tapped.

The adapter plug 2501 has a cord 2502 that receives power from an external power source (not shown) such as a "wall wart" power supply, line voltage AC, or automotive power. The adapter plug 2501 may have circuitry within it (not shown) if necessary for the work light 2100 to operate from the power received through the cord 2502.

The work light 2100 and/or the adapter plug 2501 may have circuitry that enables the work light 2100 to operate from a wide variety of power sources, such as both line voltage AC and automotive power, both 120 volt and 240 volt line voltage AC, or even any AC or DC voltage from 12 to 250 volts. Alternatively, the work light 2100 may be supplied with more than one adapter plug 2501 in order to operate from more than one type of external power source.

Figure 28:
FIG. 28 is a rear perspective view of the work light of FIG. 21 with its hook in a retracted position.
Figure 27:
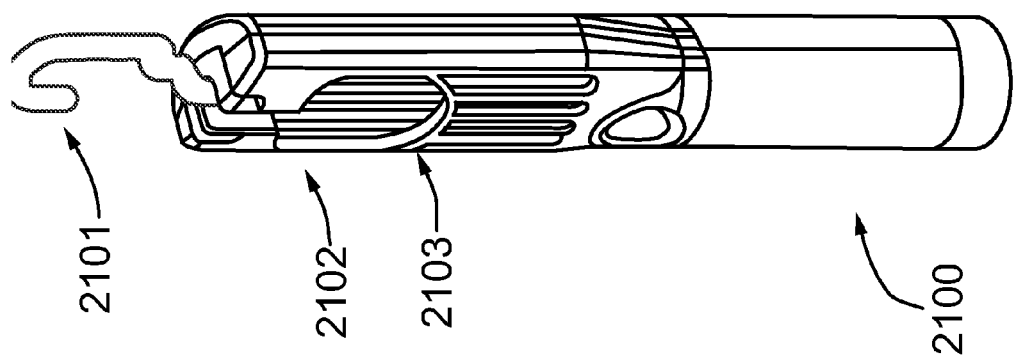
FIG. 27 is a rear perspective view of the work light of FIG. 21 with its hook in an upward position.
Figure 26:
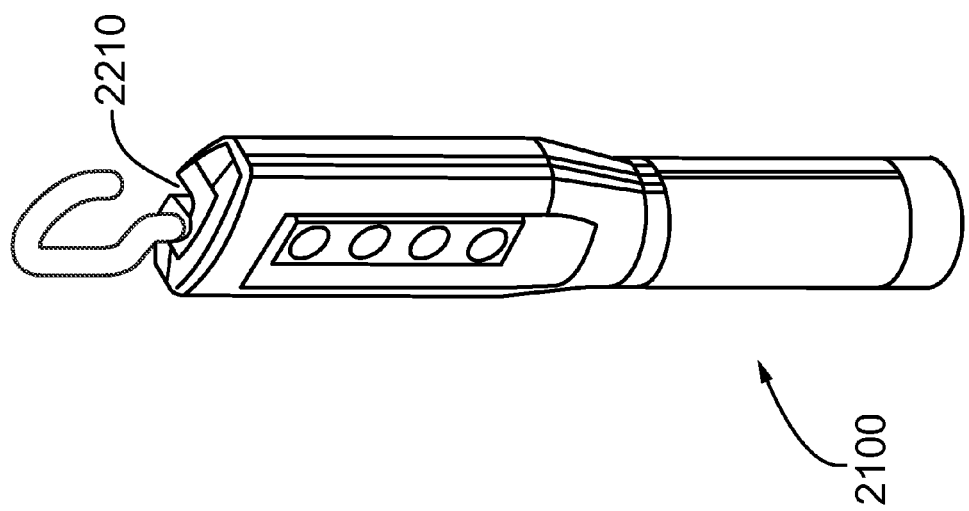
FIG. 26 is a front perspective view of the work light of FIG. 21.

Referring to FIGS. 26, 27 and 28, the hook 2101 is shown in two different positions, with the hook 2101 in an extended position in FIGS. 26 and 27 while in FIG. 28 the hook 2101 is retracted into the depression 2103 in the rear casing piece 2102.

The hook 2101 can take many other positions relative to the casing 2200. The position shown in FIGS. 26 and 27 is a fully extended position for the work light 2100, where the hook 2102 extends from the top of the light 2102. A partially extended position is evident in FIG. 34, where the hook 2101 extends from the rear of the light 2100. In either of these positions the hook 2102 can be rotated about a hook axis 2201 (indicated by arrows in FIGS. 21 and 32) through the ball 2104 and the hook 2102.

In the fully extended position the hook axis is perpendicular to the top of the light 2100, while in the partially extended position hook axis 2201 is perpendicular to the rear of the light. When in the fully extended position the beam axis from the light 2100 is generally perpendicular to the hook axis, whereas in the partially extended position the hook axis is generally parallel to the beam of light.

Figure 32:
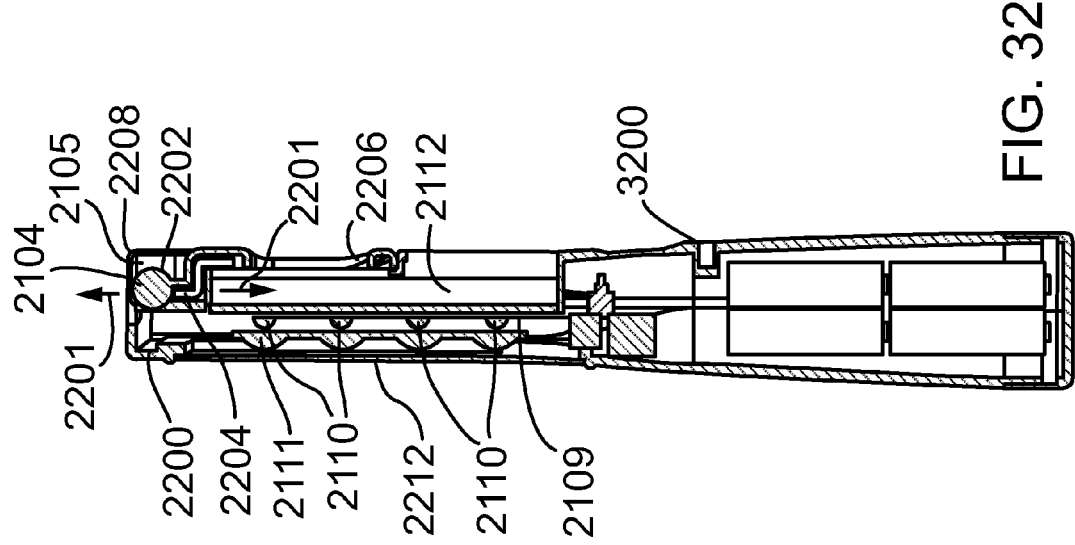
FIG. 32 is a cross-section of the work light of the fourteenth embodiment along the line A-A of FIG. 22.

The particular configuration of the hook 2101 is best evident in FIGS. 21, 24 and 32. As is evident from the FIGS. and the above description, the ball 2104 fits into a socket 2202. The socket 2202 is enclosed by and partially formed by the hook clip 2105. The hook 2101 has a hook extension portion 2204 and a hook portion 2206. In the work light 2100 the hook axis 2201 extends through the hook extension portion 2204 and the ball 2104. The hook extension portion 2204 extends the hook portion 2206 beyond the casing 2200 adjacent the socket 2202 when in the fully extended and partially extended positions. This allows the hook 2101 to rotate about the hook axis 2201 when in these positions while not being impeded by the casing 2200. If desired, the casing 2200 can be shaped adjacent the socket 2202 such that the hook 2101 can not be rotated about the hook axis 2201 when in one or more positions between the partially extended position of FIG. 34 and the fully extended position of FIG. 24. For example, corner 2208 best shown in FIG. 32 can block the rotation of the hook about the hook axis 2201 if desired. This can be advantageous in provided a tactile indication between a partially extended and the fully extended position. Alternatively, the hook extension portion 2204 can be of sufficient length for the hook portion 2206 to pass the casing 2200 and rotate about the hook axis 2201 in all positions between the fully extended position and the partially extended position of FIG. 33.

Channel 2210 (see in particular FIGS. 21, 24 and 26) extends into the socket 2202 to permit the hook 2101 to rotate about the ball 2104 perpendicular to the hook axis 2201. This allows the hook to move between the fully extended and partially extended position. The channel 2210 also extends into depression 2103 to allow folding away and storage of the hook extension portion 2204 in the depression 2103.

Hook 2101 can be mounted in the work light 2100 in many alternative configurations that would allow rotation of the hook 2101 about the hook axis 2201. Such configurations may also include rotation of the hook 2101 perpendicular to the hook axis 2201. The hook 2101 does not have to be mounted on a ball 2103 and socket 2202 in order for this to occur; however, a ball 2103 and socket 2202 is a very effective way of carrying this out. As an example, the hook 2101 could be alternatively mounted without ball 2103 on a double swivel configuration that allows for rotation about the hook axis 2201 and perpendicular to it.

Figures 29, 30:
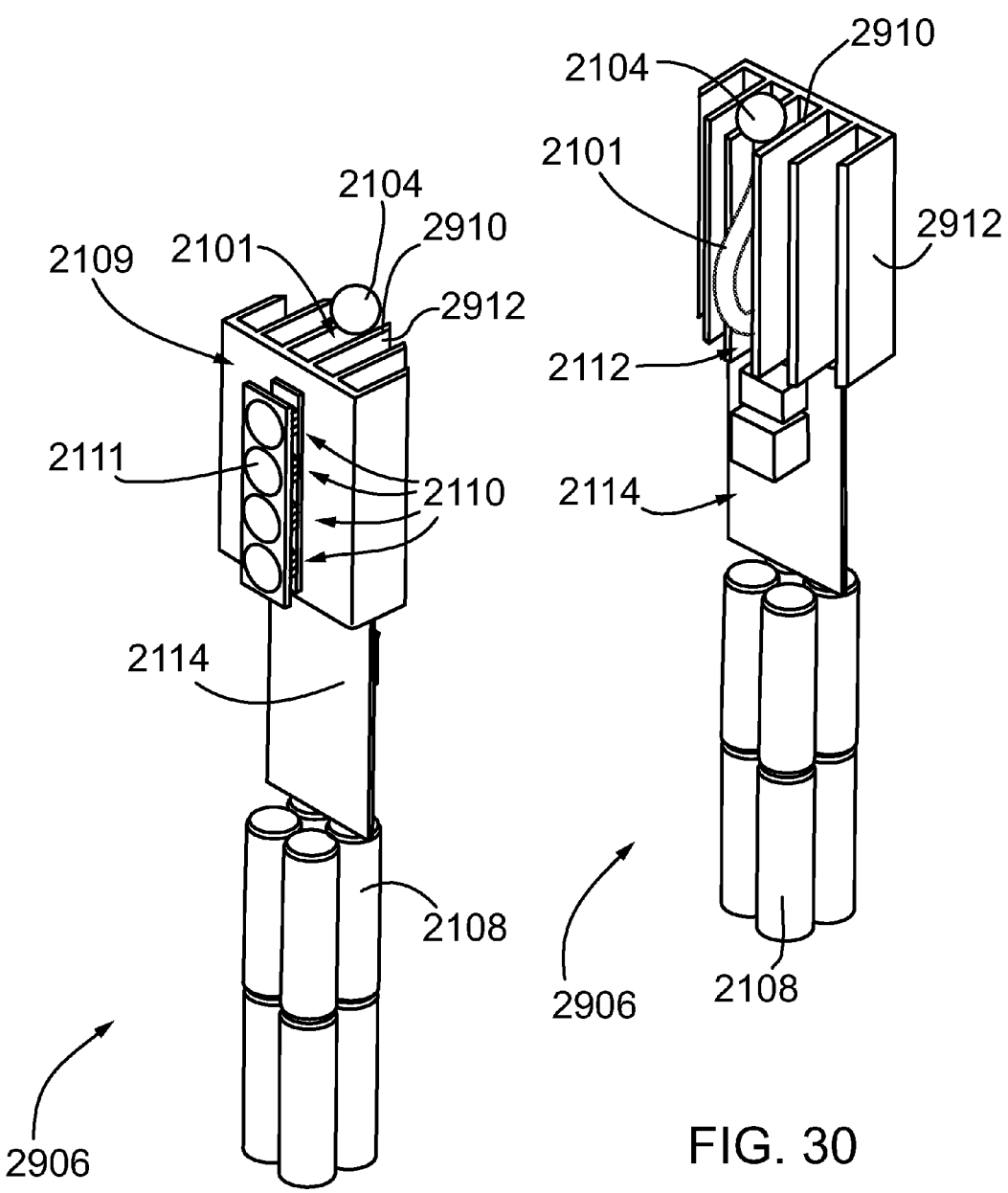
FIG. 29 is forward perspective view of internal parts of a work light in accordance with a fourteenth embodiment of the present invention.
FIG. 30 is a rear perspective view of internal parts of a work light in accordance with the fourteenth embodiment of the present invention.
Figure 31:
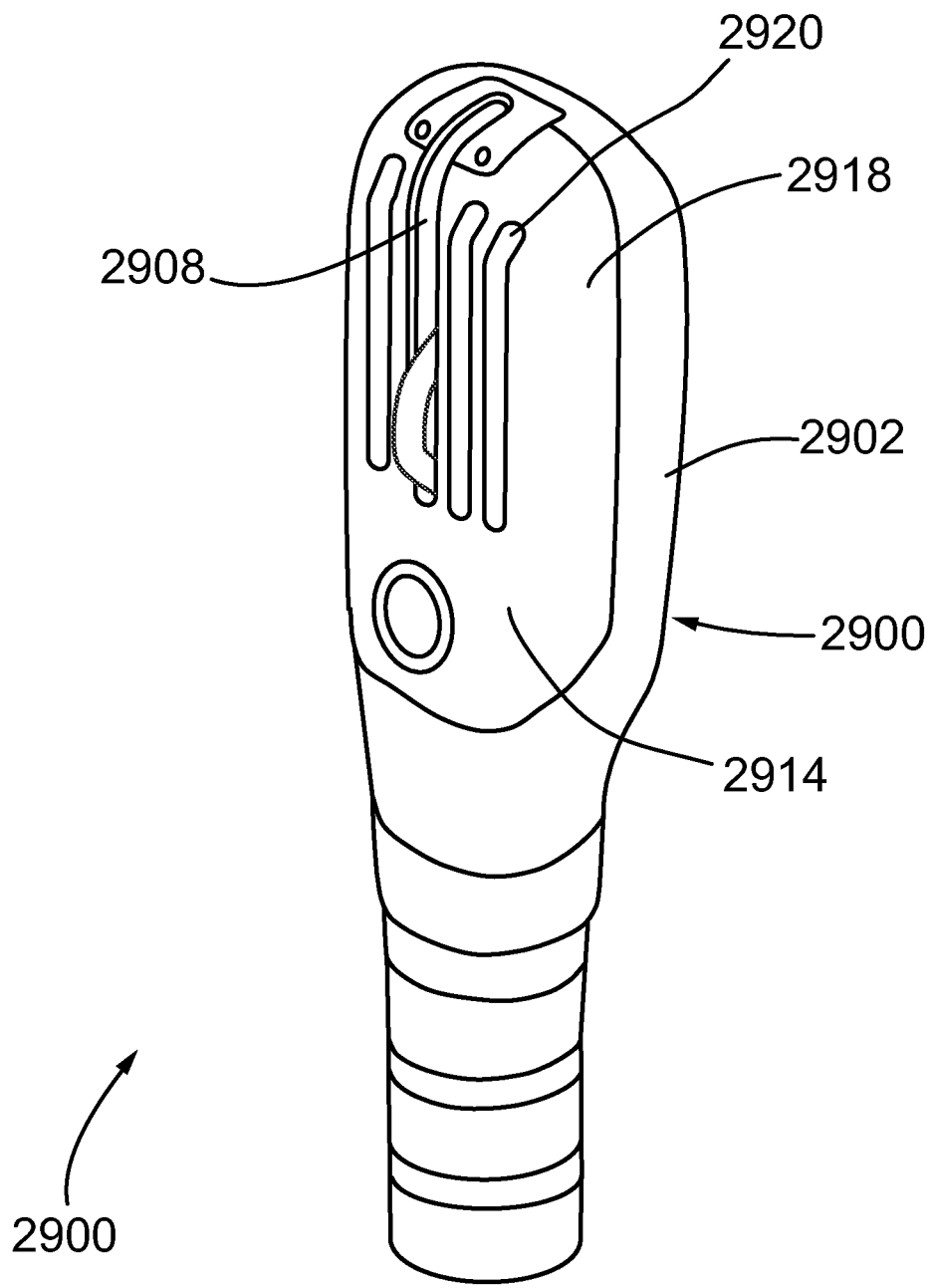
FIG. 31 is a rear perspective view of the fourteenth embodiment, including casing.

Referring to FIGS. 29 and 30, views are shown of some internal parts of a work light 2100a. The work light 2100a is similar to the work light 2100 described above, except that in the work light 2100a the hook 2100 when retracted fits into the heatsink 2112 as shown in FIG. 30. The shown parts of the work light 2100a may be similar or identical to the corresponding parts of the work light 2100, although the heatsink 2112 must be deep enough in the work light 2100a for the hook 2101 to retract into.

Shown are the hook 2101 with its ball 2104, the batteries 2108, the LEDs 2110 mounted on the LED board 2109, the heatsink 2112, and the circuit board 2114.

Referring again to FIG. 32, the work light 2100 has a very compact design, in particular in head section 2212 along a dimension parallel to the beam axis. Internally, casing 2200 sandwiches lens assembly 2111, LEDs 2110 on LED board 2109, and heatsink 2112, such that the components are immediately adjacent one another. The LEDs 2110, LED board 2109 and heatsink 2112 are in thermal contact. When viewed in cross-section it is evident that the work light has an elongate profile that is smaller in a dimension generally parallel to the beam axis of the light than in any dimension generally perpendicular to the beam axis. In the work light 2100 this is true even though the LEDs 2110 and heatsink 2112 occupy together the dimension generally parallel to the beam axis. In the work light 2100 this is true even though the casing 2200 may be formed from a electrically insulative material. In the work light 2100 this is true even though the hook 2101 when stored occupies the dimension generally parallel to the beam axis together with the LEDs 2110 and heatsink 2112.

It is understood that the casing pieces 2102, 2106 and 2107a combine to form the casing 2200, and that the casing is functionally divided into head section 2212 and handle section 2214 (see reference numerals on FIGS. 22, 23 and 24).

Figure 33:
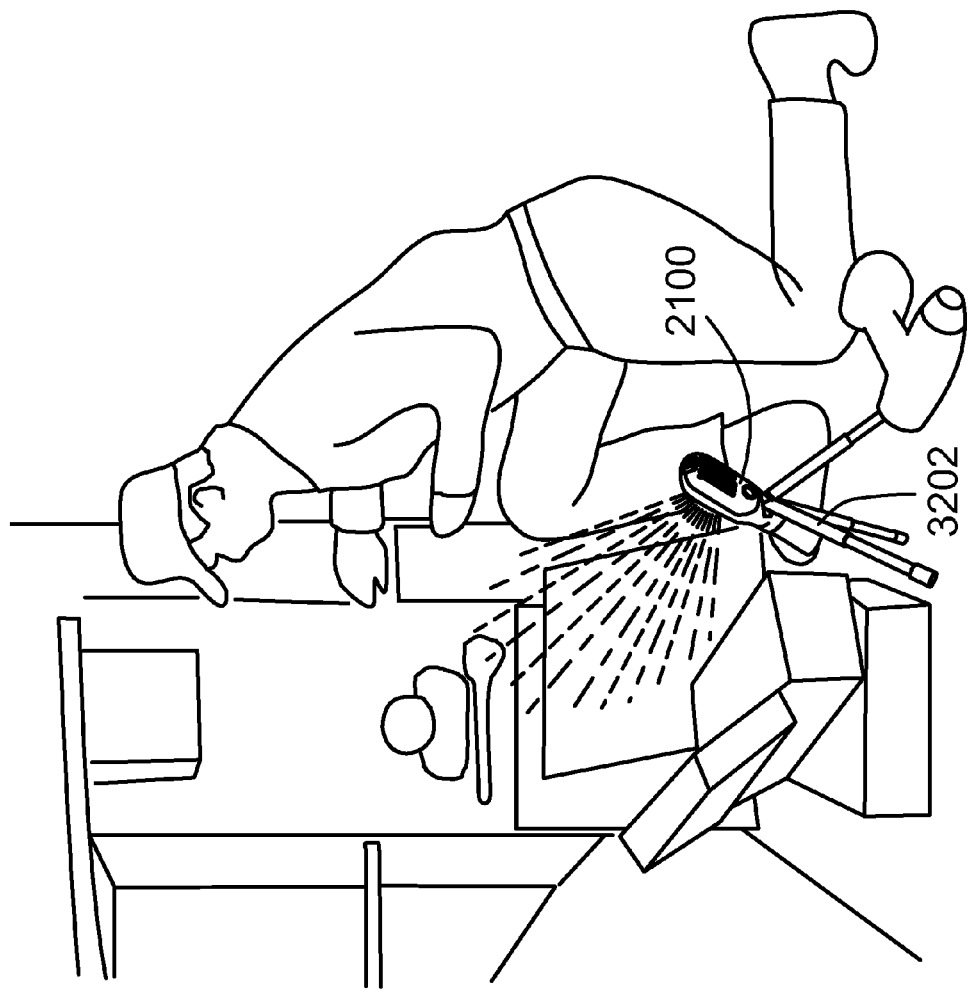
FIG. 33 is an illustration of the work light of FIG. 21 in use on an accessory stand.
Figure 34:
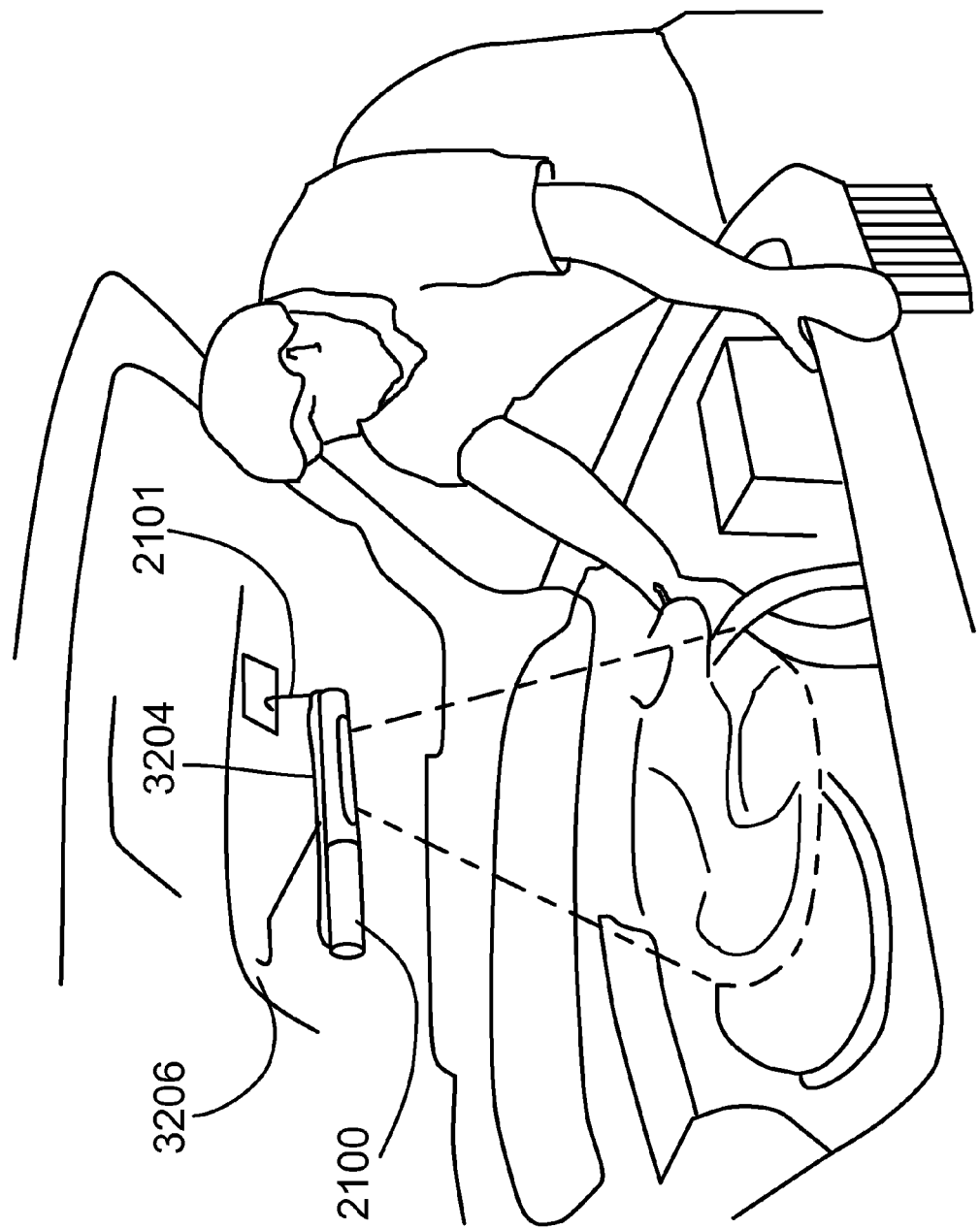
FIG. 34 is an illustration of the work light of FIG. 21 in use with an accessory mounting attachment.

Referring to FIGS. 32, 33 and 34, the work light 2100 is provided with an accessory mount 3200 (FIG. 32). The accessory mount 3200 receives work light accessories, such as a work light mounting device, for example, stand 3202 (FIG. 33) for the mounting the work light 2100 on a generally horizontal surface, a mounting bracket 3204 (FIG. 34) for mounting the work light 2100 to an external location, such as the underside of an automotive hood 3206, or an extra hook, not shown.

The accessory mount 3200 is preferably a threaded mount that allows for manually releasable coupling of an accessory. The mount could take other forms, such as for example a bayonet mount. Where the casing 2200 is a relatively soft material, such as a plastic where threads may wear over time, the mount 3200 may include an insert, not shown, in the casing 2200. The insert could be of a more durable material, such as brass. The threads of the mount 3200 could then be provided in the brass insert.

An accessory mounting bracket 3204 could be used in addition to the hook 2101 to provide two multiple mounting locations for the work light 2100. Mounting of the work light from multiple mounting locations allows more flexible positioning of the work light 2100 to direct the beam axis in a desired direction. The mounting bracket 3204 may be rigid to hold the work light in position without additional support means such as the hook 2101. The mounting bracket 3204 may be flexibly rigid to allow manual adjustment of the bracket 3204 to adjust the direction of the work light 2100.

Figure 35:
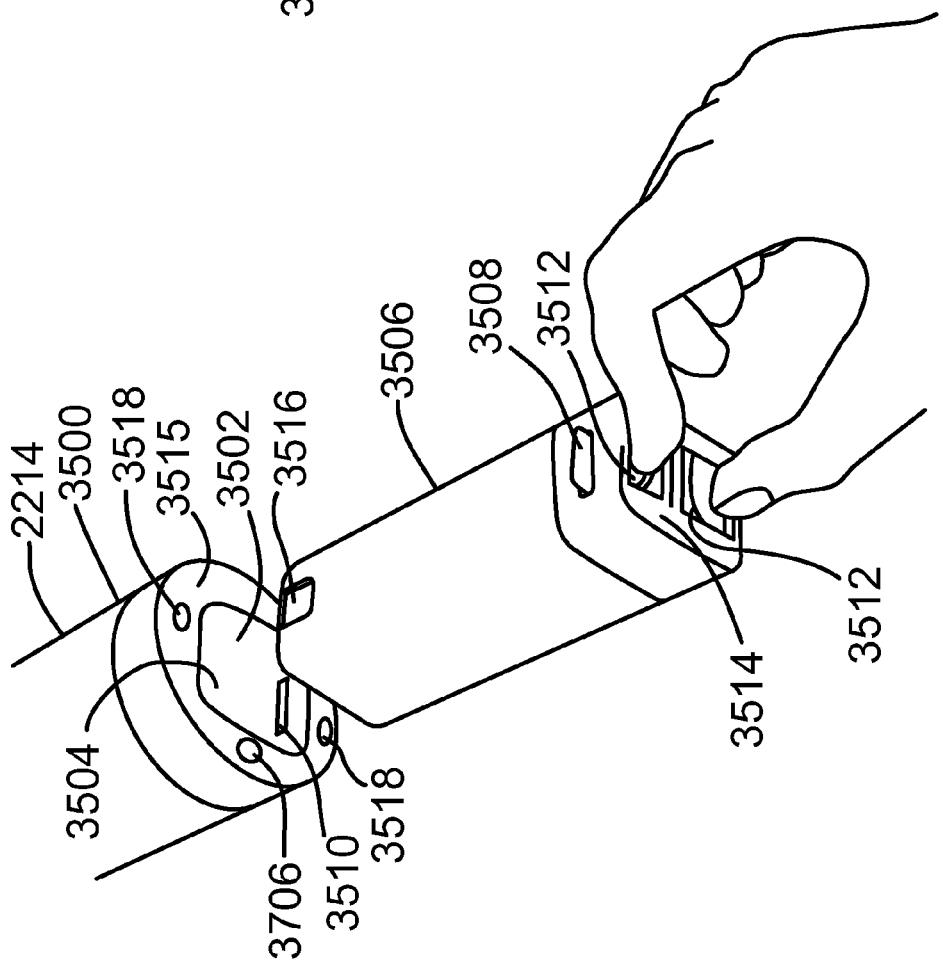
FIG. 35 is an exploded perspective view of an end of the handle of the work light of FIG. 21 and a battery pack in accordance with an embodiment of the present invention for insertion into the handle.

Referring to FIG. 35, an alternate handle 2214 and battery pack implementation is shown for a battery operated work light, such as work light 2100. Although it is recognized that the handle and battery implementation can be used on other work lights, the implementation will be described herein with respect to work light 2100. Bottom casing piece 2107a is replaced by a battery contact piece 3500. The piece 3500 connects to the front casing piece 2106 and rear casing piece 2102 as did the base casing piece 2107a. The piece 3500 has an aperture 3502 into the handle cavity 3504.

Battery pack 3506 has a profile that fits through aperture 3502. The battery pack 3506 is retained in the handle cavity 3504 by resiliently-loaded (for example, spring loaded) tabs 3508 (one of which is evident in the FIG.) that fit into slots 3510 (one of which is evident in the FIG.) in the cavity 3504. The tabs 3508 can be retracted by squeezing opposing retention actuators 3512 on an exposed end 3514 of battery pack 3506. When inserted the battery pack exposed end 3514 is generally flush with handle end 3515.

The battery pack 3506 has contacts 3516 (one of which is evident in the FIG.). The cavity 3504 has corresponding contacts, not shown, for making electrical connection from the battery contacts 3516 to components internal to the work light 2100.

Figure 36:
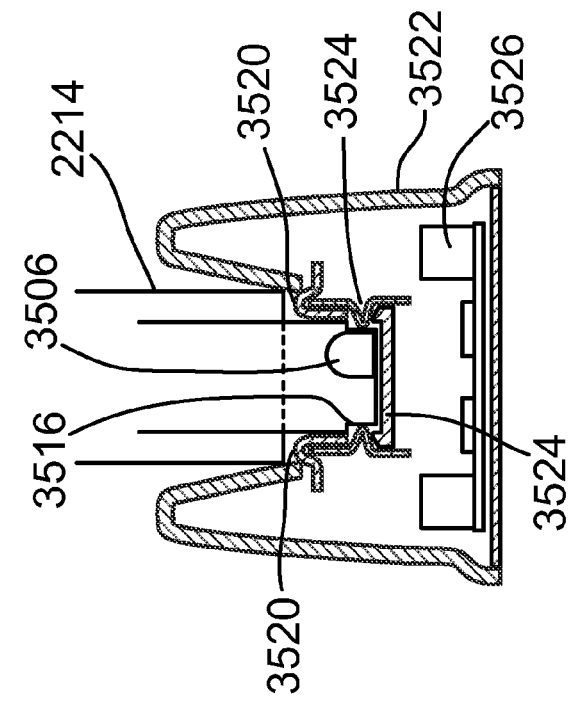
FIG. 36 is a cross-section of an embodiment of a charging station in accordance with an embodiment of the present invention in use with the work light of FIG. 21, and superimposed thereon, in use with the battery pack of FIG. 35.

Handle end 3515 has charging contacts 3518 for connection to light charging contacts 3520 on charging station 3522. As described previously for other embodiments, charging to light 2100 from charging station 3522 will occur when battery pack 3506 is inserted in work light 2100. Superimposed on FIG. 36 is an alternate charging position of charging station 3522. In this position battery pack 3506 may be inserted directly into the charging station 3522 for charging of battery pack 3506 without work light 2100. The battery pack is inserted such that the contacts 3516 engage battery charging contacts 3524 on the charging station 3522.

As shown, respective ones of the charging contacts 3520 are connected to the corresponding respective ones of the charging contacts 3524. The contacts 3520 may be separated from the contacts 3524 to allow for different charging features for the light 2100 and standalone battery pack 3506, such as the priority charging discussed previously for other embodiments. Charging circuitry 3526 such as that described previously for other embodiments is included in the charging station 3522.

To reiterate, only one of the battery pack 3506 or light 2100 containing battery pack 3506 can be charged at a time in the charging station 3522, notwithstanding that both a battery pack 3506 and a light 2100 are shown in FIG. 36. Other embodiments such as those that have multiple charging bays may be adapted to the battery pack 3506, handle 2214 and charging stations 3522 configuration described herein.

Figure 38:
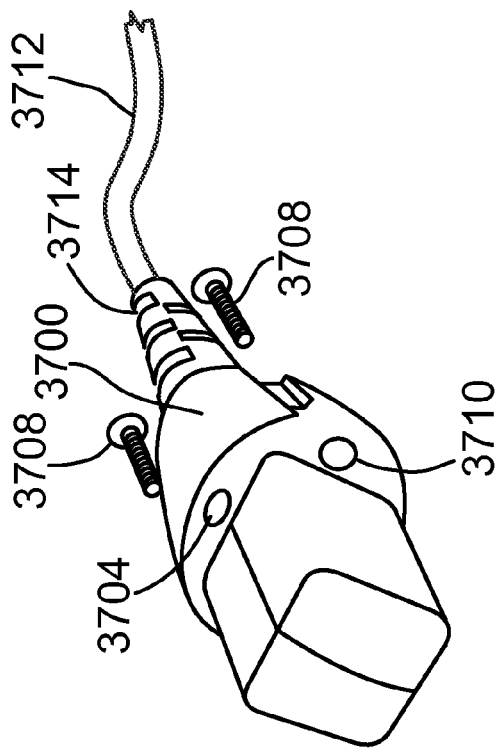
FIG. 38 is an alternate perspective view of the external power adapter of FIG. 37.
Figure 37:
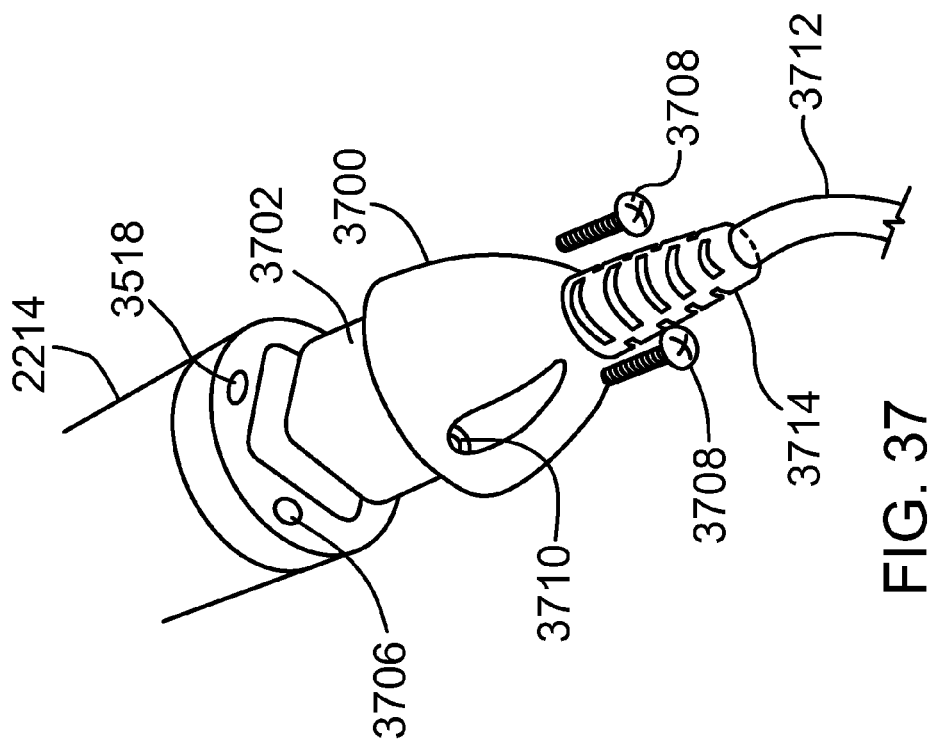
FIG. 37 is an exploded perspective of the handle end of FIG. 35 and an external power adapter in accordance with an embodiment of the present invention.

Referring to FIGS. 37 and 38, an adaptor plug 3700 has a plug end 3702 that is shaped similarly to battery pack 3506. The plug 3700 has contacts 3704 for making electrical connection to contacts 3518. The handle 2214 has threaded inserts 3706 for receiving screws 3708 to retain plug 3700 through holes 3710. Plug 3700 has cord 3712 for connection to an external power source, not shown. Two-directional strain relief 3714 is provided about the cord 3712 where the cord 3712 meets the plug 3700.

The adapter plug 3700 may itself be integrated with a mounting device, not shown, for example an articulated arm, such as those commonly referred to as a "goose neck", that terminates in a clamp, magnet or other securing means to allow the work light 2100 to easily converted to an adjustable temporarily fixedly mounted light 2100.

Referring to FIGS. 29, 30 and 30a, an alternate embodiment of the work light 2100 is work light 2900. Work light 2900 is quite similar to work light 2100. Accordingly, only particularly relevant differences will be described herein. Like reference numerals will be used to describe like components. Work light 2900 (reference numeral in FIG. 30a) has casing 2902. Internal components (indicate generally in FIGS. 29 and 30 as reference numeral 2906). Hook 2101 stores in recess 2908 (FIG. 30a). Contrary to the work light 2100, the hook 2101 in work light 2900 is aligned with the beam axis when stored. In the work light 2100 the hook 2101 is perpendicular to the beam axis when stored. As a result the depth of the light 2900 generally parallel to the beam axis is larger than that of the work light 2100.

As the hook 2101 stores between fins 2910 (only one fin 2910 is indicated in FIGS. 29, 30 in an exemplary manner) of heatsink 2912, the fins 2910 have room within the casing 2902 for greater depth. Thus the heatsink 2912 can be somewhat narrower or shorter if desired. The hook 2101 projects from the casing 2902 when stored to allow a user to access the hook 2101. A depression, not shown, could be provided about the hook 2101 to allow such access while further increasing the depth of the casing. This may be preferable as the projection of the hook 2101 tends to cause the light 2900 to roll when laid on its rear surface 2914.

As can be seen from the shape of the heatsink 2912, but is not as evident in FIG. 30a, the rear surface 2914 can have a smaller radius of curvature than the corresponding surface of the light 2100 while maintaining a minimum overall depth with the shown hook 2101 storage configuration. The overall depth of the work light 2900 is much closer to its width, while still substantially less than its height.

A removable door 2918 may be provided in casing 2902 to allow for cleaning of the interior of the light in case foreign substances enter the light 2900, for example through slots 2920. Such a door could be provided in other embodiments, particularly those with slots through the casing. The heatsink 2912 and the heatsinks of other embodiments could be coated with a non-stick material such as Teflon™ to allow for easy cleaning.

Although the work light 2900 has greater depth than the work light 2100 it otherwise retains many of the beneficial features of the light 2100.

Any work lights formed from a hard casing may be improved by adding rubber "bumpers" in order to increase survivability of falls and impacts. The rubber material in any such "bumpers" may be made of sorbethane rubber which has notable damping properties that may reduce "recoil" effects, and this can reduce bouncing that risks damage from additional impacts. Sorbethane rubber or other material that has a high damping factor may be used in structural parts or added parts to reduce any vibration effects from falls, impacts or other causes.

Any embodiment of the present invention that has batteries may have rechargeable batteries. Any rechargeable batteries comprised in embodiments of the present invention may or may not be removable. Any embodiment of the present invention having rechargeable batteries or able to be powered by rechargeable batteries may further comprise charging circuitry or a charger. Any embodiment of the present invention may further comprise one or more indicator lamps and/or one or more other indication devices, such as a battery status indicator, charging status indicator, and/or a temperature indicator. Any embodiment of the present invention may have automatic shutdown means for purposes such as protection from excessive temperature and prevention of excessive discharge of any batteries. Such automatic shutdown means may include voltage sensing circuitry, temperature sensing circuitry and/or a thermostat or a thermal cutout circuit. Sensing circuitry would typically have to control a switching device such as a relay or a transistor or switching circuitry in order to achieve automatic shutdown of a work light that is experiencing unfavorable conditions such as excessive temperature or low battery voltage.

Any embodiment of the present invention may or may not be constructed so as to be waterproof, submersible, able to withstand liquids other than water, and/or to be explosion-proof.

It is noted that in various places throughout this description reference has been made to components using or formed from rubber. Such components may also employ a thermoplastic elastomer or other similar alternative.

It will be understood by those skilled in the art that this description is made with reference to the preferred embodiment and that it is possible to make other embodiments employing the principles of the invention which fall within its spirit and scope as defined by the following claims. In particular and without limiting the above, persons skilled in the art will recognize that various features and functions of the different embodiments described herein will be useful in other embodiments, and that such features and functions may be used in such other embodiments to create new embodiments employing the principles of the invention.

We claim:

1. A light emitting diode (LED) work light comprising:
an outer casing including a head section and a handle section,
the head section comprising a single piece metal elongate channel having a rear portion and opposing side flanges perpendicular to the rear portion, the rear portion and side flanges extending longitudinally along the channel, the channel defining an open transverse side between the opposing side flanges,
a plurality of LEDs directly mounted on a surface of the rear portion inside the channel such that the channel is a heatsink for the LEDs, the LEDs generally disposed in a linear fashion along the channel, the LEDs being directional LEDs aimed to emit from the substantially open transverse side, and
a transparent unitary multiple element convex lens covering the LEDs, the single piece multiple lens comprising a plurality of convex lenses including a corresponding convex lens forward of each LED, the single piece multiple lens directly affixed to the rear portion of the channel by at least one fastener that passes through the transparent unitary multiple element convex lens to the rear portion of the channel,
wherein each convex lens further comprises a concavoconvex lens wherein a central part of a rear surface of the concavoconvex lens is flat,
wherein forward edges of the side flanges of the channel extend farther forward from the rear surface than the unitary multiple element convex lens.

2. The work light of claim 1 wherein the at least one fastener further comprises at least one screw through at least one hole in the transparent unitary multiple element convex lens.

3. The work light of claim 1 wherein each convex lens concentrates the light from the corresponding LED into a beam that is 40 to 90 degrees wide.

4. The work light of claim 1 wherein the channel extends the full length of the LED work light including the head section and the handle section.

5. The work light of claim 1 wherein the transparent unitary multiple element convex lens further comprises a transition member between the convex lenses which is of unitary construction with the convex lenses.

6. The work light of claim 1 wherein the handle section is of unitary construction with the head section.

7. The work light of claim 1 wherein at least one LED has a nominal power rating of at least 1 watt.

8. The work light of claim 1 wherein at least one LED has a nominal power rating of at least 5 watts.

9. The work light of claim 1 wherein all of the plurality LEDs comprise white LEDs.

* * * * *